US011808338B2

(12) United States Patent
Rossberger

(10) Patent No.: US 11,808,338 B2
(45) Date of Patent: Nov. 7, 2023

(54) HARMONIC PIN RING GEARING

(71) Applicant: TQ-SYSTEMS GMBH, Seefeld (DE)

(72) Inventor: Antonius Georg Rossberger, Sindelsdorf (DE)

(73) Assignee: TQ-SYSTEMS GMBH

( * ) Notice: Subject to any disclaimer, the term of this patent is extended or adjusted under 35 U.S.C. 154(b) by 0 days.

(21) Appl. No.: 18/094,828

(22) Filed: Jan. 9, 2023

(65) Prior Publication Data

US 2023/0235814 A1    Jul. 27, 2023

Related U.S. Application Data

(63) Continuation of application No. 17/387,246, filed on Jul. 28, 2021, now Pat. No. 11,578,790, which is a (Continued)

(30) Foreign Application Priority Data

Mar. 20, 2013   (WO) .................. PCT/IB2013/052217

(51) Int. Cl.
*F16H 49/00*       (2006.01)
*B62M 23/00*       (2006.01)
(Continued)

(52) U.S. Cl.
CPC .......... *F16H 49/001* (2013.01); *B62M 23/00* (2013.01); *F16H 25/06* (2013.01); *B62M 6/55* (2013.01);
(Continued)

(58) Field of Classification Search
CPC ....................................................... F16H 49/001
(Continued)

(56) References Cited

U.S. PATENT DOCUMENTS

| 499,694 A | 6/1893 | Wright |
| 541,713 A | 6/1895 | Bolton |

(Continued)

FOREIGN PATENT DOCUMENTS

| AT | 372767 | 11/1983 |
| AU | 2011311151 | 4/2013 |

(Continued)

OTHER PUBLICATIONS

Hoebel, Rudi; Chinese Office Action for serial No. 201180057084.7, filed Oct. 7, 2010, dated Mar. 30, 2015, 8 pgs.
(Continued)

*Primary Examiner* — Ha Dinh Ho
(74) *Attorney, Agent, or Firm* — Taylor English Duma LLP

(57) ABSTRACT

A harmonic ring gear system can include at least one inner gear with external toothing, the at least one inner gear defining an axis of rotation; at least one outer gear with internal toothing arranged concentrically to the at least one inner gear about the axis of rotation, the internal toothing spaced apart from the external toothing; a pin ring positioned between the at least one inner gear and the at least one outer gear, the pin ring comprising a multiplicity of pins; and a rotary transmitter configured to lift a portion of the pins of the multiplicity of pins off the external toothing and press the portion of the pins into the internal toothing.

20 Claims, 32 Drawing Sheets

Related U.S. Application Data continuation of application No. 16/454,249, filed on Jun. 27, 2019, now Pat. No. 11,118,667, which is a continuation of application No. 14/778,404, filed as application No. PCT/IB2014/059999 on Mar. 20, 2014, now Pat. No. 10,371,240.

(51) Int. Cl.
*F16H 25/06* (2006.01)
*B62M 6/55* (2010.01)

(52) U.S. Cl.
CPC .. *F16H 2025/066* (2013.01); *F16H 2049/003* (2013.01); *F16H 2200/2069* (2013.01)

(58) Field of Classification Search
USPC .......................................................... 74/640
See application file for complete search history.

(56) References Cited

U.S. PATENT DOCUMENTS

| | | |
|---|---|---|
| 550,474 A | 11/1895 | Bolton |
| 573,230 A | 12/1896 | Monkiewicz |
| 618,190 A | 1/1899 | Sturgess |
| 1,423,028 A | 7/1922 | Ernest |
| 1,670,144 A | 5/1928 | Ewart |
| 1,877,338 A | 9/1932 | Kottlowski |
| 2,210,240 A | 8/1940 | Herrick |
| 2,326,235 A | 8/1943 | Fritz |
| 2,852,954 A | 9/1958 | Hobbs |
| 2,941,421 A | 6/1960 | Plotti |
| 2,966,808 A | 1/1961 | Grudin |
| 3,068,719 A | 12/1962 | Singelmann |
| 3,148,560 A | 9/1964 | Woodward, Jr. |
| 3,258,994 A * | 7/1966 | Gorfin ..................... F16H 1/321 475/180 |
| 3,468,175 A * | 9/1969 | Rabek ..................... F16H 25/06 74/110 |
| 3,726,158 A | 4/1973 | Brown |
| 3,861,242 A | 1/1975 | Adams et al. |
| 3,893,532 A | 7/1975 | Perlowin |
| 3,950,950 A | 4/1976 | Doerner et al. |
| 4,023,440 A | 5/1977 | Kennington et al. |
| 4,050,331 A * | 9/1977 | Braren ..................... F16H 1/32 475/168 |
| 4,060,006 A | 11/1977 | Abel et al. |
| 4,117,746 A * | 10/1978 | Pierrat ..................... F16H 1/32 475/180 |
| 4,194,415 A | 3/1980 | Kennington et al. |
| 4,223,757 A | 9/1980 | Olander |
| 4,227,092 A | 10/1980 | Campagnuolo et al. |
| 4,235,129 A | 11/1980 | Takasu |
| 4,307,630 A | 12/1981 | Osborn et al. |
| 4,429,595 A | 2/1984 | Butterfield |
| 4,449,425 A * | 5/1984 | Carden ..................... F16H 1/32 475/180 |
| 4,471,672 A | 9/1984 | Butterfield et al. |
| 4,491,033 A | 1/1985 | Carlson et al. |
| 4,518,308 A | 5/1985 | Grzybowski et al. |
| 4,526,064 A | 7/1985 | Carden et al. |
| 4,567,790 A | 2/1986 | Butterfield et al. |
| 4,574,659 A | 3/1986 | Arndt |
| 4,583,962 A | 4/1986 | Bytzek et al. |
| 4,584,904 A | 4/1986 | Distin, Jr. et al. |
| 4,601,216 A | 7/1986 | Inque et al. |
| 4,604,916 A | 8/1986 | Distin, Jr. |
| 4,715,247 A | 12/1987 | Honda et al. |
| 4,729,756 A | 3/1988 | Zimmer |
| 4,798,104 A * | 1/1989 | Chen ..................... F16H 25/06 475/159 |
| 4,807,494 A | 2/1989 | Lew |
| 4,900,165 A | 2/1990 | Kun et al. |
| 4,974,470 A | 12/1990 | Ishikawa et al. |
| 5,123,300 A | 6/1992 | Himmelein et al. |
| 5,286,237 A | 2/1994 | Minegishi |
| 5,417,186 A | 5/1995 | Elrod et al. |
| 5,445,572 A | 8/1995 | Parker |
| 5,456,139 A | 10/1995 | Aubin |
| 5,480,016 A | 1/1996 | Kurz et al. |
| 5,662,008 A | 9/1997 | Aubin et al. |
| 5,678,671 A | 10/1997 | Leimbach et al. |
| 5,772,573 A | 6/1998 | Hao |
| 5,860,331 A | 1/1999 | Hashimoto et al. |
| 5,954,611 A | 9/1999 | Mills et al. |
| 5,970,822 A | 10/1999 | Jung et al. |
| 6,012,347 A | 1/2000 | Hasegawa |
| 6,026,711 A | 2/2000 | Tortora et al. |
| 6,138,622 A | 10/2000 | Heer |
| 6,148,684 A | 11/2000 | Gardiner |
| 6,152,249 A | 11/2000 | Li et al. |
| 6,258,007 B1 | 7/2001 | Kristjansson |
| 6,296,072 B1 | 10/2001 | Turner |
| 6,328,006 B1 | 12/2001 | Heer |
| 6,998,730 B2 | 2/2006 | Tharp |
| 7,249,534 B1 | 7/2007 | Devenyi |
| 7,377,243 B2 | 5/2008 | Meintschel et al. |
| 7,421,990 B2 | 9/2008 | Taye et al. |
| 7,631,553 B2 | 12/2009 | Heim et al. |
| 8,191,439 B2 | 6/2012 | Kobayashi et al. |
| 8,485,064 B2 | 7/2013 | Kanai |
| 8,656,809 B2 | 2/2014 | Bayer et al. |
| 9,017,198 B2 | 4/2015 | Hoebel |
| 9,140,342 B2 | 9/2015 | Hoebel et al. |
| 9,228,651 B2 | 1/2016 | Waide |
| 9,702,775 B2 | 7/2017 | Stopps et al. |
| 10,247,287 B2 | 4/2019 | Hoebel et al. |
| 10,371,240 B2 | 8/2019 | Rossberger |
| 11,118,667 B2 | 9/2021 | Rossberger |
| 11,280,394 B2 | 3/2022 | Hoebel et al. |
| 11,286,979 B2 | 3/2022 | Rossberger |
| 11,578,790 B2 | 2/2023 | Rossberger |
| 11,592,056 B2 | 2/2023 | Rossberger |
| 2003/0089186 A1 | 5/2003 | Bogelein et al. |
| 2003/0089194 A1 | 5/2003 | Ruttor et al. |
| 2003/0121363 A1 | 7/2003 | Poehlau |
| 2003/0220165 A1 | 11/2003 | He et al. |
| 2004/0059331 A1 | 3/2004 | Mullaney |
| 2006/0000435 A1 | 1/2006 | Aust et al. |
| 2006/0027201 A1 | 2/2006 | Ryou |
| 2006/0046889 A1 | 3/2006 | Christensen |
| 2006/0135305 A1 | 6/2006 | Erez et al. |
| 2006/0283289 A1 | 12/2006 | Baudendistel et al. |
| 2007/0039414 A1 | 2/2007 | Takemura |
| 2007/0051187 A1 | 3/2007 | McDearmon |
| 2007/0101820 A1 | 5/2007 | Bulatowicz |
| 2007/0158497 A1 | 7/2007 | Edelson et al. |
| 2008/0161142 A1 | 7/2008 | Shiozaki et al. |
| 2008/0173130 A1 | 7/2008 | Zhang et al. |
| 2008/0251302 A1 | 10/2008 | Lynn |
| 2008/0254929 A1 | 10/2008 | Wesling et al. |
| 2009/0139357 A1 | 6/2009 | Ishikawa |
| 2009/0284089 A1 | 11/2009 | Wingett et al. |
| 2010/0012407 A1 | 1/2010 | Oba et al. |
| 2010/0024593 A1 | 2/2010 | Schmidt et al. |
| 2011/0039650 A1 | 2/2011 | Rosemeier et al. |
| 2011/0088496 A1 | 4/2011 | Cho et al. |
| 2011/0187179 A1 | 8/2011 | Zwarts et al. |
| 2012/0017701 A1 | 1/2012 | Meyer et al. |
| 2012/0046140 A1 | 2/2012 | Shelef et al. |
| 2012/0270692 A1 | 10/2012 | Hoebel |
| 2013/0276575 A1 | 10/2013 | Hoebel |
| 2013/0288848 A1 | 10/2013 | Carter et al. |
| 2014/0018208 A1 | 1/2014 | Takaishi et al. |
| 2015/0276036 A1 | 10/2015 | Hoebel |
| 2016/0245386 A1 | 8/2016 | Rossberger |
| 2016/0356374 A1 | 12/2016 | Hoebel |
| 2019/0257401 A1 | 8/2019 | Hoebel et al. |
| 2019/0316667 A1 | 10/2019 | Rossberger |
| 2020/0063793 A1 | 2/2020 | Rossberger |
| 2021/0332869 A1 | 10/2021 | Rossberger |
| 2021/0356029 A1 | 11/2021 | Rossberger |

(56) References Cited

U.S. PATENT DOCUMENTS

| | | | |
|---|---|---|---|
| 2022/0163063 | A1 | 5/2022 | Rossberger |
| 2022/0163104 | A1 | 5/2022 | Hoebel et al. |
| 2023/0235782 | A1 | 7/2023 | Rossberger |

FOREIGN PATENT DOCUMENTS

| | | |
|---|---|---|
| CA | 2011232 | 9/1990 |
| CN | 102365474 | 2/2012 |
| CN | 104276251 | 1/2014 |
| DE | 8513367 | 6/1986 |
| DE | 3738521 | 12/1988 |
| DE | 102009003695.4 | 3/2009 |
| DE | 102009033790.3 | 7/2009 |
| DE | 202009011082.6 | 9/2009 |
| DE | 202010000318.0 | 3/2010 |
| DE | 102014115043 | 4/2016 |
| EP | 0316713 | 5/1989 |
| EP | 0984201 | 3/2000 |
| EP | 2672147 | 12/2013 |
| EP | 4124556 | 2/2023 |
| JP | 48-031368 | 4/1972 |
| JP | S4831368 | 4/1973 |
| JP | 858220720 | 12/1983 |
| JP | S59187152 | 10/1984 |
| JP | S61547 | 1/1986 |
| JP | 1261537 | 10/1989 |
| JP | H02271144 | 11/1990 |
| JP | H10-100372 | 4/1998 |
| JP | 11-079627 | 3/1999 |
| JP | H11-79627 | 3/1999 |
| JP | 11227665 | 8/1999 |
| JP | H11227666 A | 8/1999 |
| JP | H11258078 A | 9/1999 |
| JP | 2003019996 A | 1/2003 |
| JP | 2005330990 | 12/2005 |
| JP | 2006522294 | 9/2006 |
| JP | 2007155076 | 6/2007 |
| JP | 2007205397 | 8/2007 |
| JP | 2008174069 | 7/2008 |
| JP | 2009507244 A | 2/2009 |
| JP | 2013539848 | 10/2013 |
| JP | 2016507755 A | 3/2016 |
| KR | 20100070607 | 6/2010 |
| WO | 1999037017 | 7/1999 |
| WO | 2004088166 | 10/2004 |
| WO | 2006119033 | 11/2006 |
| WO | 2007030461 | 3/2007 |
| WO | 2010113115 | 10/2010 |
| WO | 2012046216 | 4/2012 |
| WO | 2014060974 | 4/2014 |
| WO | 2014060975 | 4/2014 |
| WO | 2014147583 | 9/2014 |
| WO | 2018096521 | 5/2018 |
| WO | 2019229574 | 12/2019 |

OTHER PUBLICATIONS

Hoebel, Rudi; Extended European Search Report for serial No. 11830282.7, filed May 7, 2013, dated Mar. 16, 2018, 18 pgs.
Hoebel, Rudi; International Preliminary Report on Patentability for PCT/IB2011/054431, filed Oct. 7, 2011, dated Apr. 9, 2013, 7 pgs.
Hoebel, Rudi; International Search Report and Written Opinion for PCT/IB2011/054431, filed Oct. 7, 2011, dated Jun. 8, 2012, 11 pgs.
Hoebel, Rudi; Issue Notification for U.S. Appl. No. 13/857,277, filed Apr. 5, 2013, dated Sep. 2, 2015, 1 pg.
Hoebel, Rudi; Non-Final Office Action for U.S. Appl. No. 13/857,277, filed Apr. 5, 2013, dated Dec. 4, 2014, 17 pgs.
Hoebel, Rudi; Notice of Allowance for U.S. Appl. No. 13/857,277, filed Apr. 5, 2013, dated May 19, 2015, 11 pgs.
Hoebel, Rudi; Australian Patent Examintion Report for serial No. 2010231573, filed Mar. 30, 2010, dated Apr. 24, 2014, 5 ogs.
Hoebel, Rudi; Chinese Office Action for serial No. 201080015450, filed Mar. 30, 2010, dated Apr. 2, 2014, 7 pgs.
Hoebel, Rudi; Chinese Office Action for serial No. 201080015450, filed Mar. 30, 2010, dated Sep. 25, 2014, 8 pgs.
Hoebel, Rudi; Corrected Notice of Allowability for U.S. Appl. No. 13/260,917, filed Jul. 4, 2012, dated Jan. 8, 2015, 13 pgs.
Hoebel, Rudi; European Search Report for U.S. Appl. No. 10/758,136, published on Feb. 8, 2012, dated Jul. 30, 2012, 20 bgs.
Hoebel, Rudi; International Preliminary Report on Patentability for PCT/IB2010/051383, filed Mar. 30, 2010, dated Oct. 4, 2011, 5 pgs.
Hoebel, Rudi; International Search Report and Written Opinion for PCT/IB2010/051383, filed Mar. 30, 2010, dated Feb. 1, 2011, 6 pgs.
Hoebel, Rudi; Issue Notification for U.S. Appl. No. 13/260,917, filed Jul. 4, 2012, dated Apr. 8, 2015, 1 pg.
Hoebel, Rudi; Non-Final Office Action for U.S. Appl. No. 13/260,917, filed Jul. 4, 2012, dated Aug. 12, 2014, 13 pgs.
Hoebel, Rudi; Notice of Allowance for U.S. Appl. No. 13/260,917, filed Jul. 4, 2012, dated Dec. 24, 2014, 16 pgs.
Hoebel, Rudi; Issue Notification for U.S. Appl. No. 14/666,968, filed Mar. 24, 2015, dated Aug. 17, 2016, 1 pg.
Hoebel, Rudi; Notice of Allowance for U.S. Appl. No. 14/666,968, filed Mar. 24, 2015, dated May 18, 2016, 29 pgs.
Hoebel, Rudi; Restriction Requirement for U.S. Appl. No. 14/666,968, filed Mar. 24, 2015, dated Feb. 26, 2016, 8 pgs.
Hoebel, Rudi; Final Office Action for U.S. Appl. No. 15/241,413, filed Aug. 19, 2016, dated Feb. 28, 2018, 12 pgs.
Hoebel, Rudi; Japanese Office Action for serial No. 2012502862, published Sep. 20, 2012, dated Jan. 16, 2014, 5 pgs.
Hoebel, Rudi; Issue Notification for U.S. Appl. No. 15/241,413, filed Aug. 19, 2016, dated Mar. 13, 2019, 1 pg.
Hoebel, Rudi; Non-Final Office Action for U.S. Appl. No. 15/241,413, filed Aug. 19, 2016, dated Oct. 16, 2017, 26 pgs.
Hoebel, Rudi; Notice of Allowance for U.S. Appl. No. 15/241,413, filed Aug. 19, 2016, dated Nov. 16, 2018, 10 pgs.
Hoebel, Rudi; Office Action for Japanese patent application No. 2017-225779, filed Nov. 24, 2017, dated Dec. 17, 2018, 7 pgs.
Hoebel, Rudi; Restriction Requirement for U.S. Appl. No. 15/241,413, filed Aug. 19, 2016, dated Jul. 25, 2017, 8 pgs.
Hoebel, Rudi; Final Office Action for U.S. Appl. No. 16/289,703, filed Mar. 1, 2019, dated Apr. 26, 2021, 22 pgs.
Hoebel, Rudi; Non-Final Office Action for U.S. Appl. No. 16/289,703, filed Mar. 1, 2019, dated Jan. 7, 2021, 46 pgs.
Hoebel, Rudi; Notice of Allowance for U.S. Appl. No. 16/289,703, filed Mar. 1, 2019, dated Nov. 19, 2021, 13 pgs.
Hoebel, Rudi; Requirement for Restriction/Election for U.S. Appl. No. 16/289,703, filed Mar. 1, 2019, dated Sep. 28, 2020, 6 pgs.
TQ Systems GMBH; Office Action for Japanese patent application No. 2019-141004, filed Jul. 31, 2019, dated Aug. 24, 2020, 9 pgs.
TQ-Systems GMBH; Office Action for European application No. 13177924.1, filed Jul. 25, 2013, dated Dec. 17, 2018, 11 pgs.
TQ-Systems GMBH; Notice of Allowance for Japanese patent application No. 2019-141004, dated Dec. 21, 2020, 4 bgs.
Hoebel, Rudi; Non-Final Office Action for U.S. Appl. No. 17/669,841, filed Feb. 11, 2022, dated Mar. 9, 2023, 44 pgs.
TQ-Systems GmbH; Office Action for Japanese patent application No. 2021-024839, dated May 30, 2022, 4 pgs.
Rossberger, Antonius Georg; Notice of Allowance for U.S. Appl. No. 17/667,124, filed Feb. 8, 2022, dated Oct. 25, 2022, 37 pgs.
Rossberger, Antonius Georg; International Preliminary Report on Patentability for PCT/IB2019/054085, filed May 17, 2019, dated Dec. 1, 2020, 45 pgs.
Rossberger, Antonius Georg; International Search Report and Written Opinion for PCT/IB2019/054085, filed May 17, 2019, dated Sep. 25, 2019, 53 pgs.
TQ Systems, Inc; Office Action for Chinese patent application No. 201980036472.3, dated Nov. 3, 2021, 18 pgs.
TQ-Systems GmbH; Office Action for Chinese patent application No. 201980036472.3, dated Jun. 6, 2022, 6 pgs.
TQ-Systems GMBH; Summons to Attend Oral Proceedings for European patent application No. 19735628.0, dated Oct. 12, 2022, 18 pgs.
Hoebel, Rudi; Australian Patent Examination Report for serial No. 2011311151, filed Oct. 7, 2011, dated Jun. 6, 2014, 2 pgs.

(56) References Cited

OTHER PUBLICATIONS

Rossberger, Antonius Georg; International Search Report and Written Opinion for PCT/IB2017/057452, filed Nov. 28, 2017, dated Aug. 7, 2018, 33 pgs.
Rossberger, Antonius Georg; International Preliminary Report on Patentability for PCT/IB2014/059999, filed Mar. 20, 2013, dated Sep. 22, 2015, 17 pgs.
Rossberger, Antonius Georg; International Search Report for PCT/IB2014/059999, filed Mar. 20, 2013, dated Jul. 8, 2014, 44 pgs.
Rossberger, Antonius Georg; Non-Final Office Action for U.S. Appl. No. 14/778,404, filed May 17, 2016, dated May 30, 2018, 11 pgs.
Rossberger, Antonius Georg; Notice of Allowance for U.S. Appl. No. 14/778,404, filed May 17, 2016, dated Mar. 20, 2019, 7 pgs.
Rossberger, Antonius Georg; Non-Final Office Action for U.S. Appl. No. 16/454,249, filed Jun. 27, 2019, dated Nov. 24, 2020, 15 pgs.
Rossberger, Antonius Georg; Notice of Allowance for U.S. Appl. No. 16/454,249, filed Jun. 27, 2019, dated Apr. 28, 2021, 5 pgs.
TQ-Systems GMBH; European Search Report for serial No. 14719358.5, filed Aug. 5, 2015, dated Sep. 19, 2019, 9 pgs.
Rossberger, Antonius Georg; Notice of Allowance for U.S. Appl. No. 17/387,246, filed Jul. 28, 2021, dated Oct. 11, 2022, 14 pgs.
TQ-Systems GMBH; Office Action for Japanese patent application No. 2022-098131, dated Jun. 26, 2023, 4 pgs.
Rossberger, Antonius Georg; Notice of Allowance for U.S. Appl. No. 18/101,964, filed Jan. 26, 2023, dated May 22, 2023, 38 pgs.
Rossberger, Anotonius Georg; Examiner-Initiated Interview Summary for U.S. Appl. No. 18/101,964, filed Jan. 26, 2023, dated Jun. 27, 2023, 2 pgs.
TQ Systems GMBH; Office Action for Japanese patent application No. 2020-566746, dated May 9, 2023, 6 pgs.
Hoebel, Rudi; Notice of Allowance for U.S. Appl. No. 17/669,841, filed Feb. 11, 2022, dated Jul. 24, 2023, 24 pgs.

\* cited by examiner

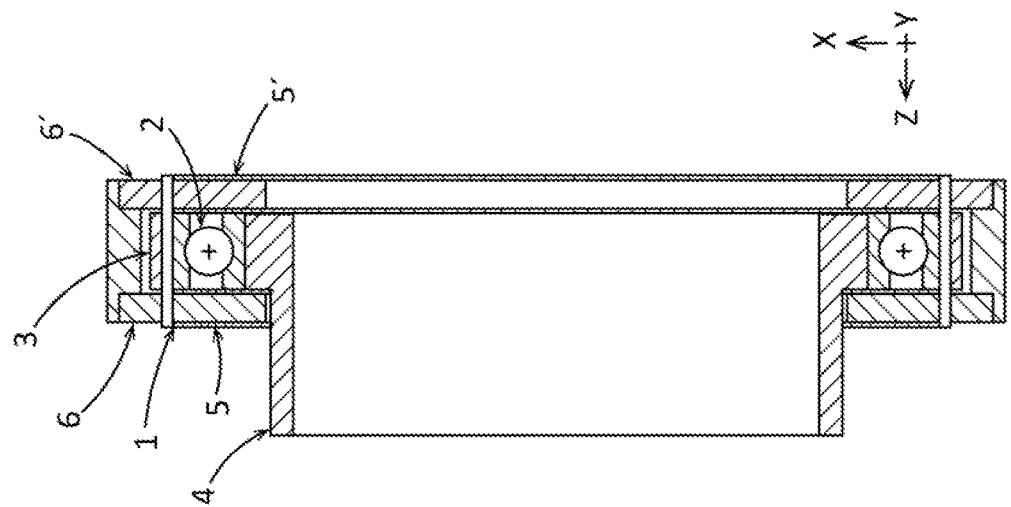
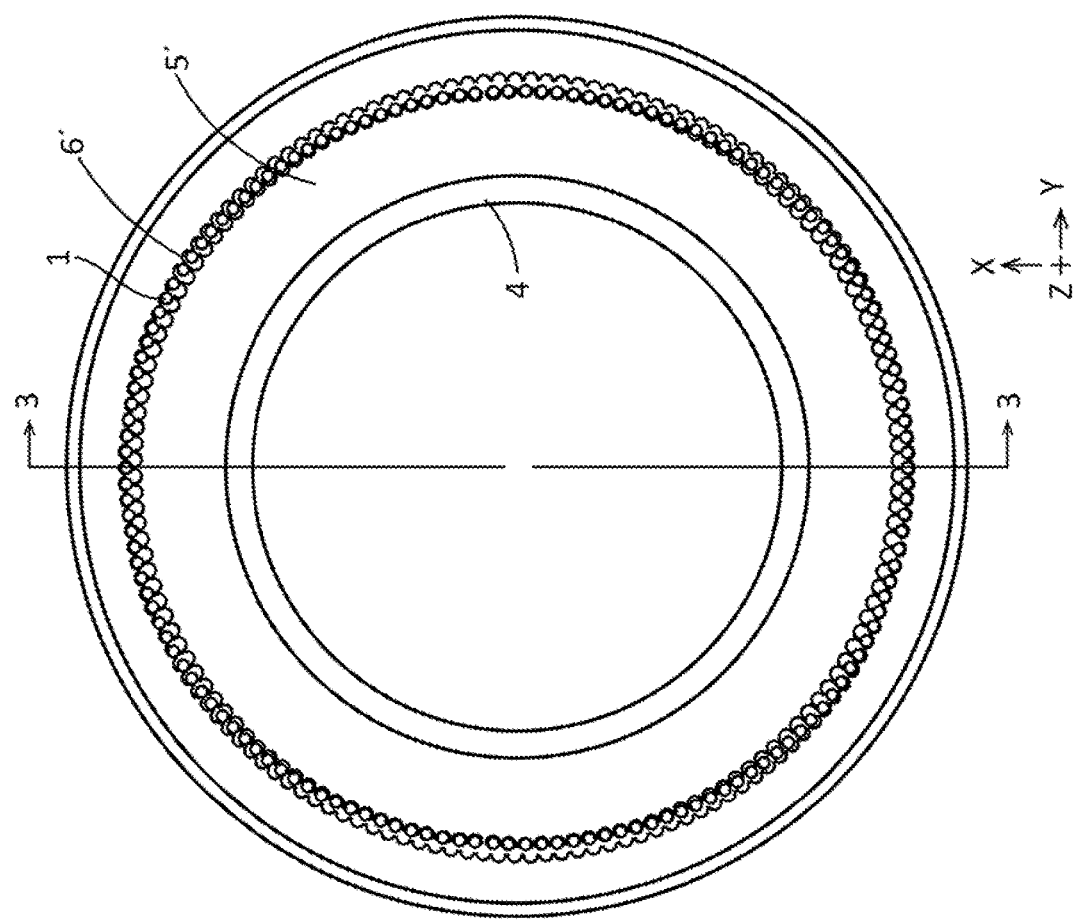
FIG. 3
FIG. 2

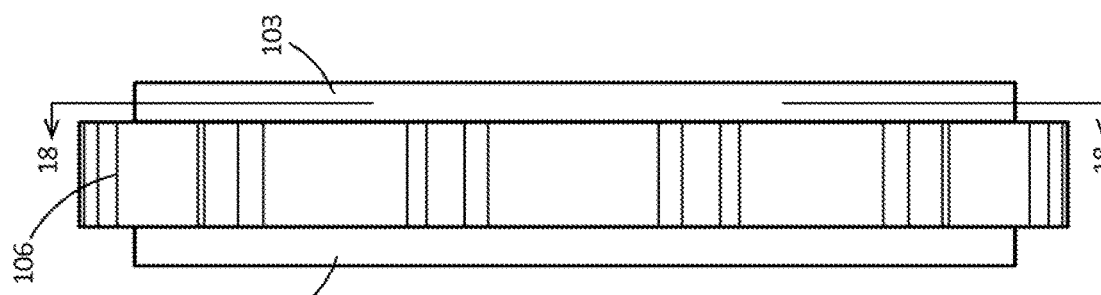
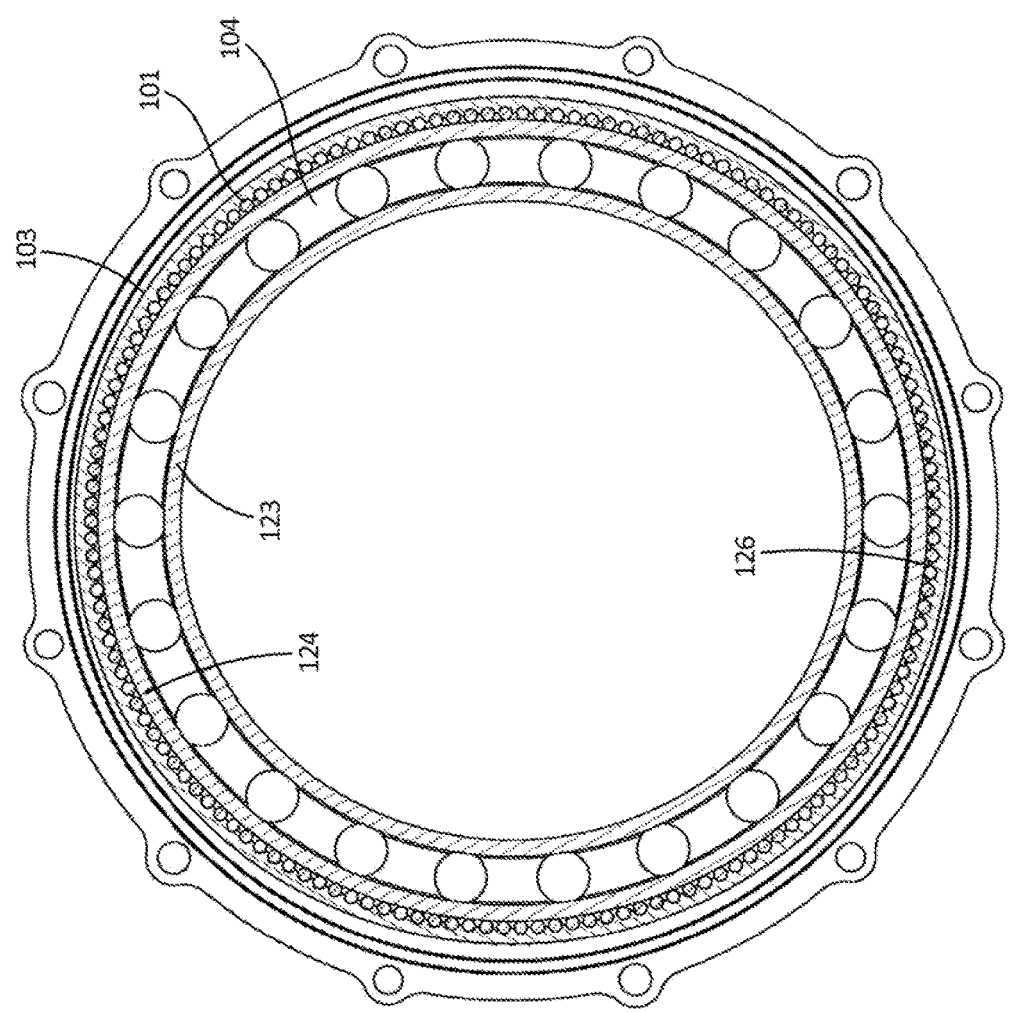
FIG. 20
FIG. 21

HARMONIC PIN RING GEARING

REFERENCE TO RELATED APPLICATIONS

This application is a continuation of U.S. application Ser. No. 17/387,246, filed Jul. 28, 2021, which is a continuation of U.S. application Ser. No. 16/454,249, filed Jun. 27, 2019, which issued into U.S. Pat. No. 11,118,667 on Sep. 14, 2021, which is a continuation of U.S. application Ser. No. 14/778,404, filed May 17, 2016, which issued into U.S. Pat. No. 10,371,240 on Aug. 6, 2019, which is a 371 of PCT Application No. IB2014/059999, filed Mar. 20, 2014, which claims the benefit of PCT Application No. IB2013/052217, filed Mar. 20, 2013, each of which is hereby specifically incorporated by reference herein in its entirety.

The invention describes inter alia a novel pin ring gear system, an inner ring and an outer ring for such a gear system and a tooth profile suitable for this gear system. This novel pin ring gear system is referred to below as a "harmonic pin ring drive".

US 2009/0139358 discloses a method for setting a tooth profile for a flat harmonic drive or a strain wave gear system having a flexible internally toothed gear and a rigid externally toothed gear. It specifies a tooth shape for the internally toothed gear on the basis of which the profile of the externally toothed gear is then determined.

This description discloses a harmonic pin ring gear system with an input shaft and an output shaft, wherein the input shaft can take the form of a rotor shaft and the output shaft can correspond to a region of an inner gear with a driven shaft or hollow driven shaft.

The harmonic pin ring gear system comprises two outer gears, each with internal toothing. The outer gears can, in particular, be spaced apart in axial direction, wherein a spacer such as, for example, a sleeve can be arranged between the outer gears.

A single inner gear with external toothing is arranged concentrically to a first outer gear and in axial direction inside this first outer gear. Here a single inner gear with external toothing also comprises a multi-part inner gear with multi-part toothing, as long as the components of the inner gear form one assembly unit, while the second outer gear has no corresponding or radially opposite inner gear with corresponding external toothing. This arrangement is also referred to as a 2.5-row pin ring gear system while a gear system with two corresponding internal and external toothed elements and one transmitter is referred to as a 3-row pin ring gear system.

In other words, the pins projecting laterally beyond the drive means on one of the two axial sides are supported in radial direction outwards only in the first internal toothing, while the pins on the other axial side are supported in radial direction both inwards in the external toothing of the single inner gear and outwards in the internal toothing of the corresponding outer gear.

A drive means comprising a pin ring or pin-retaining ring formed as one part in circumferential direction and a multiplicity of pins that protrude laterally from the pin-retaining ring in axial direction extends between the two outer gears and the inner gear. In the application the terms pin ring and pin-retaining ring are occasionally used synonymously, it being clear from the context which is meant. In its narrowest sense, a pin ring is formed of a pin-retaining ring containing a multiplicity of pins. However, for the sake of brevity, a pin-retaining ring without pins is often also referred to as a pin ring.

Furthermore, a rotary transmitter is provided for lifting the drive means off the external toothing of the inner gear and pressing the drive means into the internal toothing of the outer gears.

In particular, the rotary transmitter can take the form of a cam disk with an oval or other similar shape on which a thin-section ball bearing is arranged. Alternatively, a wire rod ball bearing or a flexible ball bearing with no outer ring can be fitted. A further form of transmitter takes the form of two circular rollers axially offset in relation to one another and mounted such that they can rotate about their axes.

According to one of the embodiments, in a first axial region of the gear system a radial force flow runs in a straight direction from the transmitter via at least one pin to the internal toothing of the outer gear. In a second axial region of the gear system a radial force flow runs in a straight direction from at least one pin to the external toothing of the inner gear.

In particular, the outer ring, the pin ring and the inner ring can be arranged such that a radial force flow runs in a straight direction from the internal toothing of the outer ring via at least one pin to the external toothing of the inner gear.

According to one embodiment the pin-retaining ring is located in the axial direction of the gear system on an inner side of an outer gear designed as one or more part or parts. According to another embodiment the pin-retaining ring is located in axial direction between a first and a second outer gear. According to a further embodiment the pin-retaining ring is arranged in axial direction centrally in an outer gear designed as one or more parts.

According to a first configuration of the transmitter the transmitter can be formed such that the drive means abuts the entire circumference of the transmitter. This is the case with an oval cam disk, for example, but not with two axially offset rollers. In this case, the transmitter comprises an oval-shaped cam disk and a flexible thin-section roller bearing, wherein the flexible thin-section roller bearing lies on the oval cam disk and the pins lie on an outer ring of the flexible thin-section roller bearing.

According to a further configuration of the transmitter the drive means abuts the circumference of the transmitter except in a first region about a first angular position and in a second region about a second angular position, wherein the first angular position is offset by 180 degrees in relation to the second angular position. This is the case where there are two axially offset rollers and is also referred to as a double eccentric cam. Here a first eccentric cam has a first axis of rotation and a second eccentric cam has a second axis of rotation, the two being offset in relation to one another. Here the first angular position and the second angular position are each offset by 45 degrees in relation to a semi-major axis that connects the first axis of rotation and the second axis of rotation.

In particular, the transmitter can be connected to the input shaft, for example by being pressed onto the input shaft. The output shaft can be connected to the inner gear or one of the two outer gears. If the outer gears are connected to a motor housing, the output shaft is then connected to the inner gear.

According to a further embodiment the transmitter is connected to the output shaft and the input shaft is connected to the inner gear or the outer gear.

The pin ring or pin-retaining ring can in particular be constructed such that the pin-retaining ring comprises radially inwardly open channels arranged in axial direction to receive the pins that are arranged on an inside of the pin-retaining ring.

Furthermore, the harmonic pin ring gear system can comprise a second pin ring arranged in radial direction in relation to the inner ring that fulfils the function of a support ring. Here an end region of the pins is arranged between the second pin ring and the inner ring.

Furthermore, the harmonic pin ring gear system can comprise a middle pin ring, wherein a middle region of the pin abuts the middle pin ring and the outer gear has a channel in which the middle pin ring runs.

The inner gear can also be constructed in several parts with the inner gear being split in axial direction and having an inner gear holder fixed to the inner gear. The inner gear holder is supported on an inner gear roller bearing that is in turn supported radially inwards on a gear housing, wherein the inner gear and the inner gear holder encompass an outer ring of the inner gear roller bearing.

The output shaft can in particular be designed as a hollow driven shaft and have a freewheel, wherein the freewheel is arranged between the hollow driven shaft and an inner region of the inner gear.

Moreover, according to one of the preceding claims, the harmonic pin ring gear system can comprise a crankshaft and a crankshaft freewheel in particular to induce a pedal force. The crankshaft is arranged concentrically in relation to the hollow driven shaft inside the hollow driven shaft, wherein the crankshaft freewheel is arranged between the crankshaft and the hollow driven shaft.

To provide improved lateral support for the pins, the harmonic pin ring gear system can comprise a first thrust washer and a second thrust washer, wherein the first thrust washer is arranged adjacent to a first axial lateral face or end face of the pins and the second thrust washer is arranged adjacent to an opposite second axial lateral face or end face of the pins.

Improved adjustment of the harmonic pin ring gear system to achieve good load compensation of the pin ring, in particular in a gear system with two outer gears, can be achieved by the outer gears being held in their positions relative to the central axis of the gear system by a frictional connection only and having clear and intentional radial play relative to this position when they are loose, i.e. before fixing screws are tightened to press the outer gears against the gear housing.

According to a further embodiment the drive shaft for the transmitter, which can in particular take the form of a rotor shaft, is mounted on one side in the inner gear which is in turn mounted in the housing or a housing cover of the housing. A press fit between a mounting of the inner gear and a mounting of the drive shaft for transmitters in the inner gear results in less displacement of the external toothing of the inner gear. The press fit also enables the use of a freewheel with no axial guide, for example a ball bearing-mounted freewheel between the inner gear and a driven shaft. The driven shaft can in particular be mounted radially inside the inner gear.

Furthermore, this description discloses a harmonic pin ring drive comprising a gear unit with one of the harmonic pin ring gear systems described above. The harmonic pin ring drive also comprises a motor unit, wherein a rotor shaft of a motor of the motor unit is connected mechanically to the cam disk of the gear unit, for example by pressing the cam disk onto the rotor shaft. In particular the motor can be designed as an internal rotor motor in which the circumference of a stator can abut a housing.

According to a further embodiment a driven shaft is provided that is connected to the inner gear via a freewheel. The driven shaft is mounted on two bearings, wherein the motor is provided between the two bearings of the drive shaft. In particular, both a motor unit with stator and rotor and a gear unit with the outer gears, the inner gear and the transmitter can be provided between the two bearings. This results in an increased supporting width and lower transmitter displacement, thereby achieving greater pin durability.

According to a further embodiment the driven shaft is designed in two parts. Here a support shaft is fixed to the driven shaft, for example by placing it on a shoulder of the driven shaft or flanging it to the driven shaft. This makes it possible to increase the supporting width of the mounting of the driven shaft. The support shaft can be a thin sleeve if the output torque runs more through the driven shaft and less through the support shaft.

For example, a motor freewheel can be arranged between the output shaft or a hollow shaft region of the inner gear and the driven shaft such that the torque is generated at a driven side and components that use the torque can also be affixed on the driven side while the support shaft is affixed to an opposite drive side.

According to a further embodiment a pedal bearing shaft is arranged in the driven shaft, wherein one or more freewheels can be arranged between the pedal bearing shaft and the driven shaft.

A torque sensor is arranged in the region between the driven shaft and the pedal bearing shaft, wherein the driven shaft is designed such that the torque sensor is shielded from electromagnetic radiation of the stator. In particular, the driven shaft can cover a large part of the axial length of a coil body of the torque sensor. The driven shaft thus forms something like a Faraday cage, wherein a rotor shaft in which the driven shaft is arranged, provides additional shielding against the stator as required.

This applies in particular if an internal rotor motor is used in which the stator—and also the rotor—are arranged radially outside the driven shaft.

Furthermore this description also discloses a motor vehicle with a harmonic pin ring drive as described above, wherein a drive gear of the motor vehicle is connected to the output shaft of the harmonic pin ring drive. The motor vehicle can, in particular, be an electric two-wheeler or an electric three- or four-wheeler such as, for example, an electrically driven auto-rickshaw.

In a further aspect this description discloses a pin ring arrangement with a multiplicity of pins, a pin ring to hold the pins and a transmitter to exert a radially outward force on the pins, wherein the transmitter is arranged inside the pin ring and the pins lie at least predominantly on an outer circumference of the transmitter.

According to a first embodiment the transmitter comprises a an eccentric cam arranged eccentrically in relation to an axis of rotation of the transmitter. According to a further embodiment of the pin ring arrangement the transmitter comprises a second eccentric cam arranged eccentrically in relation to an axis of rotation of the transmitter. According to a further embodiment the transmitter comprises an oval cam disk and a thin-section ball bearing that lies on the oval cam disk, wherein the pins lie on an outer ring of the thin-section ball bearing.

A further aspect of the application describes a harmonic pin ring gear system with an input shaft and an output shaft. The harmonic pin ring gear system comprises an outer gear with internal toothing and an inner gear with external toothing, wherein the inner gear is arranged concentrically to the outer gear and at least partially inside the outer gear in axial direction.

A drive means extends between the outer gear and the inner gear. The drive means comprises a pin ring formed as one part in circumferential direction and a multiplicity of pins that protrude laterally in axial direction from the pin ring. Due to the design of the pin ring as one part in circumferential direction, instead of being made up of individual members connected together by joints, as disclosed in U.S. Pat. No. 2,210,240, for example, a construction as one part in circumferential direction according to this description can be quieter running and sustain less wear. The pin ring according to this description can, however, be constructed in several parts in radial direction. For example, it can be constructed out of different layers connected together as disclosed in WO 2012/046216.

Moreover, the gear system comprises a rotary transmitter for lifting the pins of the drive means off the external toothing of the inner gear and pressing the drive means into the internal toothing of the outer gear. Here in a first axial region a radial force flow runs in a straight direction from the transmitter via at least one pin to the internal toothing of the outer gear and in a second axial region a radial force flow runs in a straight direction from at least one pin to the external toothing of the inner gear. As explained below in relation to FIG. 15, this prevents or reduces any tilting or bending torque on the pins.

A first radial force flow according to this description can, for example, be realised by locating a radially contiguous region of the transmitter, or a radially contiguous region of the transmitter and the pin ring that is in contact with the pins, at least partially inside the outer gear in axial direction. A first radial force flow according to this description can, for example, be realised by locating a contiguous radial region of the inner gear that is in contact with the pins at least partially inside the outer gear in axial direction.

According to this description a radial force flow can, in particular, run in a straight direction from the internal toothing of the outer ring via at least one pin to the external toothing of the inner gear. Thus a force acting against the force on the inner gear can be absorbed by the outer gear in radial direction. In this way the bending torque on the pins can also be reduced.

The pin ring can be located on an outer side of the outer gear in axial direction, for example to provide sufficient space for the pin ring.

In the case of a deformable transmitter, in particular, that has an oval cam disk, for example, the drive means can abut the entire outer circumference of the transmitter, thereby achieving effective force transmission.

In one configuration this is achieved by the transmitter having an oval-shaped cam disk and a flexible thin-section roller bearing, wherein the flexible thin-section roller bearing lies on the oval cam disk and the pins lie on an outer ring of the flexible thin-section roller bearing.

In a transmitter configuration comprising an eccentric cam arrangement it is possible to configure the eccentric cam in such a way that at least most of the drive means abuts an outer circumference of the transmitter. This is particularly true of the double eccentric cam shown in FIGS. 7 and 8. Here there are only two regions in which the drive means does not abut the outer circumference of the transmitter. These two regions extend in the region of two angular positions that are offset by 45 degrees in relation to a semi-major axis of the double eccentric cam connecting the two axes of rotation of the two eccentric cams. This is particularly clear from FIG. 8.

If both eccentric cams in the double eccentric cam comprise a circular disk, it is advantageous for these two circular disks to be made as large as possible to achieve the largest possible drive means support region. To achieve this it is in turn advantageous for the two eccentric cams of the double eccentric cam to be arranged one behind the other in axial direction as shown in FIGS. 7 and 8.

In geometrical terms such an arrangement, as seen in the case of the double eccentric cam, for example, can be characterised by the fact that the drive means abuts the circumference of the transmitter except in a first region extending about a first angular position and a second region extending about a second angular position, wherein the first angular position is offset by 180 degrees in relation to the second angular position.

In particular, the harmonic pin ring gear system can comprise a double eccentric cam with a first eccentric cam having a first axis of rotation and a second eccentric cam having a second axis of rotation. Here the first angular position and the second angular position are offset by 45 degrees in relation to a semi-major axis connecting the first axis of rotation and the second axis of rotation.

According to a first configuration that is particularly suitable for reducing gears, the transmitter is connected to the input shaft and the output shaft is connected to the inner gear or the outer gear. Here a mechanism can also be provided for switching the connection to the inner or outer gear, for example for a change of direction for a reverse gear.

According to a second configuration the transmitter is connected to the output shaft and the input shaft is connected to the inner gear or the outer gear.

According to a first configuration of the transmitter, the transmitter comprises an oval-shaped cam disk and a flexible thin-section roller bearing, wherein the flexible thin-section roller bearing lies on the oval cam disk and the pins lie on an outer ring of the flexible thin-section roller bearing.

According to a further configuration of the transmitter, the transmitter comprises at least one eccentric cam disk and the pins lie on an outer circumference of the transmitter.

To receive the pins and to guarantee a distance between the pins in circumferential direction, the pin ring can comprise channels arranged in axial direction to receive the pins that are arranged on an inside of the pin ring.

To improve stability, the harmonic pin ring gear system can have a second pin ring arranged at least partially opposite the inner ring in radial direction, wherein an end region of the pins is arranged between the second pin ring and the inner ring and the outer gear is arranged between the first pin ring and the second pin ring in axial direction.

Furthermore, the harmonic pin ring gear system can also have a middle pin ring, wherein a middle region of the pins abuts the middle pin ring and the outer gear has a channel in which the middle pin ring runs.

To improve support for the inner gear, the inner gear can comprise an inner gear holder that is fixed, in particular screwed, to the inner gear, wherein an inner gear roller bearing supported radially inwards on a gear housing is provided and the inner gear and the inner gear holder encompass an outer ring of the inner gear roller bearing.

In particular, the output shaft can be designed as a hollow driven shaft and the gear system can have a freewheel arranged between the hollow driven shaft and an inner region of the inner gear.

Furthermore, in a design for an electrically driven bicycle, for example, the harmonic pin ring gear system can comprise a crankshaft and a crankshaft freewheel, wherein the crankshaft is arranged concentrically to the hollow driven shaft inside the hollow driven shaft and the crankshaft freewheel is arranged between the crankshaft and the hollow driven shaft.

To improve the running of the pins, the harmonic pin ring gear system can comprise a first thrust washer and a second thrust washer, wherein the first thrust washer is arranged adjacent to a first axial lateral face of the pins and the second thrust washer is arranged adjacent to an opposite second axial lateral face of the pins.

Moreover, this description discloses a harmonic pin ring drive comprising a gear unit, one of the aforementioned harmonic pin ring gear systems and a motor unit, wherein a rotor shaft of a motor of the motor unit is connected mechanically to the cam disk of the gear unit.

In particular, the motor can be designed as an internal rotor motor.

Furthermore, this description discloses a 2-, 3- or multi-wheeled motor vehicle with the harmonic pin ring drive, wherein a drive gear of the motor vehicle is connected to the output shaft of the harmonic pin ring drive.

In a further aspect this description discloses a pin ring arrangement with a multiplicity of pins, a pin ring for holding the pins and a transmitter for exerting a radially outward force on the pins, wherein the transmitter is arranged inside the pin ring and the pins lie at least predominantly on an outer circumference of the transmitter.

In a first configuration the transmitter can have an eccentric cam that is arranged eccentrically to an axis of rotation of the transmitter. Here it is advantageous for the chosen eccentric cam to be as large as possible in the sense that a radius of the eccentric cam is only slightly different to a radius of the inner gear.

To further increase the seize of a support region of the pin on the transmitter the pin ring arrangement can comprise a second eccentric cam that is arranged eccentrically to an axis of rotation of the transmitter and is also chosen to be as large as possible.

In a second configuration, the transmitter can comprise an oval cam disk and a thin-section ball bearing that lies on the oval cam disk, wherein the pins lie on an outer ring of the thin-section ball bearing. Here the oval cam disk can, in particular, be dimensioned such that a semi-major axis and a semi-minor axis differ only slightly from a radius of the inner gear.

This description also discloses a harmonic pin ring gear system comprising at least one inner ring with external toothing and at least one outer ring with internal toothing and a pin ring that has pins with a circular cross section and a rotor with a transmitter for drawing the pins of the pin ring into the teeth of the outer ring and into the teeth of the inner ring. The inner ring, the rotor and the outer ring are arranged concentrically to one another and the transmitter is arranged inside the pin ring.

The transmitter and the pin ring are arranged between the inner ring and the outer ring, wherein the transmitter deforms the pin ring in such a manner that the outer ring and the inner ring rotate relative to one another, wherein the pins of the pin ring are pressed alternately into the teeth of the inner ring and the teeth of the outer ring. The shape of the teeth of the outer ring and the shape of the teeth of the inner ring are essentially determined by the envelope of the moving pins, wherein each of the pins meshes with the internal toothing of the outer gear or the external toothing of the inner gear.

Moreover, the harmonic pin ring gear system can comprise a 3-row structure with a first gear wheel pair comprising an inner ring and an outer ring and a second gear wheel pair comprising an inner ring and an outer ring, wherein the first and second gear wheel pairs are arranged in different first and second planes and a transmitter holder comprising a transmitter in a third plane is arranged between the plane of the first gear wheel pair and the plane of the second gear wheel pair. Here the transmitter holder can, in particular, be a rotor and the transmitter can, in particular, be an elliptically shaped rotor flange This harmonic pin ring gear system is particularly suited to the transmission of large torques as a result of various characteristics including the size of the pins, the tooth shape and the distance between the inner and outer gears.

The distance between the inner and outer gears and the pin size, in particular, are dimensioned such that the apex of a pin centre point of a pin as the pin moves from one tooth base into an adjacent tooth base of the toothing of the inner or outer ring lies essentially on a pitch circle of the opposite toothing. This means that the pin re-engages in the tooth base of the opposite teething when the pin is located on an apex of the pin trajectory between the two tooth bases of one set of toothing.

To receive the pins, which have a circular cross section, the cross section of the tooth bases can be shaped like a sector of a circle and, in particular, be semi-circular. According to one embodiment the tooth flanks run into the tooth base perpendicular to the pitch circle of the toothing. The steep tooth flanks provide good lateral hold for torque transmission. In addition, with a semi-circular tooth base there is therefore no buckling.

In particular, the gear system can be formed such that the pin trajectory of a pin centre point of a pin as the pin moves from one tooth base into an adjacent tooth base is determined by a section of an ellipse, in particular a half ellipse, wherein the section of an ellipse runs from a semi-minor axis to an opposite semi-minor axis of the ellipse. This path shape results in the tooth shape of toothing determined by the envelope of the pins as described above.

In a further embodiment the pin trajectory of a pin centre point of a pin as the pin moves from one tooth base into an adjacent tooth base is determined by a section of a sine-overlaid circular shape, in particular by half a sine-overlaid circular shape running from a semi-minor axis to an opposite semi-axis of the sine-overlaid circular shape.

In a further embodiment the pin trajectory of a pin centre point of a pin as the pin moves from one tooth base into an adjacent tooth base is determined essentially by a shape of the transmitter compressed along an angular coordinate, wherein the compression factor can be, in particular, Z/2, where Z is the number of teeth. Here the angular coordinate is expressed relative to a centre point of the transmitter/rotor in relation to a polar coordinate representation.

Moreover, the root circle of the teeth of the inner gear can essentially be positioned twice the circumference of the pins away from the root circle of the teeth of the outer gear, thereby guaranteeing good pin engagement in the toothing.

Moreover, this application discloses a inner ring with external toothing suitable for a harmonic pin ring gear system that has the following characteristics. The gear system comprises a pin ring with pins that have a circular cross section and rotor with a transmitter for drawing the pins of the pin ring into the teeth of the inner ring, wherein the inner ring and the rotor are arranged concentrically to one another. The transmitter is arranged inside the pin ring, wherein the transmitter deforms the pin ring such that the inner ring rotates relative to an outer ring arranged concentrically to the inner ring.

The inner ring comprises tooth bases with a profile in the form of a segment of a circle that are arranged at regular distances and teeth with a symmetrical profile that are arranged between the tooth bases, wherein the shape of the teeth is determined essentially by the envelope of the moving pins. Here the distance between the surface of the tooth and the envelope should not be below a predetermined distance and the tooth shape therefore essentially follows the envelope.

In particular, the profile of the tooth bases of the inner ring can be semi-circular in shape and the tooth flanks can run into the tooth base perpendicular to the pitch circle of the toothing.

Similarly, this application discloses an outer ring with external toothing suitable for a harmonic pin ring gear system that has the following characteristics. The gear system comprises a pin ring with pins that have a circular cross section and a rotor with a transmitter for drawing the pins of the pin ring into the teeth of the inner ring. The outer ring and the rotor are arranged concentrically to one another and the transmitter is arranged inside the pin ring, wherein the transmitter deforms the pin ring such that the outer ring rotates relative to an inner ring arranged concentrically to the outer ring.

The outer ring comprises tooth bases with a profile in the form of a segment of a circle that are arranged at regular distances and teeth with a symmetrical profile that are arranged between the tooth bases, wherein the shape of the teeth is essentially determined by the envelope of the moving pins.

In particular, the profile of the tooth bases can be semi-circular in shape and the tooth flanks can run into the tooth base perpendicular to the pitch circle of the toothing.

According to another one of the embodiments, a harmonic pin ring gear system can comprise an input shaft and an output shaft, wherein said harmonic pin ring gear system has the following features: two outer gears, each with internal toothing, a single inner gear with external toothing arranged concentrically to a first outer gear and inside said first outer gear in axial direction, and a drive means extending between the two outer gears and the inner gear comprising a pin ring formed as one part in circumferential direction and a multiplicity of pins that protrude laterally in axial direction from the pin ring, a rotary transmitter for lifting the drive means off the external toothing of the inner gear and pressing the drive means into the internal toothing of the outer gear, wherein the input shaft is mounted on one side in the inner gear, the inner gear is mounted in an inner gear ball bearing, and the inner gear ball bearing is mounted in a housing cover.

The Harmonic Pin Ring Drive (HPRD) according to this application is a special gear system of rotationally symmetrical construction characterised in particular by the following features:
 very high power density requiring only a small installation space
 rigidity
 very little play
 very large bandwidth in relation to reduction and transmission ratios
 the possibility of a hollow shaft design.

These gear systems can produce both single- and multistep speed changes and can be used as differential gears. Moreover, changes in direction of rotation and shifting are also possible.

The object of the application is explained in further detail below with reference to the following figures.

FIG. 1 shows an exploded view of an HPRD,
FIG. 2 shows a view of the gear system in FIG. 1,
FIG. 3 shows a cross section through the gear system in FIG. 1,
FIG. 4 shows a side view of a pin ring and an enlargement of a section thereof,
FIG. 5 shows a pin raceway of an HPRD,
FIG. 6 shows an enlarged section of FIG. 5,
FIG. 7 shows a cross section through an HPRD with deflection rollers,
FIG. 8 shows a view of the HPRD with deflection rollers,
FIG. 9 shows a first tooth geometry of inner toothing,
FIG. 10 shows a first tooth geometry of outer toothing,
FIG. 11 shows a sequence of movement of the pins,
FIG. 12 shows a pin trajectory according to a second tooth geometry of a gearwheel,
FIG. 13 shows the second tooth geometry of the gearwheel, and
FIG. 14 illustrates a method for determining a gear geometry,
FIG. 15 shows a cross section through a harmonic pin ring gear system in accordance with a first embodiment,
FIG. 16 shows an enlargement of a section marked in FIG. 15,
FIG. 17 shows the course of the plane of intersection in FIGS. 18 and 19,
FIG. 18 shows a first sectional view through the gear system in FIG. 15,
FIG. 19 shows a second sectional view through the gear system in FIG. 15,
FIG. 20 shows the course of the plane of intersection in FIG. 21,
FIG. 21 shows a third sectional view through the gear system in FIG. 15,
FIG. 22 shows a force flow through the gear system in FIG. 15,
FIG. 23 shows a section of a further configuration based on the gear system in FIG. 15,
FIG. 24 shows a section of a further configuration based on the gear system in FIG. 15,
FIG. 25 shows a section of a further configuration based on the gear system in FIG. 15,
FIG. 26 shows a sectional view of a harmonic pin ring gear system,
FIG. 27 shows an exploded view of a reduction gear region of the harmonic pin ring gear system,
FIG. 28 shows a sectional view of a rotor assembly of the harmonic pin ring gear system,
FIG. 29 shows a sectional drawing of the reduction gear region in FIG. 27,
FIG. 30 shows an exploded view of an inner region of the harmonic pin ring gear system, and
FIG. 31 shows a sectional view of a further harmonic pin ring gear system with a space for installing a change-speed gear system,
FIG. 32 shows the harmonic pin ring gear system in FIG. 31 with a planetary gear with driven sun wheel and follower hollow wheel,
FIG. 33 shows the harmonic pin ring gear system in FIG. 31 with a planetary gear with driven sun wheel and follower planetary carrier,
FIG. 34 shows the harmonic pin ring gear system in FIG. 31 with a planetary gear with driven hollow wheel and follower sun wheel,
FIG. 35 shows the harmonic pin ring gear system in FIG. 31 with a planetary gear with driven hollow wheel and follower planetary carrier, FIG. 36 shows the harmonic pin ring gear system in FIG. 31 with a planetary gear with driven planetary carrier and follower sun wheel, FIG. 37 shows the harmonic pin ring gear system in FIG. 31 with a planetary gear with driven planetary carrier and follower hollow wheel, FIG. 38 shows the harmonic pin ring gear system in FIG. 31 with a planetary gear and a derailleur gear system, and FIG. 39 shows a further harmonic pin ring gear system with a linear cam gear system.

According to this description, a transmitter that draws a traction means into an outer gear or outer ring or inner gear or inner ring can, for example, take the form of a flange of a rotor or a pair of deflection rollers. The outer gear takes the form of one or more rings or disks with outer toothing configured as internal toothing. The inner gear can take the form of one or more rings or disks with an inner toothing configured as external toothing and the traction means takes the form of a pin ring.

In the following, "drive side" refers to the side from which the rotor 13 is driven and "driven side" means the side opposite the drive side.

FIG. 1 shows a Harmonic Pin Ring Drive (HPRD) 10 according to the application. The HPRD comprises a rotor 13 supported on a housing by a ball bearing that is not shown here. An outer ring 8 of a cylindrical housing part 9 arranged concentrically outside the rotor 13 comprises a first outer toothing 6 formed as internal toothing on a first side. A second outer toothing 6' formed as internal toothing is formed on a second outer ring that is inserted into the cylindrical housing part 9 on a side opposite the first side.

First inner toothing 5 configured as external toothing is formed on a periphery of an inner ring 7 and arranged concentrically inside the first outer toothing 6. Second inner toothing 5' configured as external toothing is formed on a periphery of a second inner ring 7' and arranged concentrically inside the second outer toothing 6' in a similar manner.

The inner toothing 5, 5' and the outer toothing 6, 6' are arranged concentrically to a central axis, wherein the inner toothing 5, 5' is able to rotate about the central axis. In other embodiments the outer toothing 6, 6' and/or the outer and the inner toothing are able to rotate about the central axis depending on which set of toothing is the driven toothing or, in the case of transmission, the drive toothing.

A flexible thin-section ball bearing 2 is fixed onto a specially formed flange 4 of the rotor 13. The flange can be formed as an oval or as a sine-overlaid circular shape, for example. A flexible pin-retaining ring 3 is arranged between the flexible thin-section ball bearing 2 and the outer toothing 6, 6'. The flexible pin-retaining ring 3 comprises grooves on an inside to receive pins 1 that are arranged equidistantly on the pin-retaining ring 3 and held rigidly by the pin-retaining ring 3.

FIG. 2 shows a view of the HPRD 10 from a driven side and FIG. 3 shows a cross section through the HPRD 10 along the cross-sectional line A-A.

The first inner toothing 5 is supported on the rotor 13 by a ball bearing that is not shown in FIGS. 2 and 3 for the sake of simplicity. The second inner toothing 5' is fixed to a driven shaft, also not shown here, that is supported outwards by ball bearings. The outer toothing 6, 6' is fixed in a stationary manner to a housing that is not shown here.

According to another embodiment the inner toothing 5, 5' is stationary while the outer toothing 6, 6' forms a follower. According to a further embodiment both the inner toothing 5, 5' and the outer toothing 6, 6' form followers.

FIG. 4 shows the flexible ball bearing 2 and the pin-retaining ring 3 with the pins 1. The pin-retaining ring together with the pins 1 is also referred to as a pin ring. The flexible thin-section ball bearing has a flexible inner ring 14 and a flexible outer ring 23 between which balls 26 are arranged.

The pins 1 are placed in receiving grooves 41 of the pin-retaining rings 3 and are held against the thin-section ball bearing 2 by the contact pressure of the pin-retaining ring 3. The components can be assembled manually, for example, by first placing the pin-retaining ring around the thin-section ball bearing 2, then inserting pins 1 in widely separated positions, thereby defining the distance between the thin-section ball bearing 2 and the pin-retaining ring 3. The remaining pins are then inserted into the intermediate spaces.

FIGS. 7 and 8 illustrate a pin raceway 10 and resulting relationships. A distinction must be made between the pin raceway 10 and the pin trajectory which indicates the movement of an individual pin in a previously defined reference system. For a reference system that rotates together with the rotor 4, the pin trajectory runs along the pin raceway 10. For reasons of clarity FIGS. 7 and 8 do not show any toothing.

The pin raceway 10 is determined by imagining a path through the central axes of all the pins (2). This path has a small axis 11 of length $2b$ and a large axis 12 of length $2a$ offset at right angles. If the transmitter is elliptical in shape, a is the length of the semi-minor axis and b is the length of the semi-major axis of the ellipse.

The small axis and the large axis form the basis of the pitch circles of the gearwheels 5, 5' and 6, 6', wherein the small axis corresponds to a diameter of a pitch circle of the inner toothing 5, 5' and the large axis corresponds to a diameter of a pitch circle of the outer toothing 6. In the HPRD the pitch circle of a set of toothing runs through the flank lines that delimit the tooth flanks from the tooth base. Assuming given tooth shapes for the gearwheels 5, 5' and 6, 6', it is now possible to describe the gear function.

If, for example, the internal toothing 5, 5' is held static and the rotor 13 is rotated, a wave movement of the arrangement of pins 1 is created. This results in a relative movement of the outer toothing 6, 6' which rotates reduced in the same direction of rotation as the rotor 13. If the outer toothing 6, 6' is held static, the inner toothing 5, 5' rotates reduced in the opposite direction to the rotor 13.

The total number of pins 1 must be two more than the number of teeth of the inner toothing 5, 5' or two less than the number of teeth of the outer toothing 6, 6'. The difference in the number of teeth in gearwheels 5, 5' and 6, 6' is therefore four. In principle, tooth number differences of multiples of four would also be possible.

In equations (1) to (3) below, R refers to the period of revolution of the rotor 1, F to the period of revolution of the flex output gear 7, A to the period of revolution of the outer gear, I to the period of revolution of the inner gear, Zi to the number of teeth on the internal toothing 5, 5' and Za to the number of teeth on the outer toothing 6, 6'. According to equations (1) to (3) the speed reduction ratios between the individual components are as follows:

If the inner gear is held stationary, then $$A/R=Za/(Za-Zi) \text{ or } F/R=2*(Za/(Za-Zi)) \quad (1)$$

Here all the elements rotate in the same direction.

If the outer gear is held stationary, then $$I/R=Zi/(Za-Zi) \text{ or } F/R=2*(Zi/(Za-Zi)) \quad (2)$$

Here the inner gear and the flex-ring rotate in the opposite direction to the rotor.

If the flex-ring is held stationary, then $$A/R=2*(Za/(Za-Zi)) \text{ or } I/R=2*(Zi/(Za-Zi)) \quad (3)$$

Here the inner gear rotates in the same direction as and the outer gear in the opposite direction to the rotor.

There follows an example calculation of the possible reduction steps, wherein in this case the rotor 13 always sets the input speed. The number of teeth on the internal toothing is 156 and the number of teeth on the external toothing is 160, giving a total of 158 pins.

If the inner gear is held stationary, then $$A/R=160/(160-156)=40 \text{ or } F/R=2*(160/(160-156))=80.$$

If the outer gear is held stationary, then $$I/R=156/(160-156)=39 \text{ or } F/R=2*(156/(160-156))=78.$$

If the flex-ring is held stationary, then $$A/R=2*(160/(160-156))=80 \text{ or } I/R=2*(156/(160-156))=78.$$

There are various possible ways of defining the pin raceway. In principle, as described above, each pin raceway has a small axis x and a large axis y offset at right angles, the ratio between them corresponding to the number of teeth on the gearwheels 5, 5' and 6, 6'.

Thus $x/y=Zi/Za$.

Moreover, the pitch of the arrangement of pins 1 in the pin-retaining ring 3 must correspond to the pitch of the gearwheels 5, 5' and 6, 6'. Thus the pin raceway is also defined by its arc length. For the arc length s of any pin raceway: s=number of pins 1*pitch.

The circumference of the pin raceway less the circumference of a pin 1 must therefore correspond exactly to the circumference of the ball bearing 2.

Three raceway variants are described below.

1. The elliptical raceway is defined by its two semi-axes, wherein the semi-minor axis corresponds to the pitch circle radius of the internal toothing 5, 5' and the semi-major axis corresponds to the pitch circle radius of the external toothing 6, 6'.

2. The sine-overlaid circular shape is very similar to the elliptical raceway and differs from it only very slightly in case of small differences in axis. It is defined as follows. The central axis of a small circle with a diameter according to the half value of the difference between the large axis and the small axis revolves on the large circular path of the central circle between the two pitch circles of toothing 5, 5' and toothing 6, 6' and in so doing rotates twice about its own axis while revolving about the central axis. Projecting a point on the small circle to derive a path results in the sine-overlaid circular shape.

3. The double eccentric cam raceway is a special shape that can be used, for example, where elastic deformation of the ball bearings 2 is not desired or impossible due to the difference between the two axes of the pin raceway. In such a case the arrangement of the pins 1 is deflected by two deflection rollers from the pitch circle of the internal toothing 5, 5' into the pitch circle of the external toothing 6, 6'. The axes of rotation of the two deflection rollers are located symmetrically to the small axis on the large axis in relation to a notional ellipse.

FIGS. 7 and 8 show a view of two embodiments of an HPRD with deflection rollers 15, 15'. In FIG. 7 the plane of intersection is offset rearwards in the right half to show the toothing 5', 6'.

FIG. 8 also shows a ball bearing 16 on which the deflection roller 15 is mounted and a ball bearing 17 on which a disk 18 with the internal toothing 5 is mounted. It also shows elongated adjusting slots 19. The deflection rollers 15, 15' can be tensioned by moving them along the adjusting slots 19.

The pin raceway 10 abuts a pitch circle of the inner toothing 5 at an inner contact region 20 and the pin raceway 10 abuts a pitch circle of the toothing 6 at an outer contact region. In an intermediate region 22 the pin raceway 10 is approximately straight. In total there are two inner contact regions 20, two outer contact regions 21 and four intermediate regions such that the pin raceway comprises four regions in the form of a segment of a circle and four straight regions. This pin raceway 10 is also referred to as a double eccentric cam pin raceway 10.

The deflection rollers 15, 15' are mounted such that they are able to rotate about an axis of rotation through their centres. Instead of the flexible ball bearing described above, it is the bearing of the deflection rollers that takes up the slack of the pin ring in relation to the rotor 13. The axes of rotation of the deflection rollers 15, 15' are arranged eccentrically in relation to the central axis. FIG. 8 shows the eccentric offset d.

It is advantageous to make the radius of the deflection rollers as large as possible in order to achieve a large contact surface with the pin ring and so even force distribution. According to the application, the deflection rollers can be flat in construction and have recesses to keep the weight of the deflection rollers low.

Instead of the deflection rollers, two blades with rollers on the surface of the blades can also be used, wherein the blade is fixed rigidly to the rotor 13. In particular, the blade can be formed such that a contact surface extends between the blade and the pin ring over several pins.

Since in the HPRD the transmission of power is effected by pins 2 with circular cross sections and they rotate slightly about their central axes as they move along the orbit determined by the rotor flange 4, the distance between the tangential abutting face at the tooth of the gearwheels 5, 5' and 6, 6' and the axis of rotation of the pin 1 is always constant.

Thus it is possible to design or calculate the tooth shape independently of the selected pin raceway such that all the pins 1 are constantly in mesh with a tooth of at least one of the gearwheels 5, 5' and 6, 6' and all the torque can be distributed between all the pins 2. As a result, the contact pressure at all the pins 2 and the gearwheels 5 and 6 is very low. This in turn allows high efficiency, low wear and very good power density and thus an extremely compact design.

FIGS. 9 and 10 show a configuration of the tooth geometries for the inner toothing and the outer toothing according to the application.

The tooth geometry results from the sequence of movement of a pin 1 within a reference system in which the gearwheel is at rest. The tooth geometry is the contour 25 of the moving centre point of the pin 1 offset about the radius value of pin 1 which starts here, using the example of the internal toothing 5, 5', at the centre point of a tooth base 24. The centre point of a tooth base 24 lies at the intersection of the axis of symmetry 29 of a tooth base 24 and the pitch circle 30 of the inner toothing 5.

The pin trajectory 25 intersects exactly halfway through both the pitch circle 40 of the outer toothing 6, 6' and the line of symmetry 27 of the tooth and run, again symmetrically to the previous course to the end point, to the centre point of the adjacent tooth base 24. The tooth shape is determined by the inner envelope of the pin profile 28. Moreover, FIG. 9 also shows a tip circle 32 of the outer toothing 6 to illustrate the distance between the teeth.

FIG. 10 shows the same configuration of the teeth of the outer toothing 6. Elements corresponding to FIG. 9 are denoted by the same reference numeral plus 10. For example, the contour is denoted by reference numeral 35.

According to this application, a design of an HPRD comprises the following steps, which are also shown in FIG. 14.

1) Definition of the desired reduction, for example 1:36.
2) Definition of the components to receive the output speed
    Selection of the external toothing 6, 6'. In this case it may be one of the gearwheels 5, 5' or 6, 6'; in a HPRD-MULTI it may also be a flexible output gear 7.
3) Determination of the number of teeth on the inner toothing 5, 5' and the outer toothing 6, 6'
    Result according to the reduction formulae:

$Z_i=140$ and $Z_a=144$.

4) Determination of the number of pins 1
    Result according to the reduction formula: 142 pins 1.
5) Definition of the diameter of the pins 1
    Example: Ø 2 mm.
    The dimensioning of the pin diameter determines the transmittable torques which are in turn dependent on the choice of materials and the toothing widths. The dimensions of all the components in the gear system must be dimensioned and matched with one another depending on the requirements.
6) Definition of the pitch of the gearwheels 5, 5' and 6, 6' and the pin-retaining ring
    Example: 2.8 mm.
    The pitch in an HPRD is usually the diameter of the pin 1 multiplied by the pitch factor 1.4±7%, so here 2 mm×1.4=2.8 mm. The number and diameter of the pins 1 give a defined pin raceway length dependent on the chosen pitch which must fit the outer circumference of the ball bearings 2 exactly.
7) Calculation of the arc length s of the raceway of the pin arrangement 1 as described above.
    Calculation: s=number of pins (1)*pitch, s=142*2.8 mm 20=397.6 mm.
8) Definition of the raceway variants of the pin arrangement 1
    Example: ellipse.
9) Calculation of the raceway geometry of the pin arrangement 1
    Here an elliptical geometry must be calculated with a semi-axis ratio corresponding to the ratio of the number of teeth of the gearwheels 5, 5' and 6, 6' and a circumference equal to the arc length s=397.6 mm calculated in 7).

Determination of the geometry of the components. Once the raceway geometry has been defined, the geometry of all the other parts can be derived from it.

10) Geometry of the ball bearing 2
    The circumference of the ball bearing 2 corresponds to the inner envelope of the pins 1 arranged evenly on the calculated raceway geometry. The rest of the ball bearing 2, in particular in relation to wall thicknesses of and the materials chosen for the bearing inner and outer ring must be designed such that it is sufficiently stable in terms of elasticity and variation in stress over the required lifetime.
11) Geometry of the rotor 13
    The initial geometry at the rotor flange 4 is the corresponding inwardly offset geometry dependent on the cross section of the ball bearing 2 and the diameter of the pin—here, for example, the calculated elliptical raceway geometry, wherein the diameter of the pin 1 and half the difference between the outer and inner diameters of the ball bearing 1 must be subtracted from the values of the semi-axes.
12) Geometry of the pin-retaining ring 3
    The pin-retaining ring 3 must be designed such that it keeps all the pins 1 constantly distributed equally tangentially on the outer ring of the ball bearing 2. The rest of the pin-retaining ring 3, in particular the wall thickness and choice of materials, must be designed such that they are sufficiently stable in terms of elasticity and variation in stress over the required lifetime.
13) Geometry of the gearwheels 5, 5' and 6, 6'
    The nominal tooth shapes of the gearwheels 5, 5' and 6, 6' result from the corresponding envelopes after the pins 1 have rolled through according to step 7) above.

The tooth shape can be determined from the pin trajectory of the individual pins using the main normal vector of the accompanying tripod. A tangential vector to the path is given by:

$$\frac{d\vec{x}}{ds} = \frac{d\vec{x}}{d\varphi} * \frac{d\varphi}{ds} = \left( r'(\varphi) \begin{pmatrix} \cos(\varphi) \\ \sin(\varphi) \end{pmatrix} + r(\varphi) \begin{pmatrix} -\sin(\varphi) \\ \cos(\varphi) \end{pmatrix} \right) * \frac{d\varphi}{ds}$$

where s is the arc length along the path and the relevant dependence should be inserted for r(φ), so for example the equation for an ellipse or a sine-overlaid circular shape. A normal vector if on the pin trajectory pointing towards the centre of curvature is given by the cross product:

$$\vec{n} = \begin{pmatrix} 0 \\ 0 \\ 1 \end{pmatrix} \times \frac{d\vec{x}}{ds}$$

This vector must be normalised to the radius of the pin and added to a point on the pin trajectory to obtain a point on the tooth geometry or on the inner envelope of the pins from a point on the pin trajectory. The vector $\vec{n}$ normalised to 1 is also referred to as the main normal vector of the trajectory. The tooth shape is determined by the end points of the normal vectors that have been normalised to the radius of the pins. These end points describe an equidistant of the pin trajectory of the distance of the pin radius. In case of curve overlaps, the section of the curve lying furthest from the pin trajectory must be chosen.

According to a first method for determining the tooth profile illustrated in FIGS. 9 and 10, boundary conditions such as fulcrums, for example, are derived from the pin trajectory and then used to determine a pin trajectory. According to the application, it is then possible to determine the tooth shape using, for example, the main normal vector.

The tooth profile according to the application can be determined with reference to FIGS. 9 and 10 as follows. Semi-circular tooth bases with a radius corresponding to the pin radius are arranged at the distance of the pitch angle. Two fulcrums are determined by the circle centres of two adjacent tooth bases. A further fulcrum is determined by the intersection of the centre line between the adjacent tooth bases with a circumcircle about the rotor axis, wherein the circumcircle indicates the maximum deflection of the pins.

These three fulcrums can be used, for example, to set a half ellipse, a parabola or another quadratic polynomial. When using a half ellipse, the tooth shape runs perpendicularly into the tooth base to prevent buckling at this point. The long axis of the ellipse is oriented along the axis of symmetry between the tooth bases such that the fulcrums correspond to the end points of the small semi-axes and an end point of a semi-major axis.

The tooth shape shown in FIGS. 9 and 10 is particularly suitable for pins that are so large that the track covered by the circular cross sections of the pins intersects with itself, as shown in FIGS. 9 and 10. This is particularly the case if the diameter of the pins is comparable with half the pin lift. In FIG. 9 the pin lift is the distance between the pitch circle 40 of the outer toothing and the pitch circle 30 of the inner toothing.

According to this application, the teeth of the outer ring 6 are arranged so closely together that the distance between two radially opposite tooth bases is approximately twice the circumference of the pins. This means inter alia that all the pins are always in mesh. As a pin 1 moves, the pin 1 is pressed into an opposite tooth base if it is located above the point of a tooth. This situation is shown in FIG. 11. In FIG. 11 a direction of motion of the inner ring 5 is indicated schematically by an arrow 43, a direction of motion of the outer ring is indicated schematically by an arrow 42 and a direction of motion of a pin 1 from tooth base to tooth base is indicated schematically by arrows 44.

According to a further method the tooth shape is determined almost experimentally using a suitable CAD simulation program. Here a parameterised curve is predetermined for the tooth shape above a semi-circular tooth base. The parameters of this curve are then adjusted in the CAD simulation until the largest distance between a pin and the surface of a tooth as it moves from one tooth base to the next exceeds a predetermined threshold value such as 10 μm, for example. In particular, the parameters can also be adjusted such that for all pins the largest distance from a surface of a nearest tooth during a period of the CAD Simulation does not exceed a predetermined threshold value such as 10 μm, for example. This ensures that each of the pins is in contact with one of the teeth at all times.

A further tooth shape is obtained if a boundary condition is set as a result of which the pins move uniformly on the pin raceway when the drive revolves uniformly. For an oval transmitter this gives a pin trajectory as illustrated in FIG. 12 and a tooth shape as illustrated in FIG. 13. A region of an inner ring with this toothing is indicated by the reference numeral 5'. The formulae for the oval and the sine-overlaid pin raceway are given below. The radii of the envelopes, i.e. the free parameters a and b or $r_0-r_{ep}$ and $r_0+r_{ep}$ must be determined according to step 7).

For the elliptical shape, the distance between the pin raceway and the centre point at a fixed angle gives:

$$r(t) = \frac{b}{\sqrt{1 - \epsilon^2 \sin^2(\omega t - \varphi_0)}}$$

wherein the phase angle is in the argument of the cosine function and ∈ refers to the eccentricity, i.e. the quotient b/a.

ω indicates the angular velocity of the rotor 13. When measuring from outside towards the centre point r'(t)=,–r(t) should be used accordingly.

For the sine-overlaid circular shape this gives:

$r(t)=r_0-r_{ep}*\cos(2(\omega t-\varphi_0))$.

Here $r_0-r_{ep}$ is the radius of the small envelope and $r_0+r_{ep}$ the radius of the large envelope. The sine-overlaid circular shape can also be obtained by Taylor's development of the ellipse equation according to the square of the eccentricity to the first power. This gives:

$$r(t) = b*\left(1 + \frac{\epsilon^2}{4}\sin^2(\omega t - \varphi)\right) = b*\left(1 + \frac{\epsilon^2}{8} - \frac{\epsilon^2}{8}\cos(2\omega t - \varphi)\right)$$

Developments of the ellipsis equation to higher powers are also suitable for determining a transmitter shape according to the application.

The trajectory of the pins in a polar coordinate representation now results from the following consideration. If t passes through the values 0 to T, where T is the period of revolution of the rotor 13, r(t) gives the pin raceway. A Pin 1 moves from one tooth base to the next within half a revolution of the rotor 13. Thus t passes through the values 0 to T.2 in the angular pitch.

The angular velocity of the pins is a good approximation of constant. For a still more precise approximation a sinusoidally oscillating correction term must be taken into account in the angular velocity. In the teeth ratios considered above, however, it makes only a few percent difference. With an angular pitch of $\varphi_T=2\pi/Z$, where Z is the number of teeth, this gives $\varphi(t)=t/(T/2)*\varphi_T$ and thus $\bigcirc t(\varphi)=\varphi*T/2\varphi_T$.

If r(t) is determined by a function $f(\omega t-\varphi_0)$, the resulting pin trajectory r(φ) of a single pin is $$r(\varphi) = f\left(\omega*\varphi*\frac{T}{2\varphi_T} - \varphi_0\right) = f\left(\varphi*\frac{Z}{2} - \varphi_0\right)$$

or with $\varphi_0=0$ as a pin raceway compressed by a factor of Z/2.

A part of this pin trajectory and the associated movement of the pins is shown in FIG. 11 for an elliptical transmitter shape. For FIG. 12 the envelope of the pins was calculated numerically using the main normal vector. This envelope determines the tooth geometry. The units of length in FIGS. 11 and 12 are chosen in arbitrary units but the same for both axes. In these units the pin radius is larger than one in FIG. 12 and equal to one in FIG. 13.

According to this method, too, the chosen pin size results in a pointed tooth shape though the flanks of the tooth base have a gradient of less than 90 degrees.

Described below with reference to FIGS. 15 to 23 are further embodiments of gear systems that can be in used, in particular, in connection with one of the aforementioned tooth geometries in which all pins of a traction or pressure means are in contact with an inner and an outer ring.

Below the directional descriptions "axial", "radial" and "peripheral" or "along the circumference" refer to a central axis of rotation of a gear system which is also referred to as the central gear system axis. A central gear system axis is predetermined, for example, by the axis of rotation of the rotor of a motor unit.

FIG. 15 shows a sectional view of a harmonic pin ring gear system 150, also referred to as a "harmonic pin ring drive", according to a first embodiment. A drive unit 107 and a gear system 108 are both mounted via a gear ball bearing 109 and a drive ball bearing 110 on a crankshaft 111, also referred to as a pedal bearing shaft 111. The drive unit 107 comprises a control unit 112 and a motor unit 113, wherein a battery contact 114 and an electronic control system 115 are provided in the control unit 112.

The motor unit 113 comprises an internal rotor motor with a stator 116 affixed to an inside of a pot-shaped housing part 117. Coil windings of a stator coil of the stator 116 are connected to terminals of the electronic control system 115.

A rotor shaft 118 of the motor unit 107 is mounted on a roller bearing 119 comprising a first ball bearing 120 and a second ball bearing 121 inside the stator 116. Affixed to the rotor shaft 118 are two rows of permanent magnets 122 located radially opposite the stator coil. The rotor shaft 118 is formed as a hollow shaft that extends in stages towards the gear system 108 through an inner step and an outer step. The outer step of the rotor shaft 118 encompasses a ring-shaped step on a cam disk 104 of the gear system 108 such that the outer step of the rotor shaft 118 engages frictionally with the ring-shaped step of the cam disk 104.

In the embodiment shown the cam disk 104, also referred to as a wave generator 104, is not supported inwards by a separate bearing but is supported on the motor side on the rotor shaft 118 and on the gear side on an inner gear 105 of the gear system 108. Moreover, the cam disk 104 is centred relative to the crankshaft 111 by the outer step of the rotor shaft 118. The outer circumference of the cam disk 104 has an oval shape such an elliptical or sine-overlaid circular shape, for example. Fixed onto the outer circumference of the cam disk 104 is a thin-section ball bearing 102 with a deformable inner ring 123 and a deformable outer ring 124.

Radially outside the thin-section ball bearing 102 a motor-side pin ring 103' lies on the thin-section ball bearing 102 that has groove-shaped indentations in axial direction into which cylinder pegs 101 or pins 101 are inserted. The cylinder pegs 101 engage in an outer gear 6 with internal toothing 126 located radially outside the cylinder pegs 101.

The outer gear 106 is screwed to a projection of the pot-shaped housing part 117 and to a gear cover 127, wherein the screws run in axial direction through the gear cover, the outer gear 106 and a step of the pot-shaped housing part 117. The outer gear 106 is arranged in a first region radially outside the cam disk 104 and in a second region radially outside an inner gear 105. The inner gear 5 is arranged radially opposite the outer gear 106, wherein the pins 101 engage in external toothing 125 of the inner gear 105 and internal toothing 126 of the outer gear 106.

A gear-side pin ring 103 is arranged axially opposite the motor-side pin ring 103' such that the outer gear 106 is located between the gear-side pin ring 103 and the motor-side pin ring 103'. Both the gear-side pin ring 103 and the motor-side pin ring 103' comprise groove-shaped indentations in axial direction in which the pins 101 engage. The pins 101 are supported in axial direction by a gear-side thrust washer 130 and a motor-side thrust washer 131, wherein the gear-side thrust washer 130 is arranged on the gear cover 127 and the motor-side thrust washer 131 is arranged on the pot-shaped housing part 117. The motor-side thrust washer 131 extends radially inwards to approximately the height of the middle of the thin-section ball bearing 102.

The inner gear 105 is mounted via a roller bearing 132 inwards on a region of the gear cover 127. A follower holder 133 is screwed onto an outer region 134 of the inner gear 105, wherein a region of the inner gear 105 and the follower holder 133 encompass the outer ring of the roller bearing 132. An inner region 135 of the inner gear 105 is mounted on an outer freewheel clutch 136 with an inner ring formed on a hollow driven shaft 137. The hollow driven shaft 137 is mounted radially outwards on a 2-row ball bearing 138 on a region of the gear cover 127. A chain wheel adapter 139 is fixed radially outwards on the hollow driven shaft 137.

The hollow driven shaft 137 is mounted via the ball bearing 109 on a sleeve 140 arranged on the crankshaft 111. The sleeve 140 is connected to the crankshaft 111 via a toothed spline shaft. The crankshaft 111 has a spline shaft profile 169 that engages in a spline shaft profile 170 of the sleeve 140. The crankshaft 111 comprises a fixing region 171 for a first pedal crank on a gear-side end and a fastening region 172 for a second pedal crank on a motor-side end. For the sake of simplicity, the pedal cranks are not shown in FIG. 15.

Furthermore, the hollow driven shaft 137 is mounted on an inner freewheel clutch 142 on an drive ring 144 arranged on the sleeve 140.

The outer freewheel clutch 136 and the inner freewheel clutch 142 are arranged or operated in such a manner in relation to one another that in a drive direction either the inner gear 105 or the crankshaft 111 is coupled to the chain wheel adapter 139 depending on which one rotates more quickly in the drive direction.

The gear system 108 of the harmonic pin ring gear system 150 is sealed by shaft seals 145, 147, 149, 151. An inner gear-side shaft seal 145 is arranged adjacent to the inner freewheel clutch 142 and an outer gear-side shaft seal 147 is arranged adjacent to the 2-row ball bearing 138. An inner shaft seal 149 is arranged inside the gear system and adjacent to the outer freewheel clutch 136.

A motor-side shaft seal 151 its arranged adjacent to the drive ball bearing 110. The drive ball bearing 110 is arranged on a motor-side end of the crankshaft 111 between the crankshaft 111 and a cylindrical region 152 of a cooling cover 154 arranged. The crankshaft 111 is supported radially outwards on the cooling cover 154 by the drive ball bearing 110.

According to the embodiment in FIG. 15, the gear system 108 is encapsulated against the control unit 112 such that the electronics of the gear system 108 are protected against leaking gear oil. Similarly, the electronics of the gear system 108 are encapsulated against the exterior. This encapsulation is achieved inter alia by means of stationary housing parts that lie one on top of another in axial direction, wherein 0-rings are provided as radial and axial seals at the transitions to the exterior and the gear system interior.

The control unit 112 comprises a ring-shaped circuit board 156 that contains components of the control electronics. The ring-shaped circuit board can be connected via the battery contact 114 to a battery which is not shown in FIG. 1. The battery contact 114 is connected to the circuit board 156 by a cylindrical peg 158 and a screw 159. The circuit board 156 lies on a cooling pad 161 on the cooling cover 154. The cooling cover 154 comprises cooling ribs 162 that extend over an outer surface of the cooling cover 154.

FIG. 16 shows an enlarged section of FIG. 15 marked in FIG. 15 by an oval line. To the left of the gear-side pin ring 103' and to the right of the motor-side pin ring 103, the left- and right-hand sides of the pins 101 are shown in perspective view. The horizontal boundary lines of the pins 101 correspond approximately to the lateral boundaries of the groove-shaped indentations of the pin ring 103, 103' in which the pins 101 are received.

As can be seen particularly clear from FIG. 16, the outer ring 106 has one circumferential channel on the gear-system side and one on the motor-side, wherein an O-ring 163 is fitted into the gear-side channel and an O-ring 164 is fitted into the motor-side channel. The gear cover 127 and the [sic] each have a ring-shaped projection that is fitted into the corresponding ring-shaped channel such that the O-ring is located between the ring-shaped projection and the ring-shaped channel.

FIGS. 18 and 19 show sectional views along the plane of intersection C-C. The plane of intersection C-C, which is shown clearly in FIG. 17, runs perpendicular to a central axis of rotation of the gear system 108 through the thin-section ball bearing 102 and through the pot-shaped housing part 117, looking in the direction of the gear system 108. For the sake of clarity, FIG. 19 omits the thin-section ball bearing 102 shown in FIG. 18 in order to show the internal toothing 125.

In FIG. 19 guide lines show clearly that an offset of the pins 101 at an angle of 45 degrees represents half a tooth-to-tooth distance such that a full orbit gives an offset of 2 teeth. The guide lines correspond to a semi-major axis and to a semi-minor axis of the cam disk 104 respectively. The offset shown in FIG. 19 results if the inner gear toothing 125 has two teeth fewer than the outer gear toothing 126. For a mirror-symmetrical cam disk 104 differences in tooth numbers of a multiple of two are also possible, though in such cases the reduction is smaller.

The tooth shape and the dimensions of the external toothing 125 of the inner gear 105, the internal toothing 26 of the outer gear 106 and the pins 101 are configured such that each of the pins 101 is in contact with both the internal toothing 26 and the external toothing 125.

As shown in FIG. 18, the pins 101 lie radially inwards on the outer ring 124 of the thin-section ball bearing 102 that is deformed outward by the oval shape of the cam disk 104 along a semi-major axis. The pins 101 are received in groove-shaped indentations of the motor-side pin ring 103 that are shown in section in the view in FIG. 18. On the upper and lower sides the points of the internal toothing 125 that project inwards beyond the motor-side pin ring 103 are shown.

FIG. 21 shows a sectional view along the plane of intersection D-D. The plane of intersection D-D, which is shown clearly in FIG. 20, runs perpendicular to the central axis of rotation of the gear system on the motor-side from the inner gear 105 through the cam disk 104, the thin-section ball bearing 102 and the outer gear 106, looking towards the gear system 108. The plane of intersection D-D is arranged somewhat further towards the motor side than the plane of intersection C-C in FIGS. 17 to 19.

The following explains a force flow through the gear system in greater detail with reference to FIGS. 15 and 22. FIG. 22 shows a force flow from the rotor shaft 118 to the chain adapter 139 and a force flow from the sleeve 140 to the chain adapter 139 by means of arrows. FIG. 15 shows a force flow from the first crank to the sleeve 140 and from the second crank to the sleeve 140 by means of arrows.

While the motor unit 113 is in operation the power electronics on the circuit board 156 of the control unit 112 is supplied with electrical current via the battery contact 114. The electronics of the control unit 112 generate a current in the stator coil of the stator 116. The resulting magnetic field of the stator coil exerts a force on the permanent magnets of the rotor shaft 118, thereby driving the rotor shaft 118. In one embodiment the electronics generate a three-phase electric current by pulse width modulation that is conducted by three stator coils of the stator 116 which are insulated from one another.

A torque of the rotor shaft 118 is transferred to the cam disk 104. The cam disk 104, the thin-section ball bearing 102 fixed to it and the two pin rings 103, 103' transform the torque into a radial force that is transferred to the pins 101. Here the thin-section ball bearing 102 exerts a compression force on the pins 101 that acts radially outwards, and the pin rings 103, 103' exert a tractive force on the pins 101 that acts radially inwards. At the stationary internal toothing 126 of the outer gear 106, the radially outward directed compression force on the pins 101 is deflected into a force acting along the circumference on the stationary internal toothing 126 and into a counterforce acting along the circumference on the pins 101.

At the external toothing 125 of the inner gear 105, the radially acting traction force on the pins 101 is deflected into a force acting along the circumference on the inner gear 105. Moreover, the counterforce acting on the pins 101 is also transferred from the outer gear 106 via the pins 101 to the inner gear 105.

In a harmonic pin ring gear system according to FIGS. 15 to 23 a transmitter and external toothing 125 of an inner gear 105 are each arranged at least partially in axial direction inside the outer gear 106 such that a first radial force flow 167 runs in a straight direction from the transmitter via the pins 101 to the internal toothing 126 of the outer gear 106 and a second radial force flow 168 runs in a straight direction from the internal toothing 126 of the outer gear 106 via the pins 101 to the external toothing 125 of the inner gear 105. In particular, according to this description the first radial force flow 167 and the second radial force flow 168 can be perpendicular to the central gear system axis 128.

This course of the radial force flow is favourable for avoiding bending and tilting torque on the pins 101 and for achieving an even load on the gearwheels. This force flow differs from a force flow in a gear system of the type disclosed in patent AT 372 767, for example. In a gear system according to AT 372 767 a force flow runs from an eccentric cam via a ball bearing and a bearing ring to an end region of a roller chain that is not located axially outside an outer gear. As a result, in a gear system according to AT 372 767 a bending torque acts on the rollers of the roller chain in particular when a compression force is exerted on the rollers.

In FIG. 22 a first region 165 of the outer gear 106 in which the internal toothing 126 of the outer gear 106, the pins 101 and the external toothing 125 of the inner gear 105 overlap in axial direction is indicated by a first curly bracket and a second region 166 of the outer gear 106 in which the internal toothing of the outer gear 106, the pins 101 and an outer circumference of a transmitter overlap in axial direction is indicated by a second curly bracket. The cam disk 104, the inner ring 123 and the outer ring 124 of the thin-section ball bearing 102 are located at least partially inside the second region 166 in axial direction.

In addition, located inside the second region 166 is an inner support region in which the ball bearing balls of the thin-section ball bearing 102 are in contact with the inner ring 123 of the thin-section ball bearing 102 and an outer support region in which the ball bearing balls of the thin-section ball bearing 102 are in contact with the outer ring 124 of the thin-section ball bearing 102. If, for example, cylindrical roller elements with a broader support region in axial direction are used rather than ball bearing balls, the inner and outer support region of the roller elements can also be partly located axially inside the second region 166.

The aforementioned transmitter can in particular comprise an oval-shaped cam disk 104 and a deformable thin-section ball bearing 102 as shown in FIGS. 15 to 23. However, the transmitter can also comprise one or more eccentric cams as shown in FIGS. 7 and 8. These eccentric cams can in turn have ball bearings to avoid friction, though they do not need to be deformable. When using eccentric cams, the eccentric cams and where appropriate the ball bearings or roller bearings are located at least partially in axial direction inside the outer gear.

The first region 165 and the second region 166 can be essentially directly adjacent in axial direction as shown in FIG. 22 or they can be a distance apart. It is possible to provide a distance between the inner gear 104 and the thin-section ball bearing. In the example in FIG. 22, a distance is provided between the external toothing 125 of the inner gear 105 and the outer ring 124 of the thin-section ball bearing 102 by the rounded shape of the outer ring 124.

The torque of the inner gear 105 is transmitted via the outer freewheel clutch 136 and the hollow driven shaft 137 to the chain wheel adapter 139 where it can be transferred via a drive means such as a chain wheel and a chain, for example, to an element to be driven such as a wheel hub, for example.

This torque curve is similar to the torque in WO 2010/1131115 to which reference is made here. The "inner wheel" to which it refers corresponds to the inner gear or inner gears with external toothing in this description, while the "outer wheel" to which it refers corresponds to the outer gear with internal toothing in this description. The "traction means" to which it refers corresponds to the pins, in particular the pin ring with the pins, in this description and the transmitter to which it refers corresponds to the oval cam disk and the thin-section ball bearing or to the eccentric cam with the ball bearing placed on it or to the double eccentric cam with the ball bearings placed on it. A pin ring 103, 103' with pins 101 corresponds both to a traction means and a pressure means, wherein a traction force is transmitted essentially by the pin ring 103, 103' and a compression force is transmitted essentially by the pins 101.

In a similar manner to WO 2010/1131115 and as shown in FIG. 18, in a gear system according to this description the inner gear can, for example, also be fixed in a stationary manner to a housing and the outer gear can be connected to a driven shaft or form part of the driven shaft.

According to WO 2010/1131115 a chain is pressed by a transmitter into an outer ring and drawn into an inner ring. In contrast, according to this application an arrangement of pins is pressed by a cam disk or one or more eccentric cams into internal toothing of an outer gear and drawn into external toothing of an inner gear by a pin ring.

Further embodiments with a similar torque curve are disclosed in WO 2012/046216 to which reference is also made here. WO 2012/046216 shows both arrangements in which inner ring, outer ring, drive means and transmitter are located in one plane and arrangements in which the transmitter is arranged in another plane to the inner and outer rings, as illustrated in FIGS. 23, 25, 41, 42 and 43 of WO 2012/046216, for example. In particular in an embodiment in which the transmitter is not deformed, as with an eccentric cam, a ball or roller bearing can be arranged on an inside when viewed radially, as shown in FIG. 37 of WO 2012/046216, or on an outside, as shown in FIG. 41 of WO 2012/046216.

FIGS. 23 to 25 show enlarged sections of gear systems constructed in a manner similar to the gear system shown in FIG. 15. For the sake of simplicity, gear system parts which correspond to gear system parts of the gear system shown in FIG. 15 have been omitted. FIG. 23 shows an angular position in which a pin 101 is located in the tooth base of the external toothing 125 of the inner gear.

Unlike that shown in FIG. 15, the gear system in FIG. 23 comprises only a motor-side pin ring 103. According to the embodiment in FIG. 22, a traction force is transmitted from the pin ring 103 via the pins 101 to the axially opposite side of the pins such that the pins 101 are pressed into the external toothing 125 of the inner gear 105.

FIG. 24 shows an enlarged section of a gear system in which the pins are placed in a motor-side pin ring 103 and a gear-side pin ring 103'. Thus in the sectional view of FIG. 23 the motor-side pin ring 103 and the gear-side pin ring 103' are located radially inside and outside the pins 101.

FIG. 24 shows an enlarged section of a gear system in which a third pin ring 103" is arranged in a channel 173 of the outer gear 106. In this configuration the outer gear 106 comprises a motor-side part 106' and a gear-side part 106" that are connected to one another. In a gear arrangement the third pin ring can be inserted into the channel 173 before the parts 106' and 106" of the outer gear 106 are connected together by screwing, for example.

The embodiments in FIGS. 22 to 24 can also be combined, for example by providing only one motor-side pin ring 103 into which the pins are placed.

Moreover, it is also possible to provide a configuration in which support regions for the pin rings 103 and 103' are available on axially opposite regions in the outer ring 106 and in which the pin rings 103, 103' are arranged in axial direction wholly or partially inside the outer gear 106. The outer gear 106 can also be configured in two parts instead of one, for example, wherein a dividing plane runs perpendicular to the central gear system axis.

Furthermore, the outer gear 106 and/or the inner gear 105 can also be structured in individual segments designed as segments of a circle. The design of the inner or outer gear 105, 106 shown in FIGS. 15 to 23 as a ring formed as one part in circumferential direction offers greater stability and dimensional stability while a design with circular segments makes for simpler assembly.

Instead of the oval cam disk 104, the gear systems in FIGS. 15 to 24 can also have a single or double eccentric cam similar to that shown in FIGS. 7 and 8.

FIG. 26 shows a cross sectional view of the harmonic pin ring gear system 150'. FIG. 26 shows the left-hand side of a drive side and the right-hand side of a driven side of the harmonic pin ring gear system.

Figure 1:
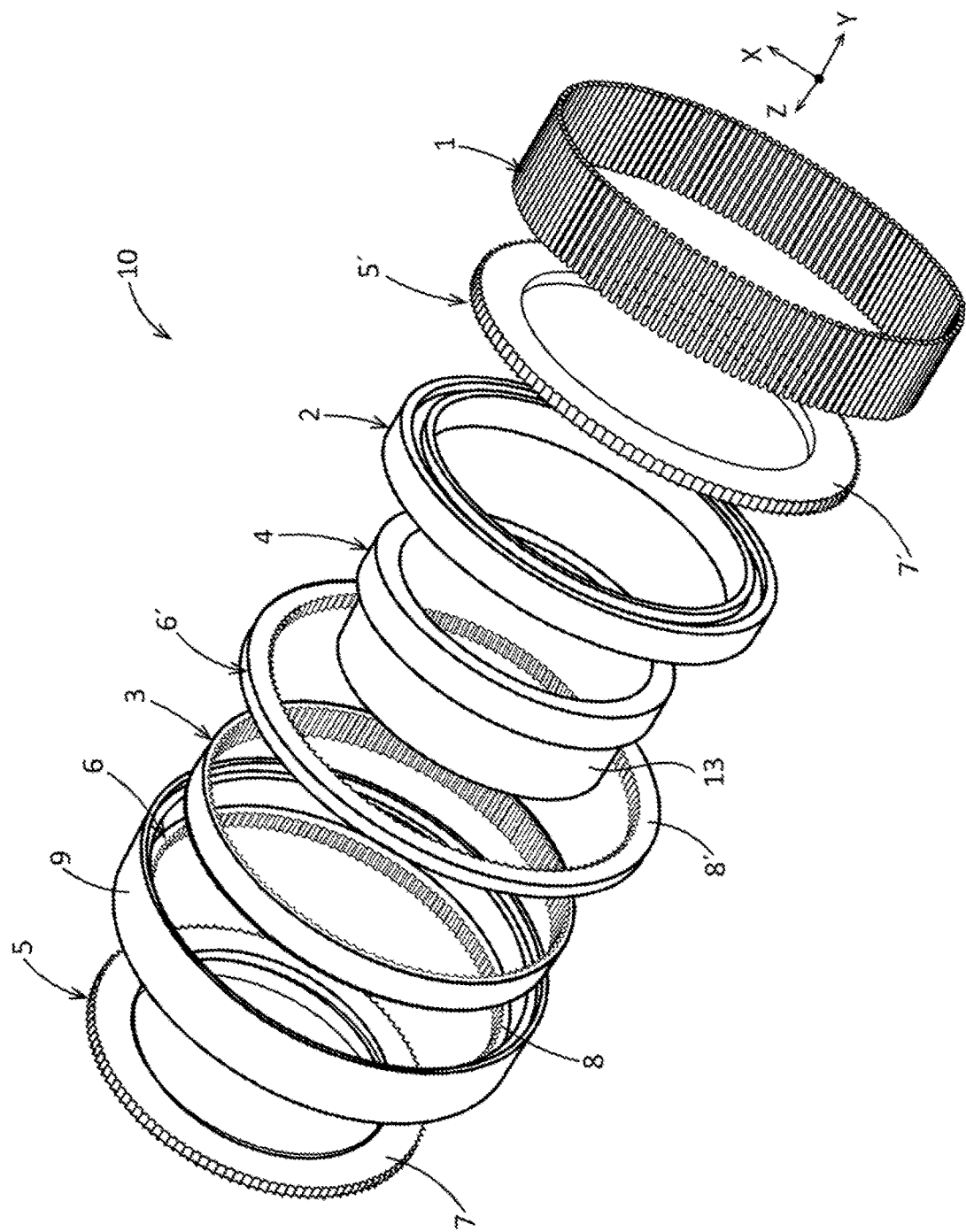
Figure 4:
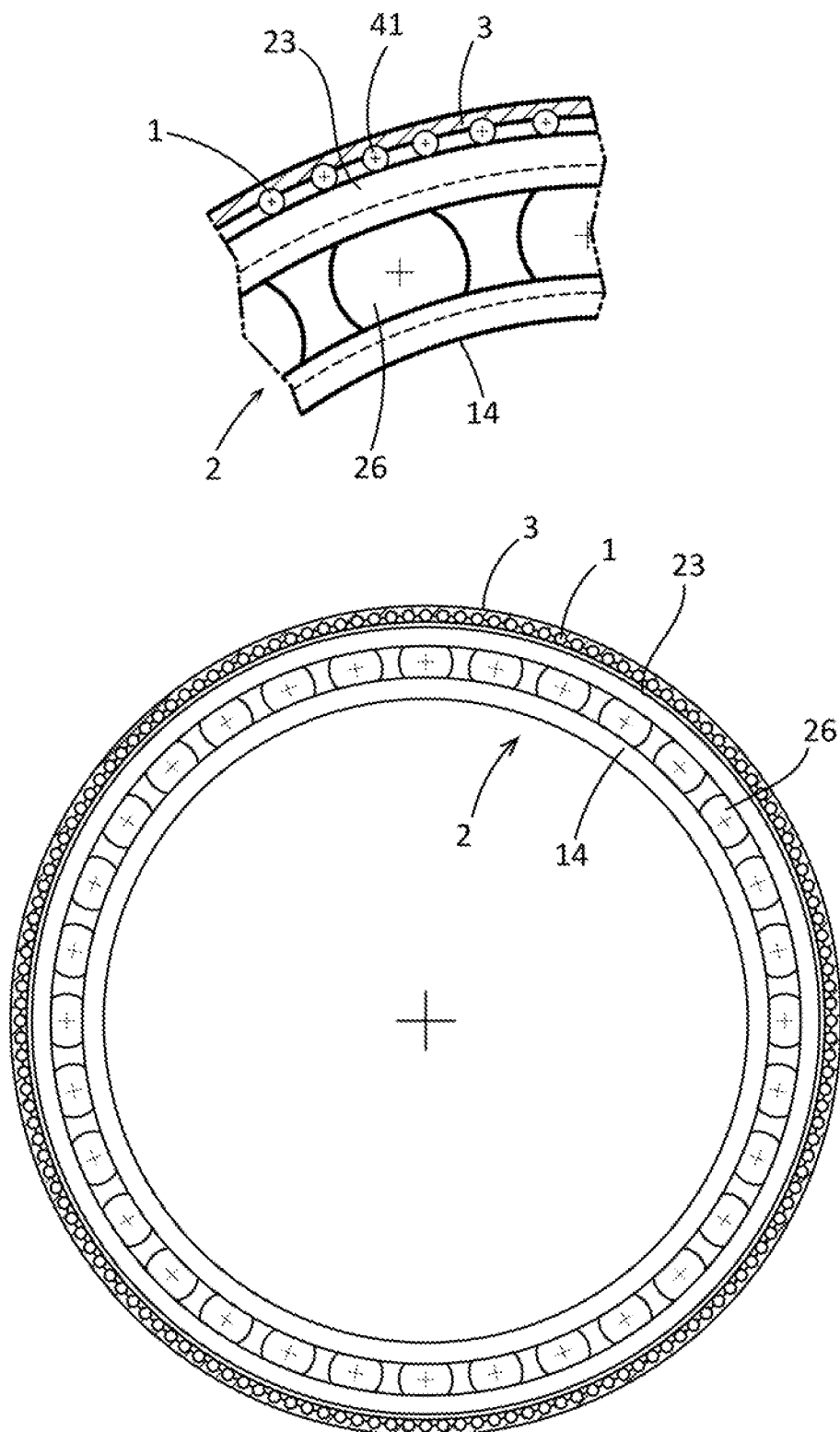
Figure 6:
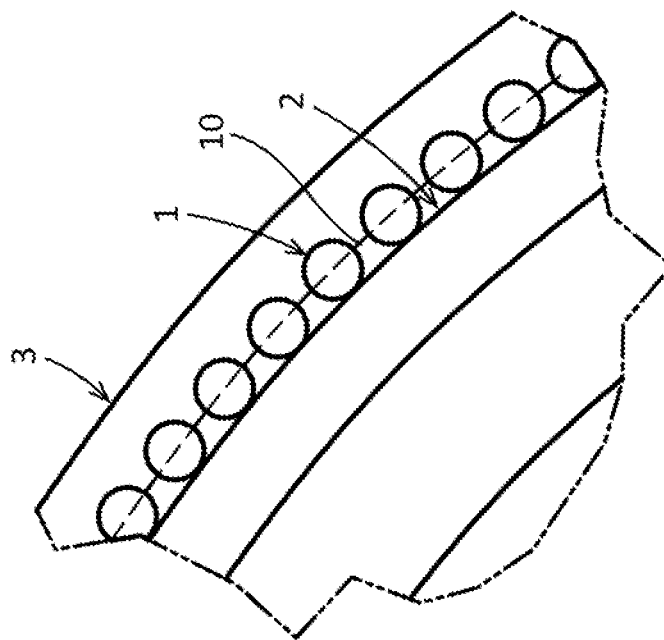

A stator 116 of a stator assembly of the harmonic pin ring gear system 150' is arranged in a motor housing 175. The stator 116 comprises three separate coils for connection to the three phases of a three-phase AC generator. The three-phase AC generator is designed as power electronics and arranged on a circuit board 156, wherein the circuit board 156 is fixed in a motor housing 175 on the drive side. The three coils of the stator 116 are connected to the three-phase AC generator by three plug-in connectors 176, one of which is shown in FIG. 1.

A rotor 129 equipped with permanent magnets is arranged radially inside the stator 116. The rotor 129 is arranged on a rotor shaft 118 designed as an elongated bush. The rotor shaft 118 is mounted on the drive side outwards in a drive-side rotor ball bearing 121', wherein an outer ring of the drive-side rotor ball bearing 121' is arranged in a cylindrical recess of the motor housing 175.

The rotor shaft 118 is mounted on the driven side in a driven-side rotor ball bearing 120' radially outwards in an inner gear 105. A hollow shaft 177 of the inner gear 105 is mounted radially outwards on an inner gear ball bearing 132' on a housing cover 127, wherein the inner gear ball bearing 132' is offset in axial direction relative to the driven side in relation to the drive-side rotor ball bearing 120'.

A cam disk 104 is arranged on the rotor 129. The cam disk 104 is elliptical or ellipsoid in shape. A flex ball bearing 102 or thin-section ball bearing is shrunk onto the cam disk 104 in which an inner ring 123 and an outer ring 124 are deformable.

Figure 8:
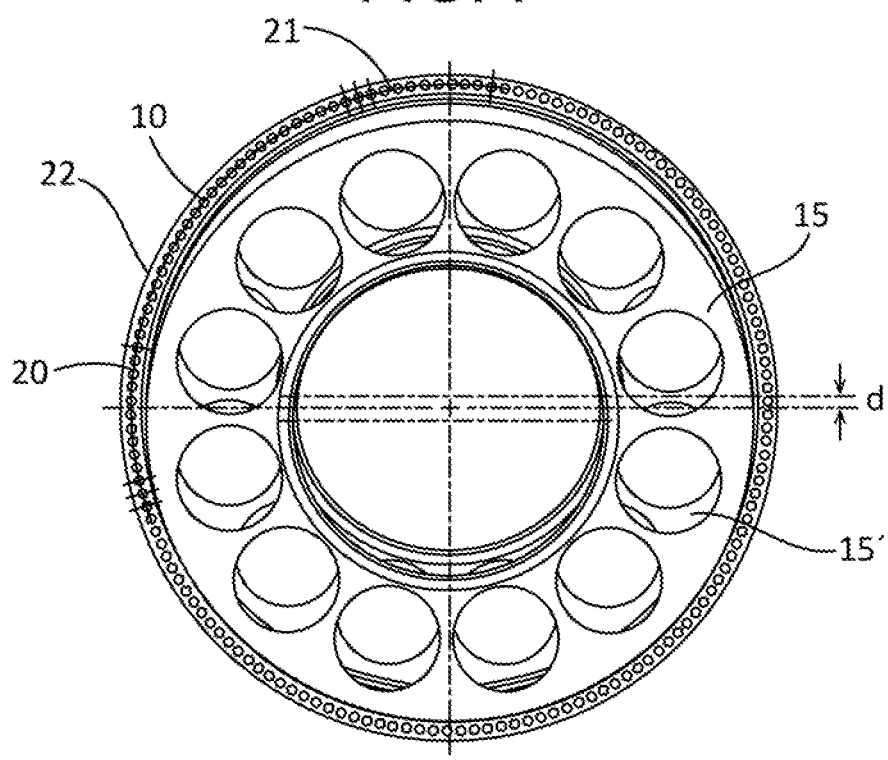
Figure 9:
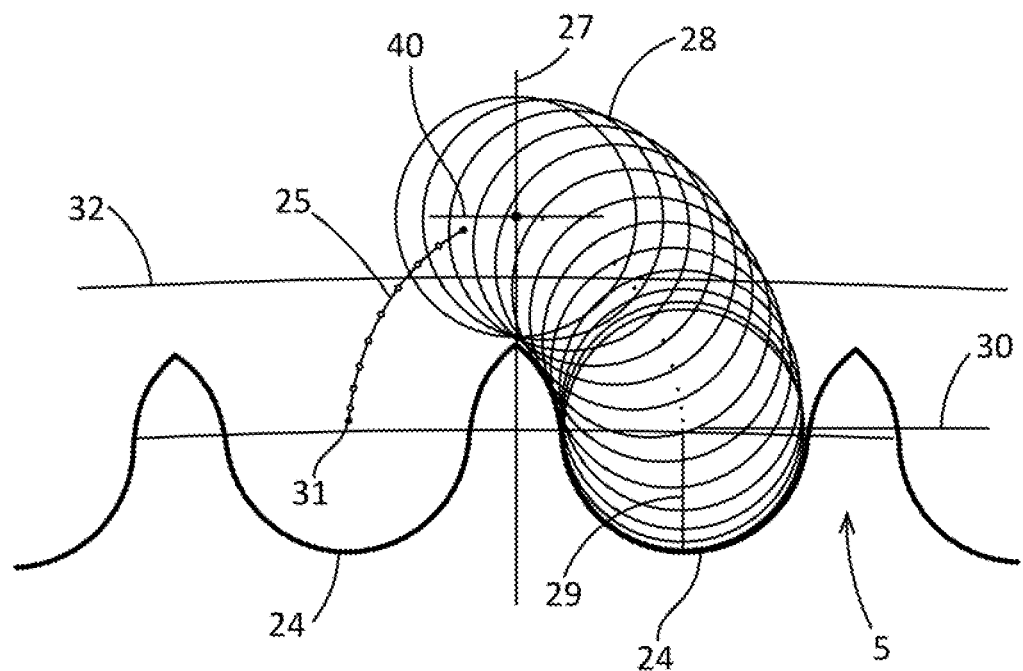
Figure 10:
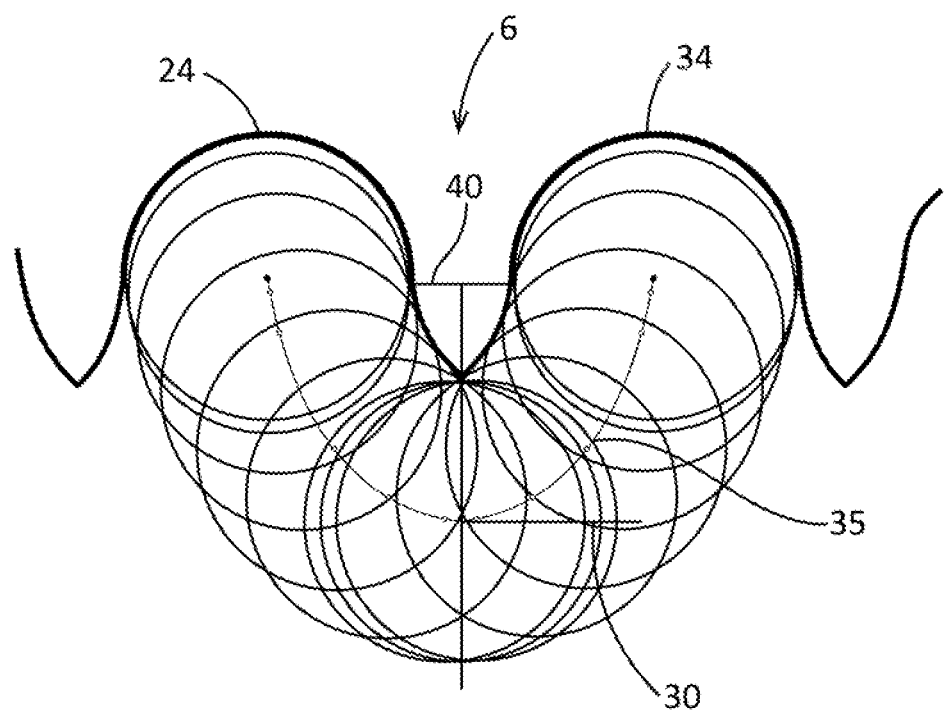
Figure 11:
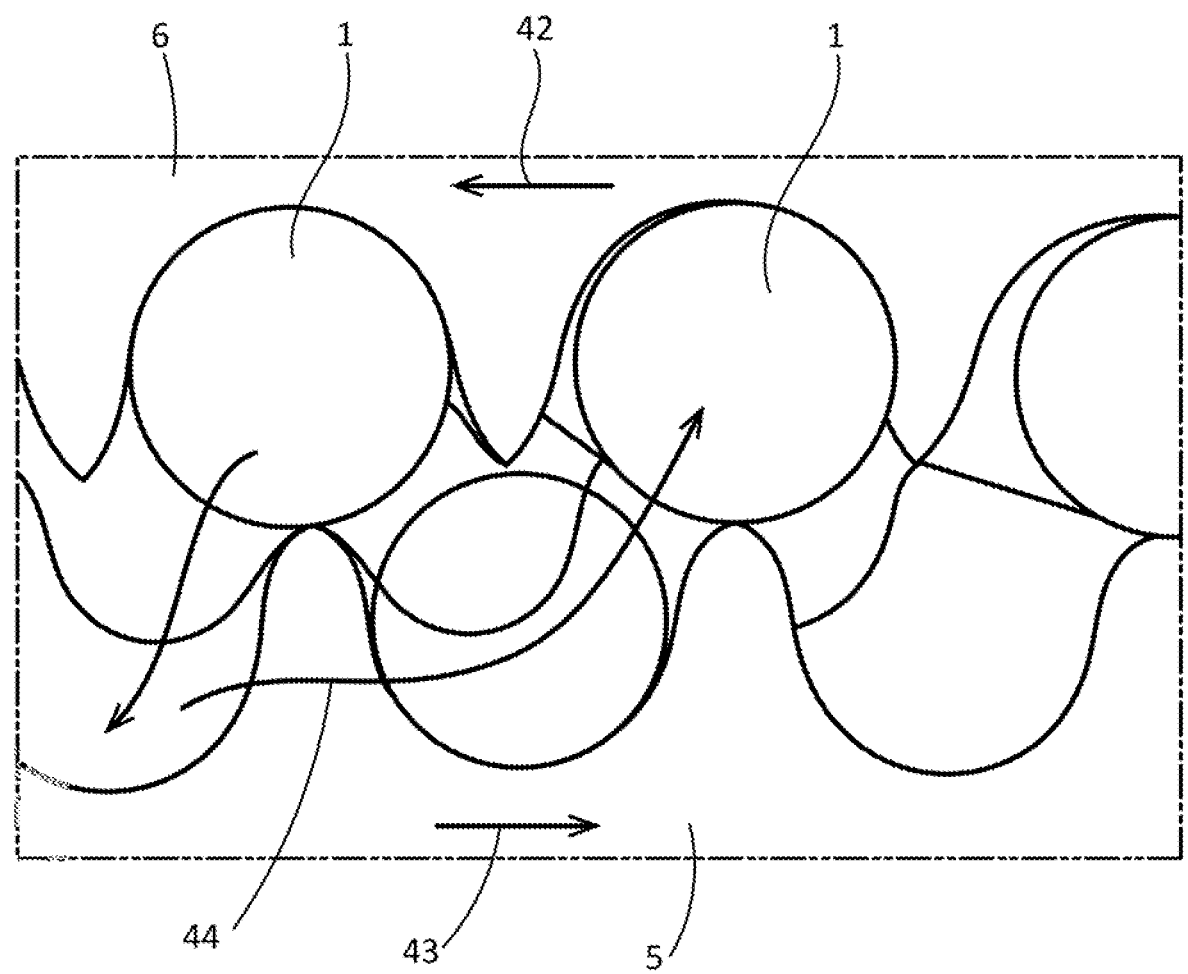
Figure 12:
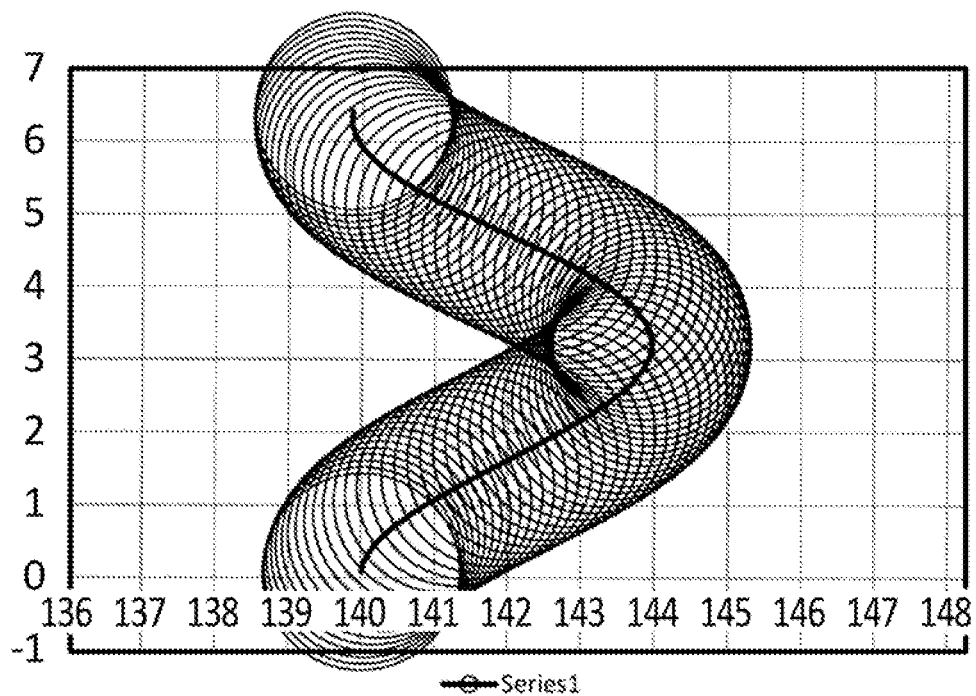
Figure 13:
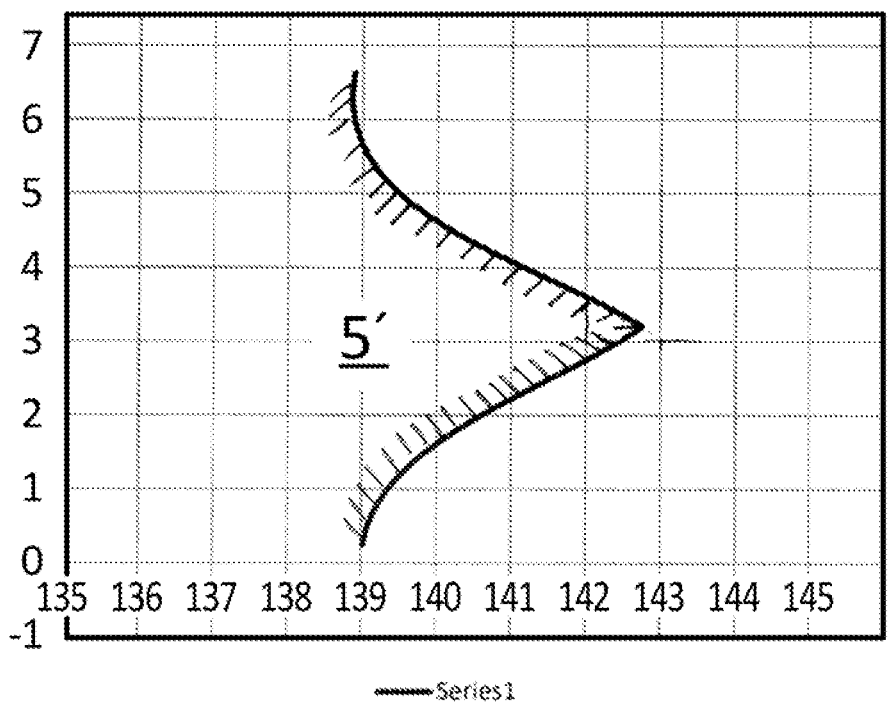
Figure 14:
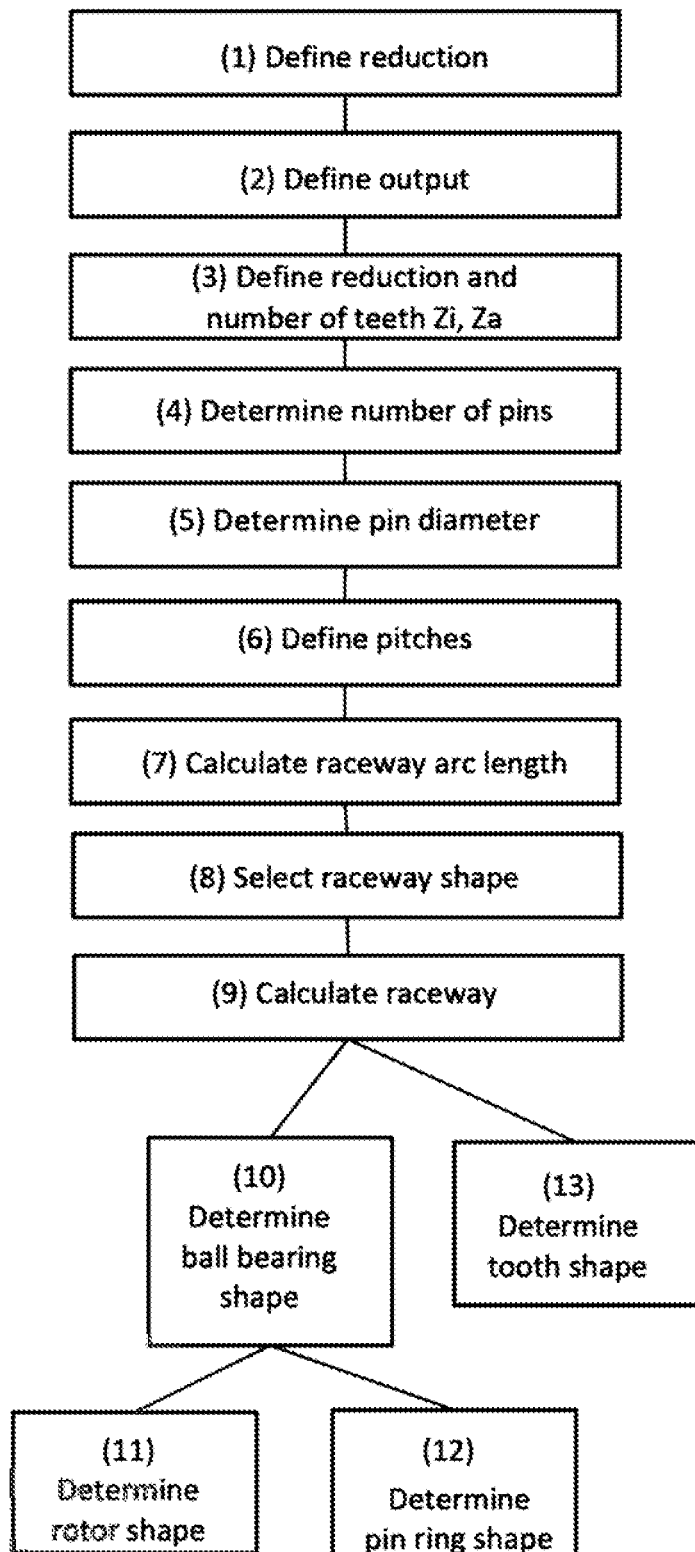

Instead of the ellipsoid cam disk 104 it is also possible to fit two circular disks with offset centre points in a manner similar to that shown in FIG. 8. In this case the circular disks can be mounted inside such that they can rotate on ball bearings and the flex ball bearing 102 can therefore be omitted.

To differentiate more clearly, the ring that receives the pins is referred to below as the pin ring and the entirety of the pins and the pin-retaining ring as the pin ring.

A pin ring 103 with pins 101 lies on the flex ball bearing 102, wherein the pins 101 are held in cylindrical recesses on the inside of a pin-retaining ring 178. The cylindrical recesses run in axial direction and are open to the inside in radial direction. The pins 101 of the pin ring 103 protrude in axial direction on both sides beyond the flex ball bearing 102 and beyond the pin-retaining ring 178.

Together the cam disk 104 and the flex ball bearing 102 form a transmitter that transforms a torque into a radial force.

Instead of a flex ball bearing with flexible inner and outer ring it is also possible to use a wire roller bearing or a flex ball bearing without an outer ring, wherein the function of the outer ring it assumed by a pin-retaining ring designed for the purpose.

The housing cover 127 is screwed onto the motor housing 175 with mounting screws 179 on the driven side of the motor housing 175. Furthermore, a drive-side outer gear 106' and a driven-side outer gear 106 are fixed by the mounting screws 179 between the housing cover and the motor housing, wherein spacer sleeves 180 are provided between the drive-side outer gear 106' and the driven-side outer gear 106 through which the mounting screws pass. An O-ring 185 is inserted radially outside between the driven-side outer gear 106 and the housing cover 127.

Screwed to the housing cover is a cover ring 203. The cover ring 203 covers supporting struts of the housing cover 127 and provides a smooth surface. This can be advantageous, for example, if a drive means slips off and gets in between the chain wheel adapter 139 and the motor housing 175.

The drive-side outer gear 106' and the driven-side outer gear 106 are arranged outside the cam disk 104 and the flex ball bearing 102 in axial direction. The drive-side outer gear 106' is located in radial direction opposite the regions of the pins 101 that protrude beyond the pin-retaining ring 178 in axial direction on the drive side. The driven-side outer gear 106 is located in radial direction opposite the regions of the pins 101 that protrude in axial direction beyond the pin-retaining ring 178 on the driven side.

A drive-side thrust ring 130 is arranged in the motor housing 175 on the drive side such that it is located opposite the drive-side front faces of the pins 101 in axial direction. Similarly, a driven-side thrust ring 131 is arranged on the driven side in the motor housing 175 such that it is located opposite the driven-side front faces of the pins 101 in axial direction.

A driven shaft 137 is arranged radially inside the hollow shaft 177 of the inner gear 105, wherein a motor freewheel 136 is arranged between the hollow shaft 177 of the inner gear 105 and the driven shaft 137. A support shaft 174 is placed on the drive side in radial direction outside on the driven shaft 137. The support shaft 174 is mounted radially outwards in a drive-side driven ball bearing 181 that is inserted into a cylindrical indentation or shoulder of the motor housing 175.

The driven shaft 137 is mounted radially outwards in a drive-side driven ball bearing 138' that is inserted into a cylindrical recess or shoulder of the motor cover 127. The drive-side region of the driven shaft 137 protrudes in axial direction beyond the housing cover 127. A chainwheel adapter 139' is placed on the driven shaft 137.

Arranged inside the driven shaft 137 that is configured as a hollow shaft is a pedal shaft 111. An anti-friction bush 182 is arranged on the driven side of the pedal shaft 111. A measuring shaft 140 is arranged on the pedal shaft 111 such that on the drive side it is connected to the pedal shaft via feather keys 183 such that it is unable to rotate, and on the driven side it lies on a shoulder of the anti-friction bush 182. The anti-friction bush 182 is mounted on a driven-side pedal shaft ball bearing 109 radially outwards in the driven shaft 137. The measuring shaft 140 is mounted on a drive-side pedal shaft ball bearing 110 radially outwards on the motor housing 175.

Two adjacent pedal shaft freewheels 142, 143 are arranged between the measuring shaft 140 and the driven shaft 137 in the drive-side direction from the driven-side pedal shaft ball bearing 109. By using two freewheels 142, 143 arranged adjacent to one another the measuring shaft 140 is supported on a wider region relative to the driven shaft 137 than if only one single freewheel is used. Instead of two freewheels it is also possible to incorporate a single freewheel and an adjacent roller bearing such as a needle roller bearing, for example.

A coil body 184 is arranged in the region between the rotor shaft and the measuring shaft 140. The coil body 174 is fixed to the motor housing 175 on the drive side and located a distance from the rotor shaft 118 and the support shaft 174 in radial direction. A measurement connection of the coil body 184 is run out of the coil body 184 on the drive side and connected to the motor electronics. The support shaft 174 encompasses the coil body 184 along a greater part of the axial extent of the coil body 184 and thus shields the torque sensor with the coil body 184 and the measuring shaft 140 against electromagnetic radiation of the stator 116, thereby improving torque measurement.

The measuring shaft 140 and the coil body 184 are components of a magnetostrictive torque sensor. The magnetostrictive torque sensor is a contactless torque sensor in which, unlike a torque sensor with strain gauges on the measuring shaft, no slip rings are required and in which the region through which the current flows can be fixed to the housing.

On the driven side of the driven-side pedal shaft ball bearing 109 an inner shaft seal ring 145 is inserted between the pedal shaft 111 and the driven shaft 137 relative to the driven-side pedal shaft ball bearing 109. Furthermore, an outer shaft seal ring 147 is arranged between the driven shaft 137 and the housing cover 127 in relation to the driven-side driven ball bearing 138'.

During operation an input torque that is converted into radial force by the cam disk 104 and the flex ball bearing 201 is transferred by the stator 116 through electromagnetic force action to the rotor 129 and the rotor shaft 174. This radial force is converted at the tooth flanks of the outer gears 106, 106' and the inner gear 105 into an output torque, wherein the inner gear 105 is driven. The output torque is greater than the input torque by the reduction ratio.

Figure 15:
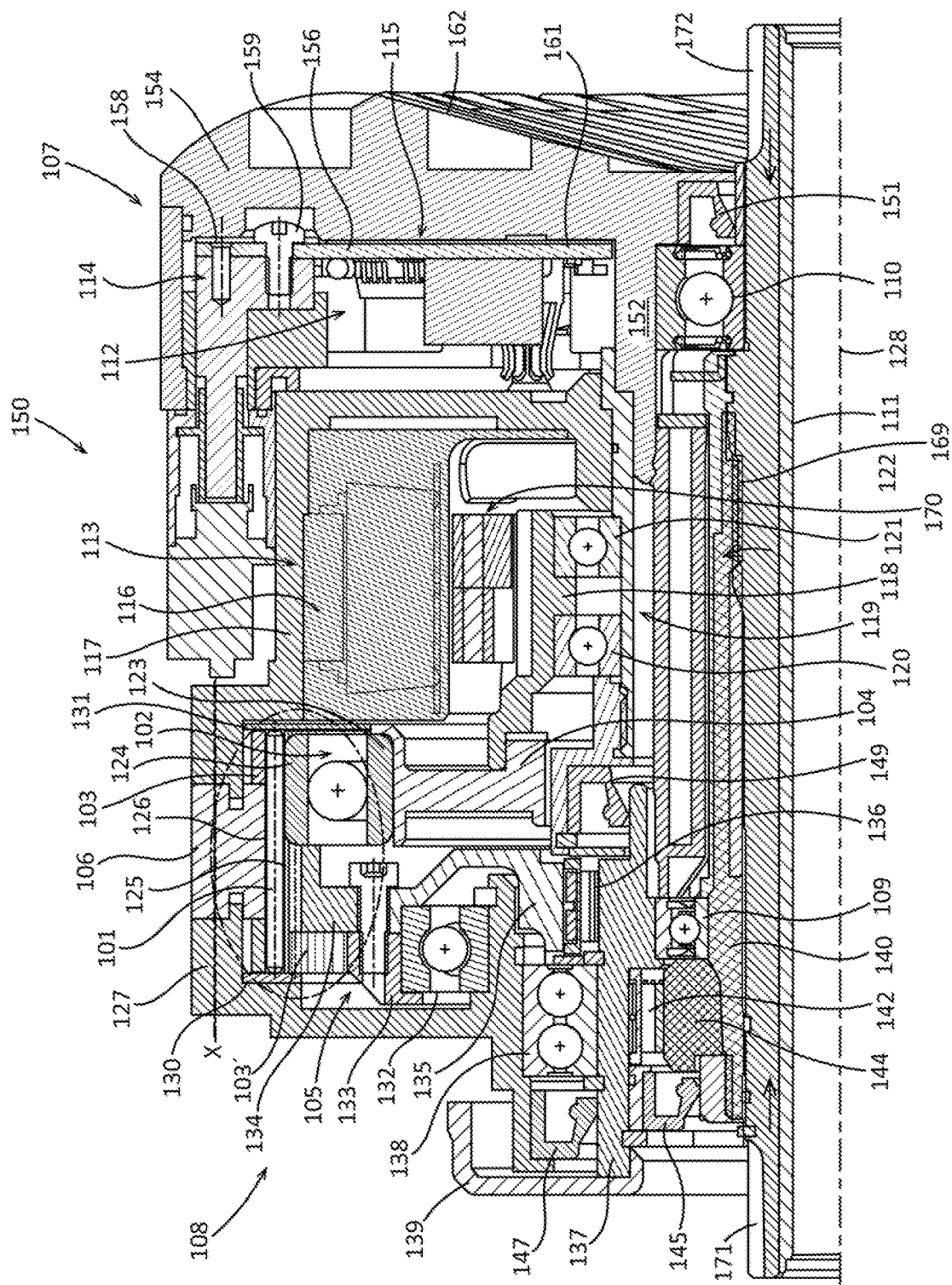
Figure 16:
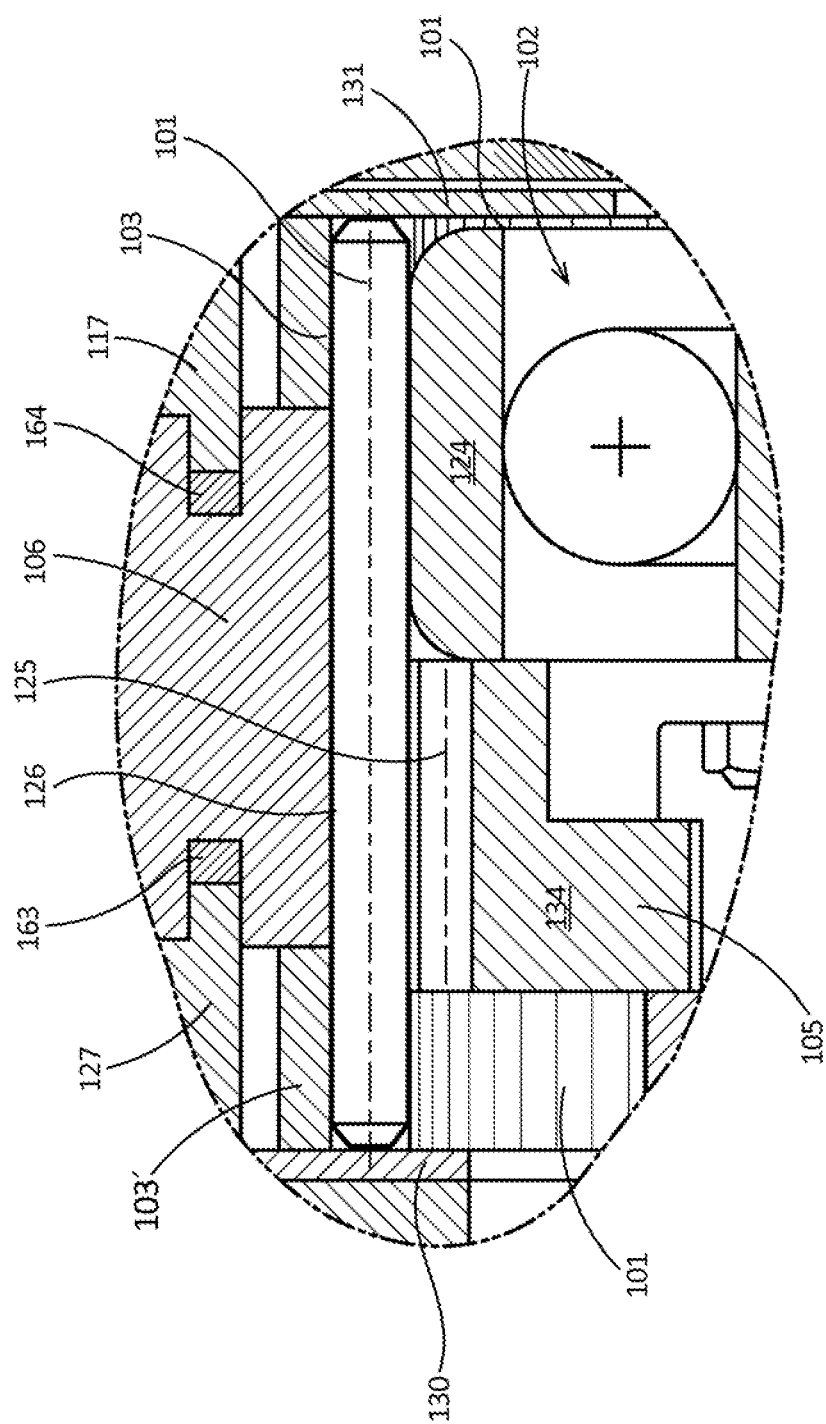
Figure 18:
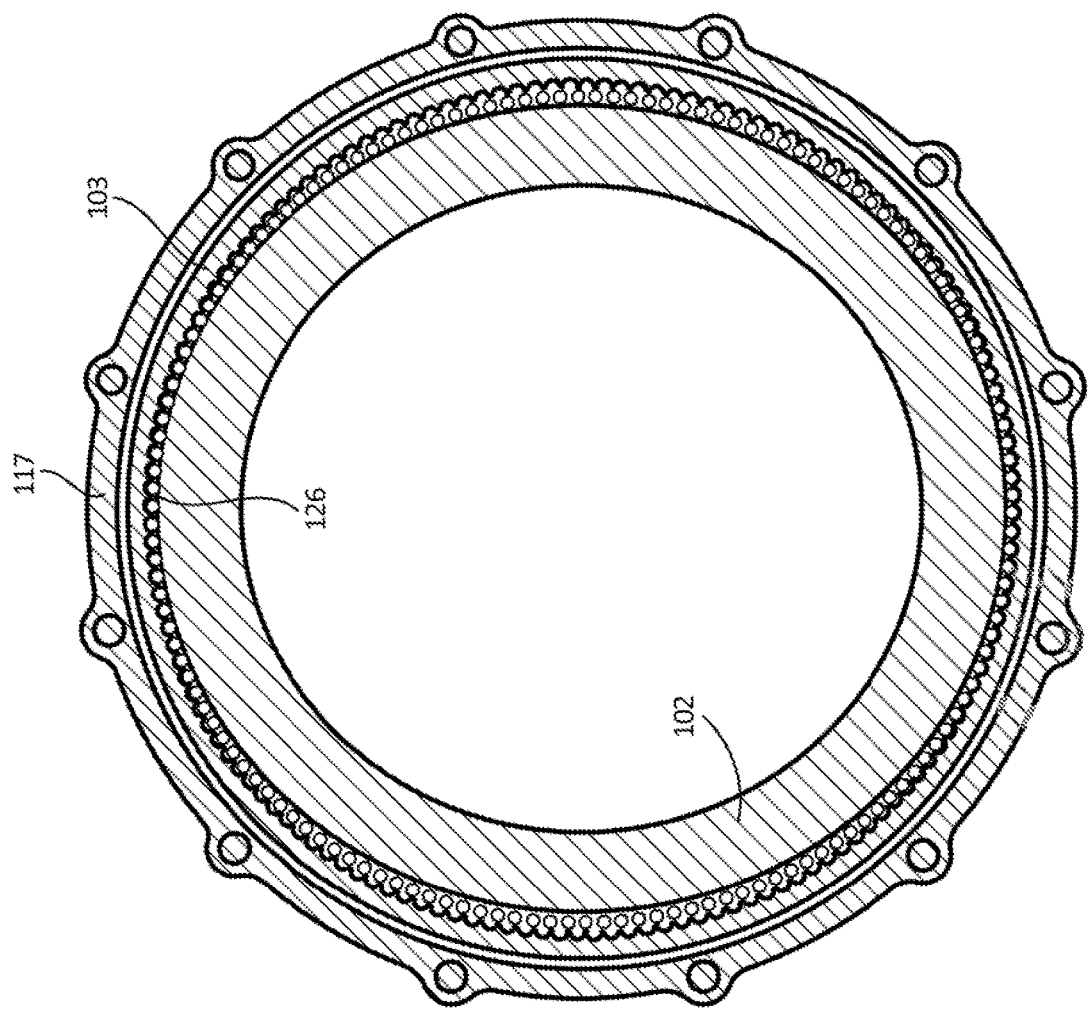
Figure 17:
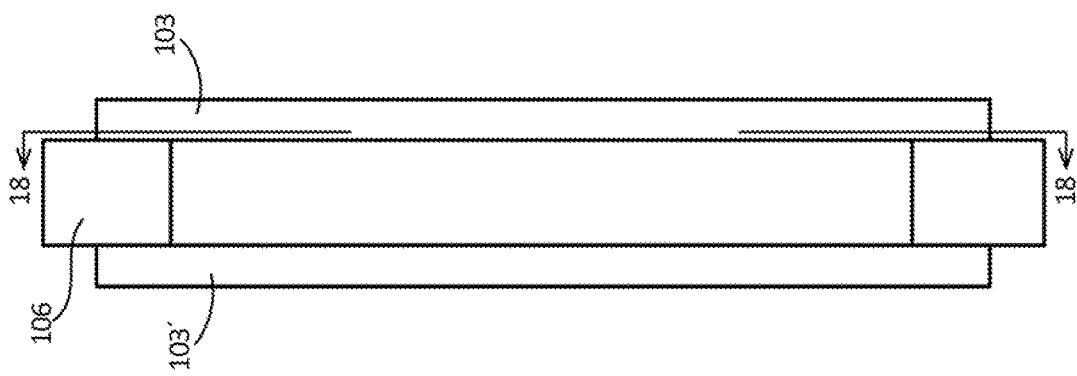
Figure 19:
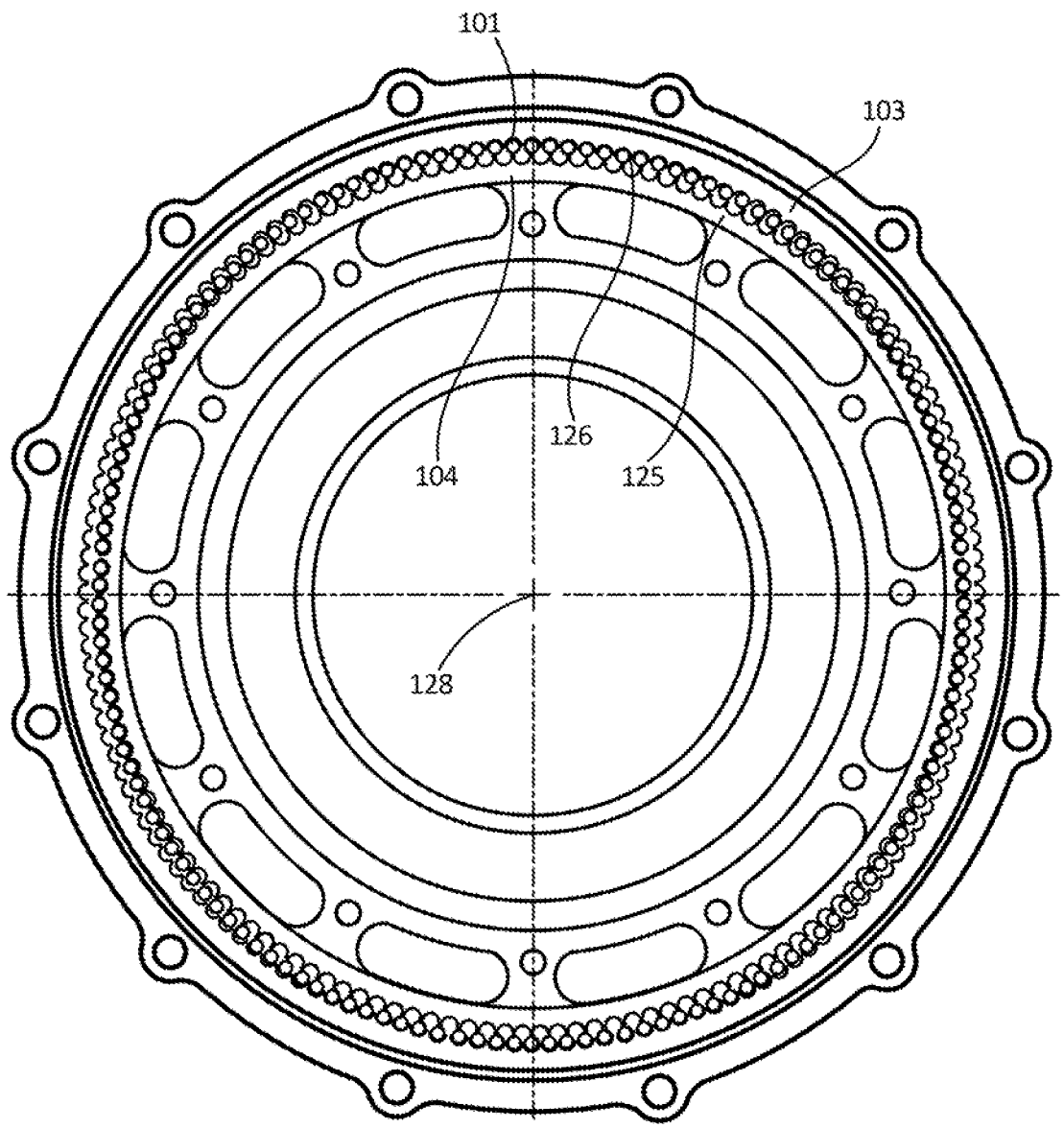
Figure 22:
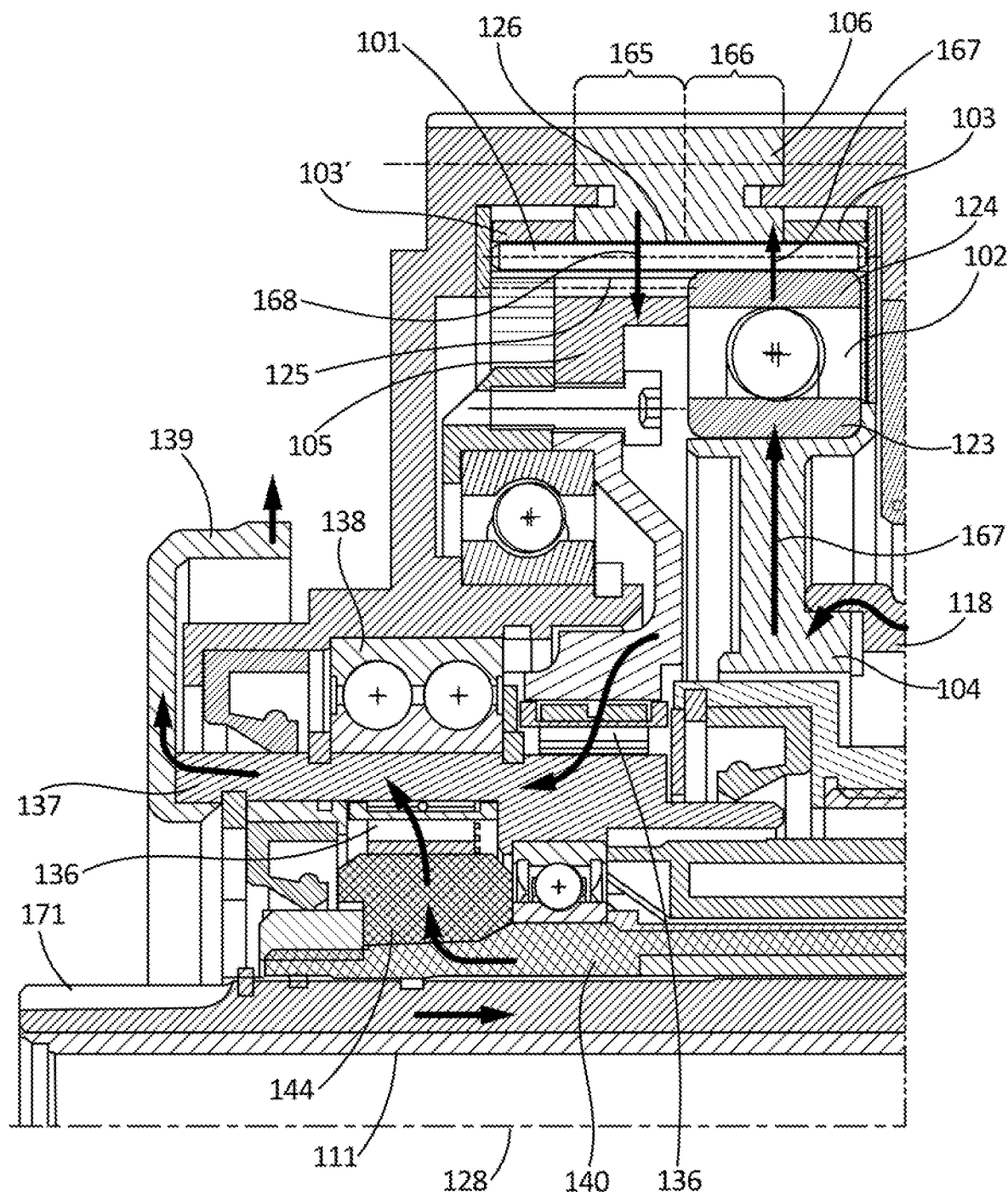
Figure 23:
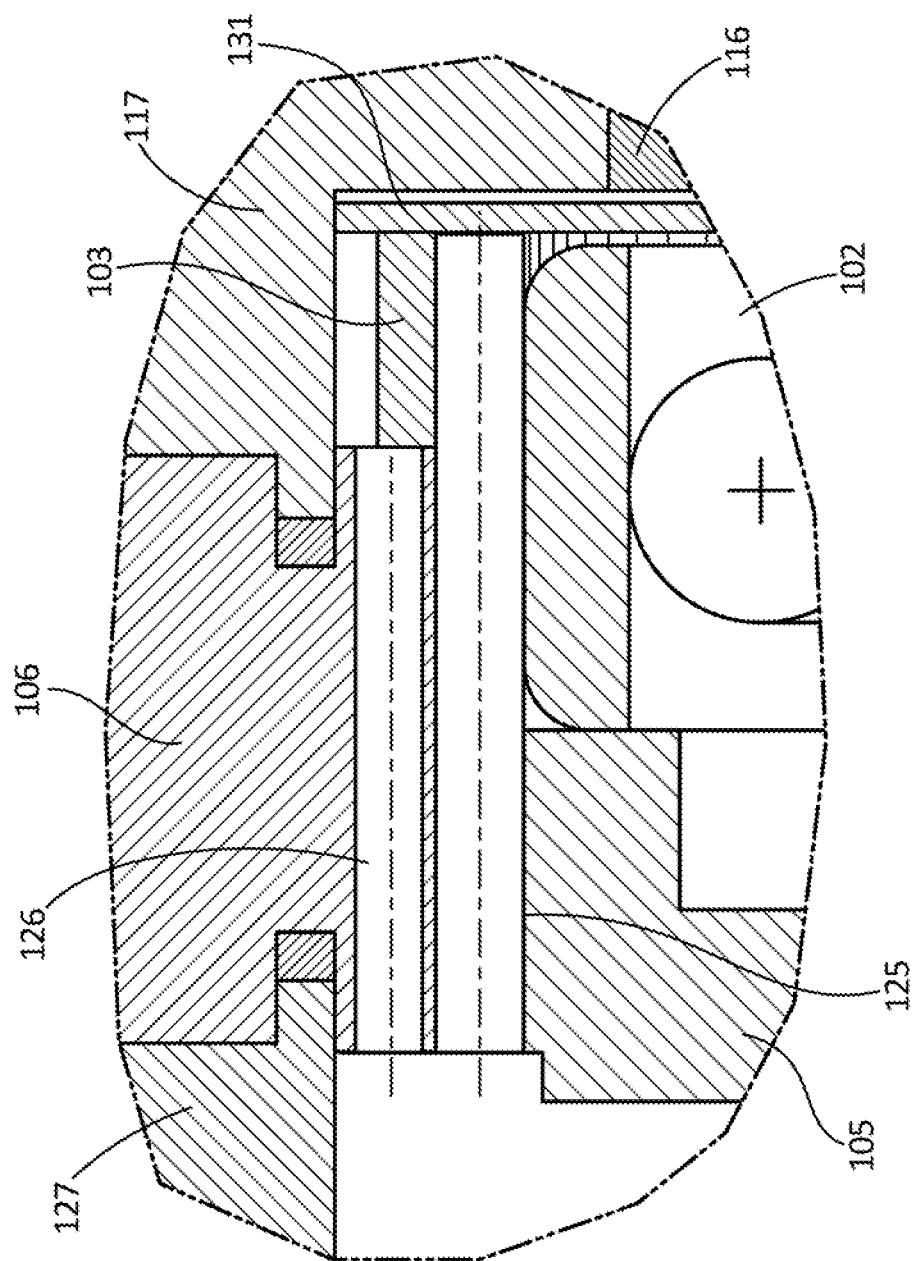
Figure 24:
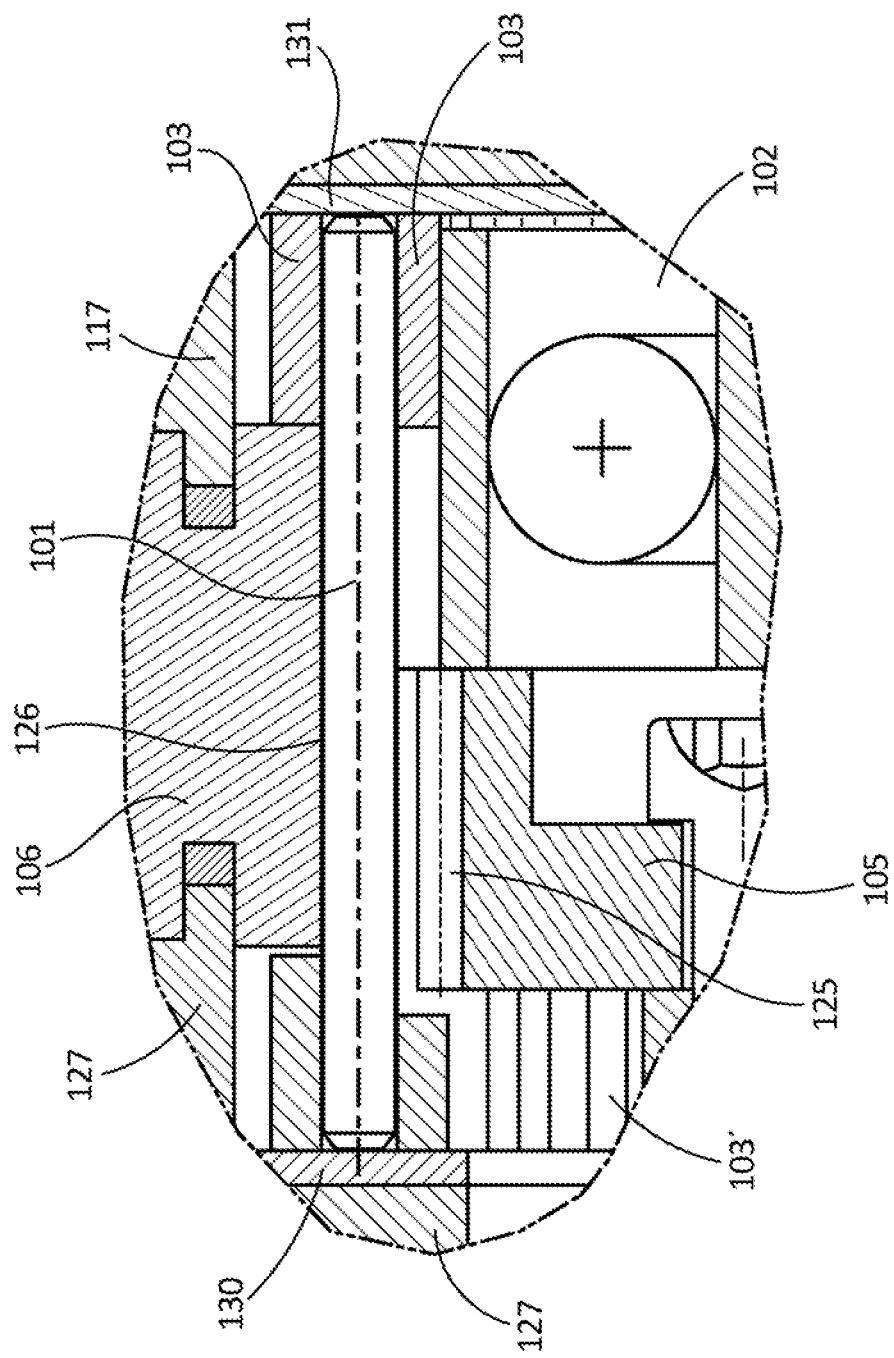

Unlike with the embodiment in FIGS. 15 and 22, in the embodiment in FIGS. 26 to 30 a drive-side outer gear 106' and a driven-side outer gear 106 are provided and the cam disk 104 is arranged centrally in axial direction between the drive-side outer gear 106' and the driven-side outer gear 106. This provides improved support for the tilting torque acting on the pins 101 of the pin ring 103 due to radially acting forces of the transmitter 102, 104.

Moreover, a support shaft 174 that is connected to the driven shaft 137 is designed as an elongated bush and the rotor shaft 118 is also designed as an elongated bush. The greater axial extension of the shafts 118, 137, both ends of which are supported outwardly in ball bearings 120', 121' or 138', 110, results in improved support for the tilting torque compared to the arrangements in FIGS. 15 and 22. In this respect see the ball bearings 120, 121 or 138, 110.

In the embodiment in FIGS. 26 to 30 the two protruding ends of the pins 101 are supported stably and symmetrically in relation to the centre of the pin ring 103 on the outer toothing formed by the internal toothing of the outer gears 106, 106' which are mounted rigidly in the motor housing 175. This results in good support against displacement of the pin 101 due to the induction of forces via the pin-retaining ring 178.

The inner toothing formed by the external toothing of the inner gear 104 lies opposite one of the other sets of toothing, in particular opposite the driven-side outer toothing in the outer gear 106, and thus provides the output torque in particular via those pins 101 that abut both the inner toothing and the outer toothing.

Figure 26:
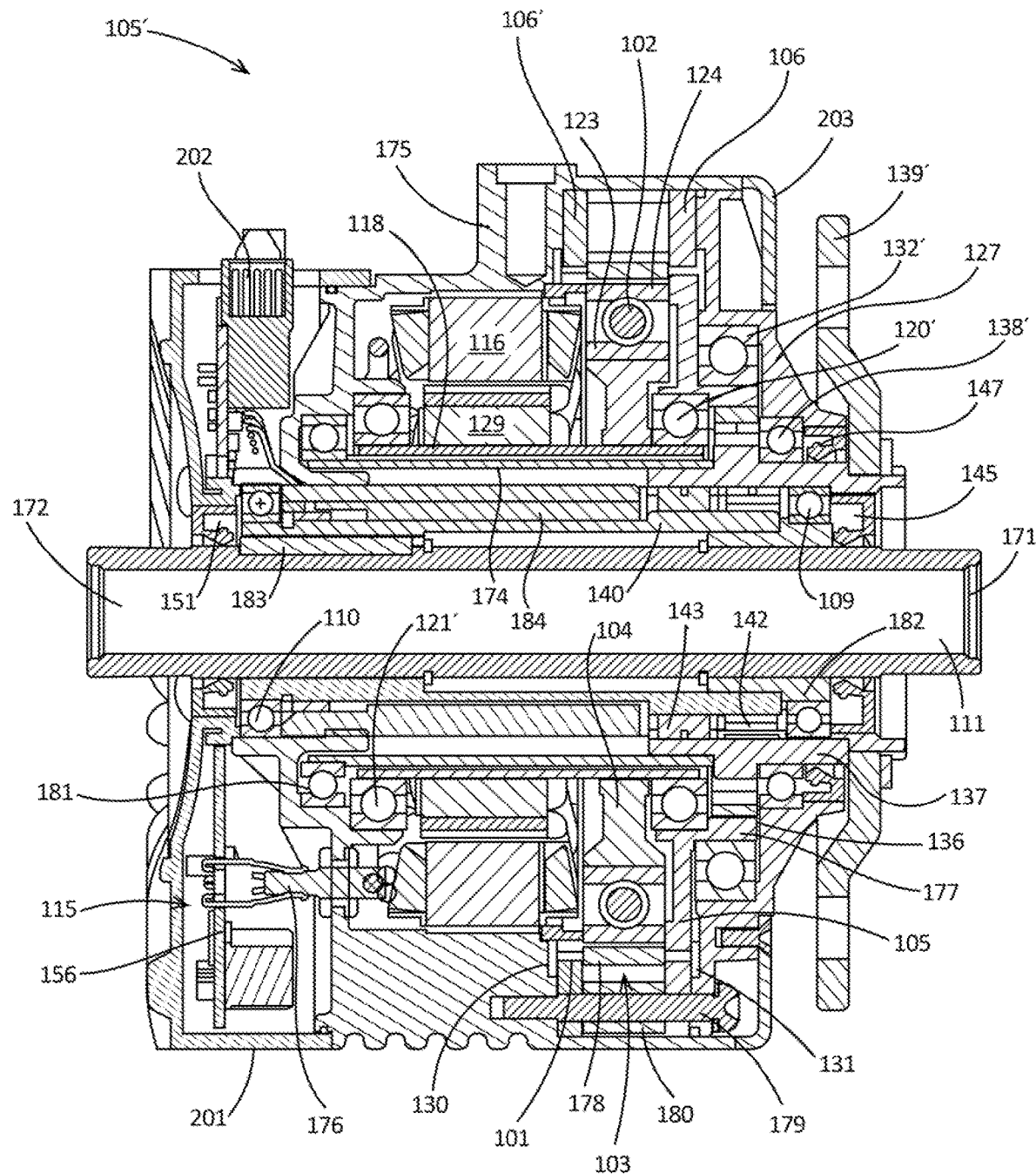
FIGS. 26 to 30 show a further embodiment of a harmonic pin ring gear system 150'. Similar components have the same reference numerals as in the embodiment in FIGS. 15 and 22 or reference numerals with an apostrophe.
Figure 27:
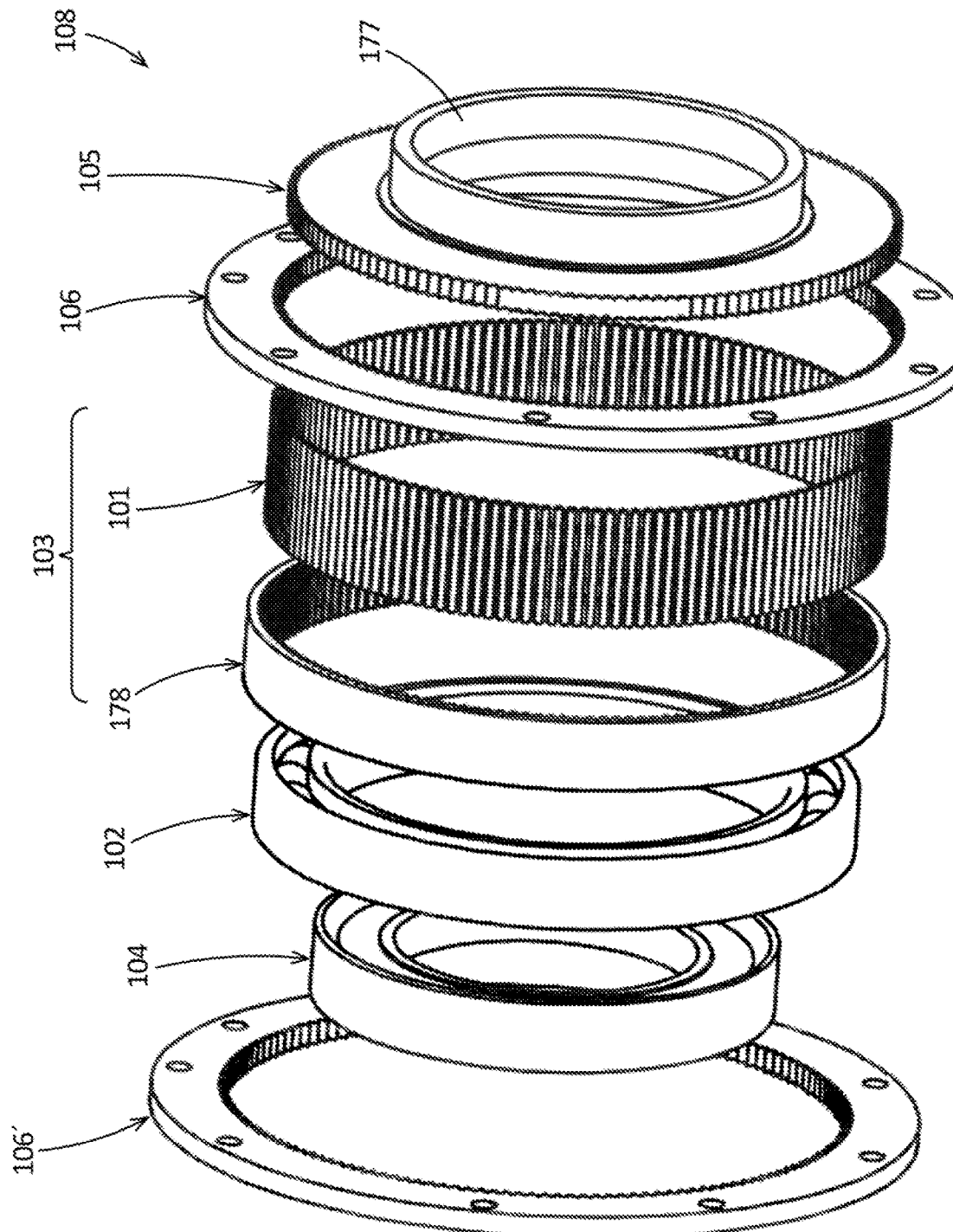

FIG. 27 shows an exploded view of a gear system 108 of the harmonic pin ring gear systems 150' in FIG. 26.

As can be seen particularly clearly in this view, the pins 101 lie in transverse grooves 99 in the pin-retaining ring 178 that are designed as indentations with an essentially semi-circular cross section. Thus on one side of their circumference the pins 101 lie in the transverse grooves in the pin-retaining ring 178 and on the other side of their circumference they lie on the outer ring of the thin-section ball bearing 102 an.

Figure 28:
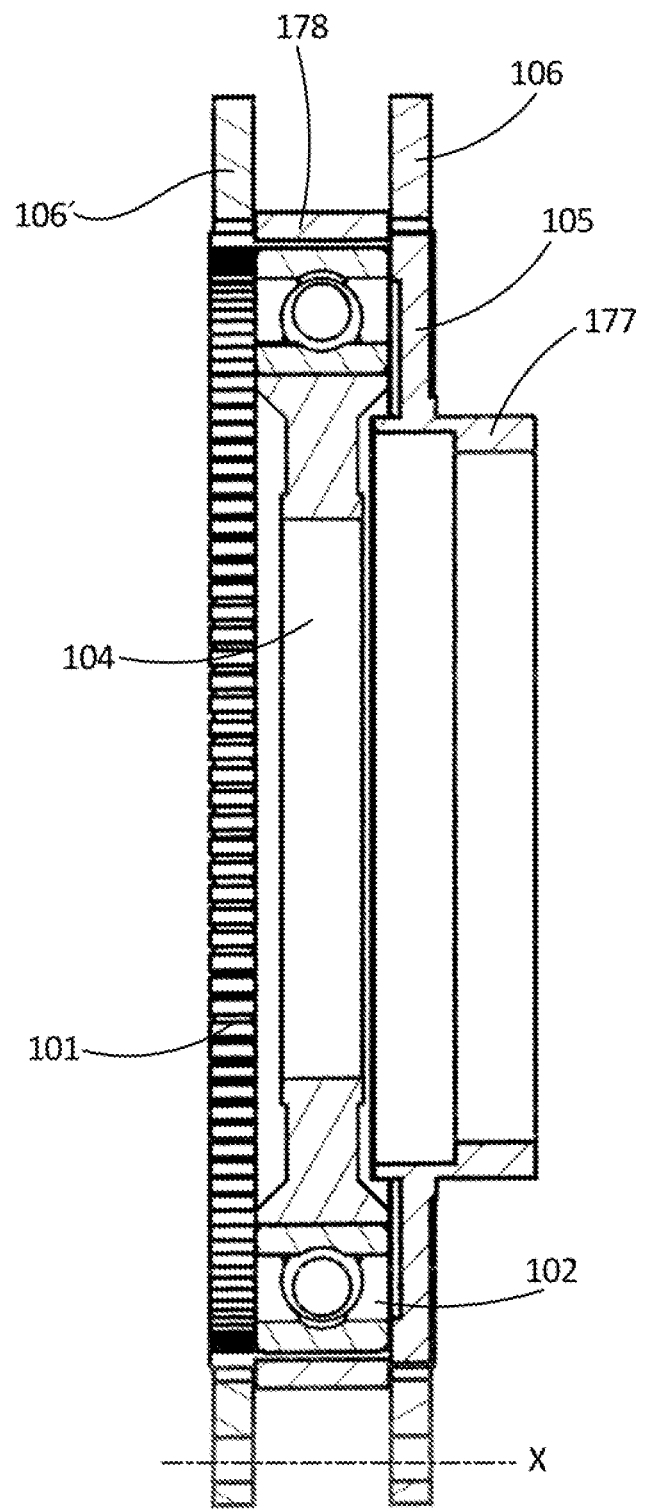

FIG. 28 shows a sectional view of the gear system 108 in FIG. 27 in its assembled state. For the sake of simplicity, only the region of the pins 101 protruding beyond the on the drive side is shown here.

Figure 29:
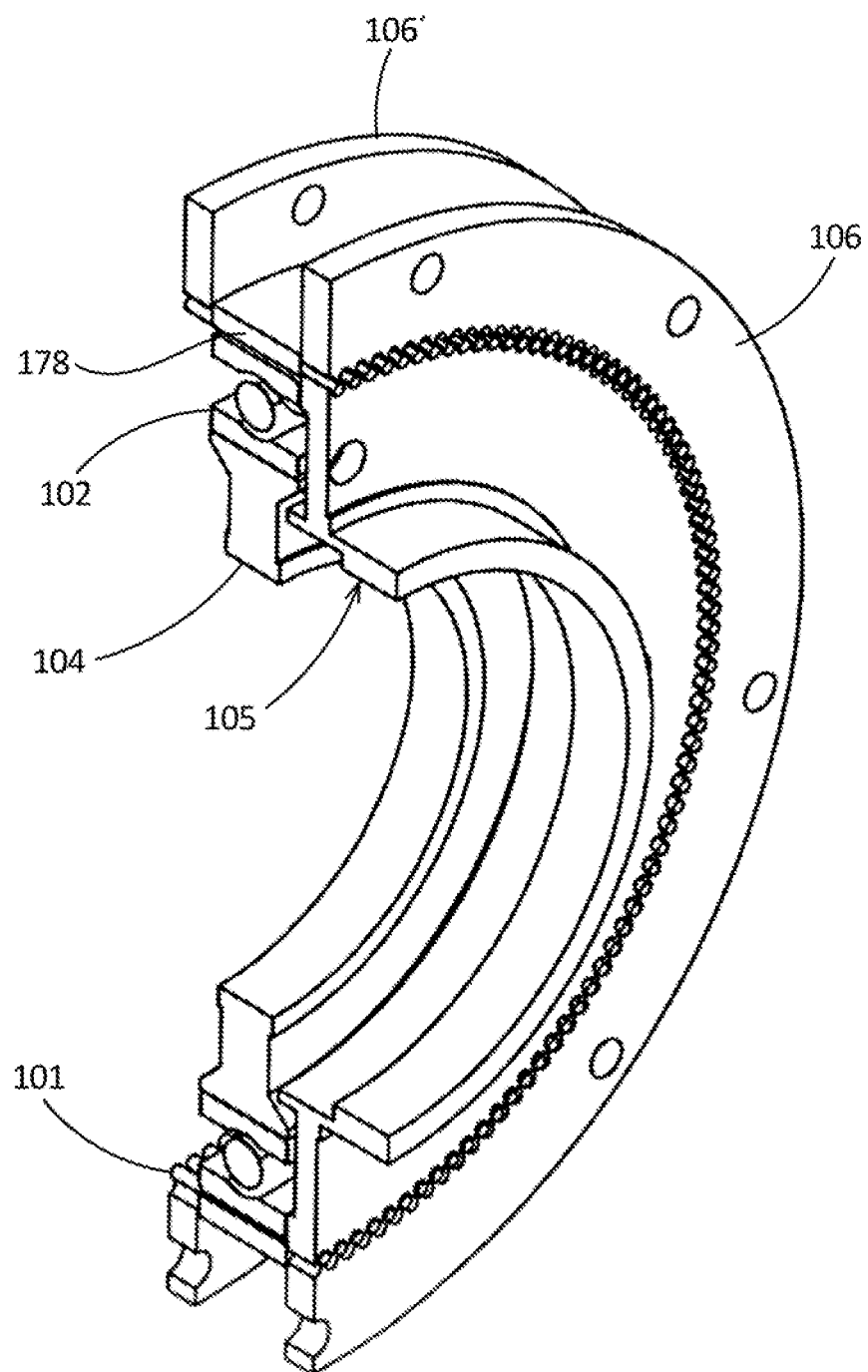

FIG. 29 shows a cut-open three-dimensional view of the gear system 108 in FIG. 27. Here the semi-minor axis of the elliptical cam disk 104 is pointing upwards. In the region of the semi-minor axis the pins 101 abut the external toothing of the inner gear 105 while in the region of the semi-major axis offset at right angles to it they abut the inner toothing of the outer gears 106, 106'. The dimensions of the gearwheels, pins 101 and cam disk 104 are selected such that the pins 101 are always supported on at least one tooth.

Figure 25:
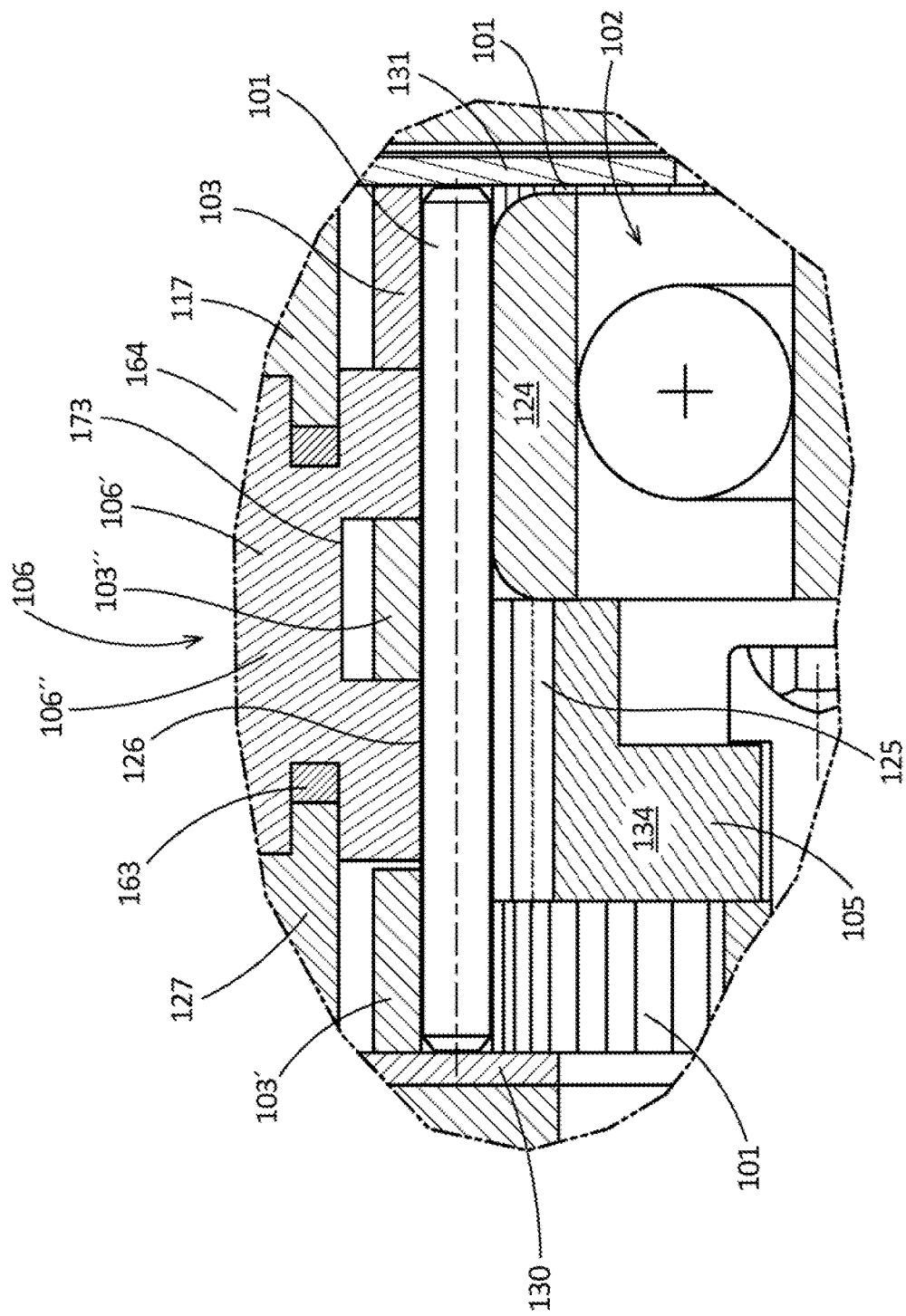
Figure 30:
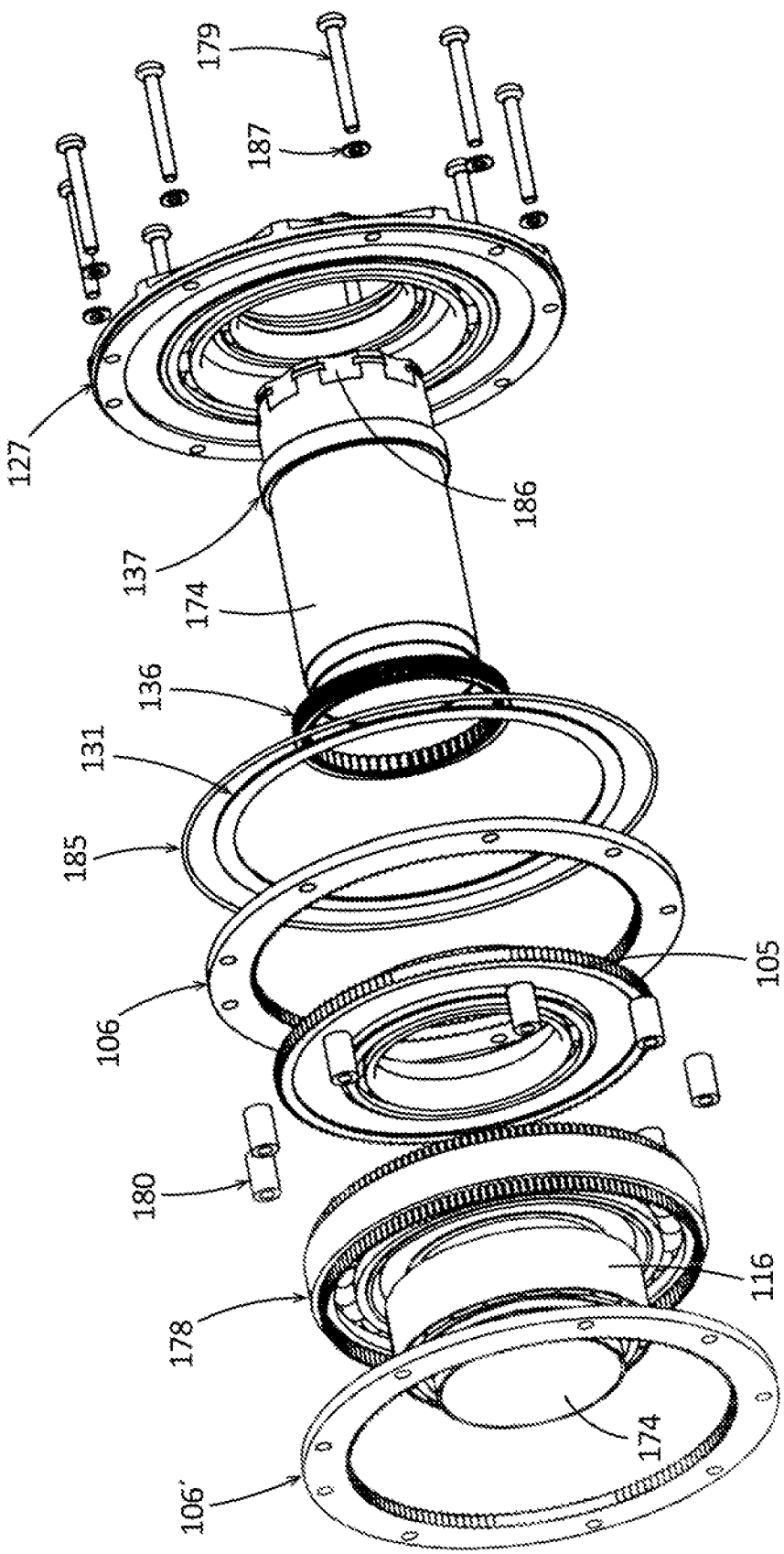

FIG. 30 shows an exploded view of the harmonic pin ring gear systems 150' in FIG. 25.

Figure 5:
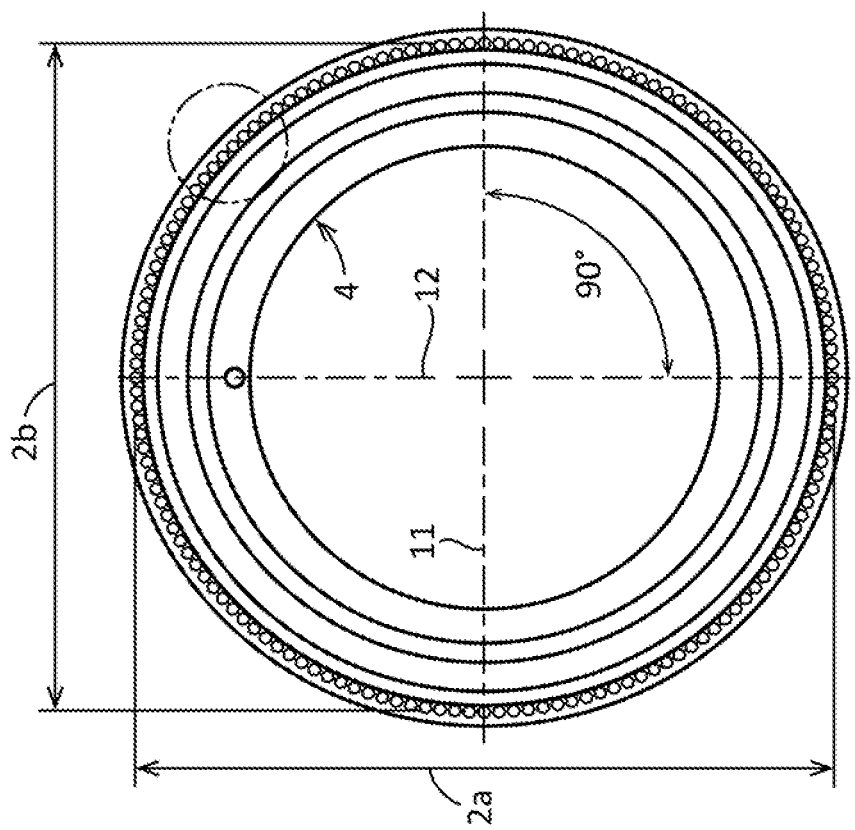
Figure 7:
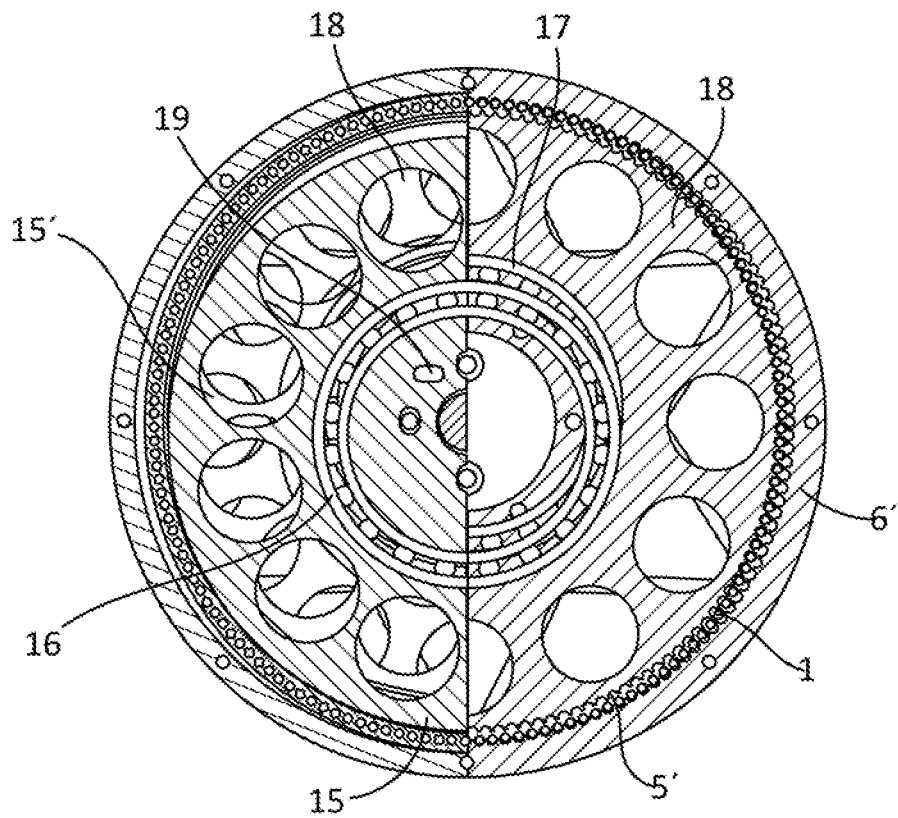

On a driven-side region the driven shaft 137 comprises round indentations 186 that are arranged equidistantly on the circumference of the driven shaft 137. The driven-side region of the driven shaft 137 protrudes in axial direction beyond the housing cover. The chainwheel adapter 139' not shown in FIG. 5 is placed on the driven shaft 137 such that round projections or channels of the chainwheel adapter 139' engage radially from the outside in the round indentations 186 of the driven shaft 137.

The nine screws 179 in FIG. 30 pass through nine screw holes in the housing cover 127, the driven-side outer gear 106 and the drive-side outer gear 106' and are supported on washers 187 on the housing cover 127. In a first assembly step they are tightened only slightly. The outer gears 106, 106' and the housing cover 127 are thus held in their position in relation to the central axis of the gear system by a friction fit only.

The outer gears 106, 106', in particular, have clear and intentional radial play in this position. In a further assembly step the position in the motor housing 175 is adjusted by starting the gear system so that it moves into a compensating position when the internal toothing of the outer gears 106, 106', the external toothing of the inner gear 105 and the pins 101 adjust to one another. Only then are the screws tightened up and the position of the outer gears 106, 106' thereby permanently fixed.

According to a special embodiment the internal toothing of the outer gears 106, 106' and the external toothing of the inner gear 105 are manufactured using inexpensive non-hardened and non-tempered gear steel. As a result the gear system runs in more quickly after manufacture. As the overwhelming majority of the pins abut both the external and the internal toothing and thus contribute to the transmission of the torque, according to this embodiment a material with lower strength can be used. According to a further embodiment the gearwheels are made of plastic.

Particularly good torque transmission results if no more than four pins 101 do not contribute to the transmission of torque, namely those pins 101 located precisely in the prolongation of the semi-minor or semi-major axis of the cam disk and in the tooth base of the inner toothing or the outer toothing.

A method for assembling the harmonic pin ring gear systems 150' is described below. In a first assembly step the pins 101 are arranged around the flex ball bearing 102 and the pin-retaining ring 178 is fixed onto the flex ball bearing 102 such that the pins come to rest in the groove-shaped indentations of the pin-retaining rings 178.

In a further assembly step the rotor 129 is pressed onto the rotor shaft 118 and the cam disk 104 is also pressed onto the rotor shaft 118 on an opposite side. An axial position of the rotor 129 is adjusted with two spacer washers that are arranged on the drive side of the rotor 129.

The motor freewheel 136 and the drive-side rotor ball bearing 120' are inserted into the inner gear 105. The support shaft 174 is placed on the driven shaft 137 and the shaft seal ring 145 is inserted into the driven shaft 137. Moreover, the driven-side follower ball bearing 138' and the inner gear ball bearing 132' are inserted into the housing cover 127.

Furthermore, the inner gear 105 with the driven-side rotor ball bearing 120' and the motor freewheel 136 are placed on the support shaft 174 from the drive side. The housing cover 127 with the ball bearings 132', 138' is placed on the inner gear 105 from the driven side. The driven-side outer gear 106, the thrust ring 131 and an O-ring are placed on the housing cover 127 from the drive side.

The rotor shaft 118 with the components arranged on it is inserted into the driven-side rotor ball bearing 120' from the drive side, and the driven shaft 137 is inserted into the rotor shaft 118 from the drive side.

The stator 116, the drive-side follower ball bearing 181 and the drive-side rotor ball bearing 121' are inserted into the motor housing 175 from the driven side.

The spacer sleeves 180 and the drive-side outer gear 106' are placed on the driven-side outer gear 106 from the drive side. Spacer washers 187 are placed on the screws 179 and the screws 179 are passed from the driven side through the housing cover 127, the driven-side outer gear 106, the spacer sleeves 180 and the drive-side outer gear 106' into screw holes of the motor housing 175 and tightened slightly.

The motor electronics and a drive-side shaft seal ring 151 are then assembled in a cooling cover 201 arranged on the drive side.

A drive-side shaft seal ring 151 is inserted into a cooling cover 201. The circuit board 156, to which a power supply connector 202 is fixed, is screwed to the cooling cover 201, wherein the power supply connector 202 is inserted through an upper opening of the cooling cover 201.

Assembly of a pedal shaft assembly comprises the following assembly steps. The measuring shaft 140 and anti-friction bush 182 are placed on the pedal shaft 111 and the pedal shaft freewheels 142, 143 are placed on the measuring shaft 140. The driven-side pedal shaft ball bearing 109 is placed on the anti-friction bush 182. The measuring shaft 140 with the pedal shaft freewheels 142, 143 is inserted into the driven shaft 137 from the drive side. The coil body 184 is inserted between the measuring shaft 140 and the support shaft 174 from the drive side. The pedal shaft assembly is inserted into the motor housing 175.

Then the cooling cover 202 is screwed onto the motor housing 175, wherein an O-ring is provided between the cooling cover 202 and the motor housing 175. A spacer ring is screwed onto the housing cover 127, the chainwheel adapter 139' is inserted into the round notches 186 of the driven shaft 137 and a retaining ring is bent and inserted into a groove that runs at an angle to the round notches.

The motor housing 175 is screwed to a vehicle frame of a vehicle not shown in FIGS. 26 to 30 and a battery connector of the vehicle that is not shown is connected to the power supply connector 202 of the harmonic pin ring gear system 150'.

Figure 31:
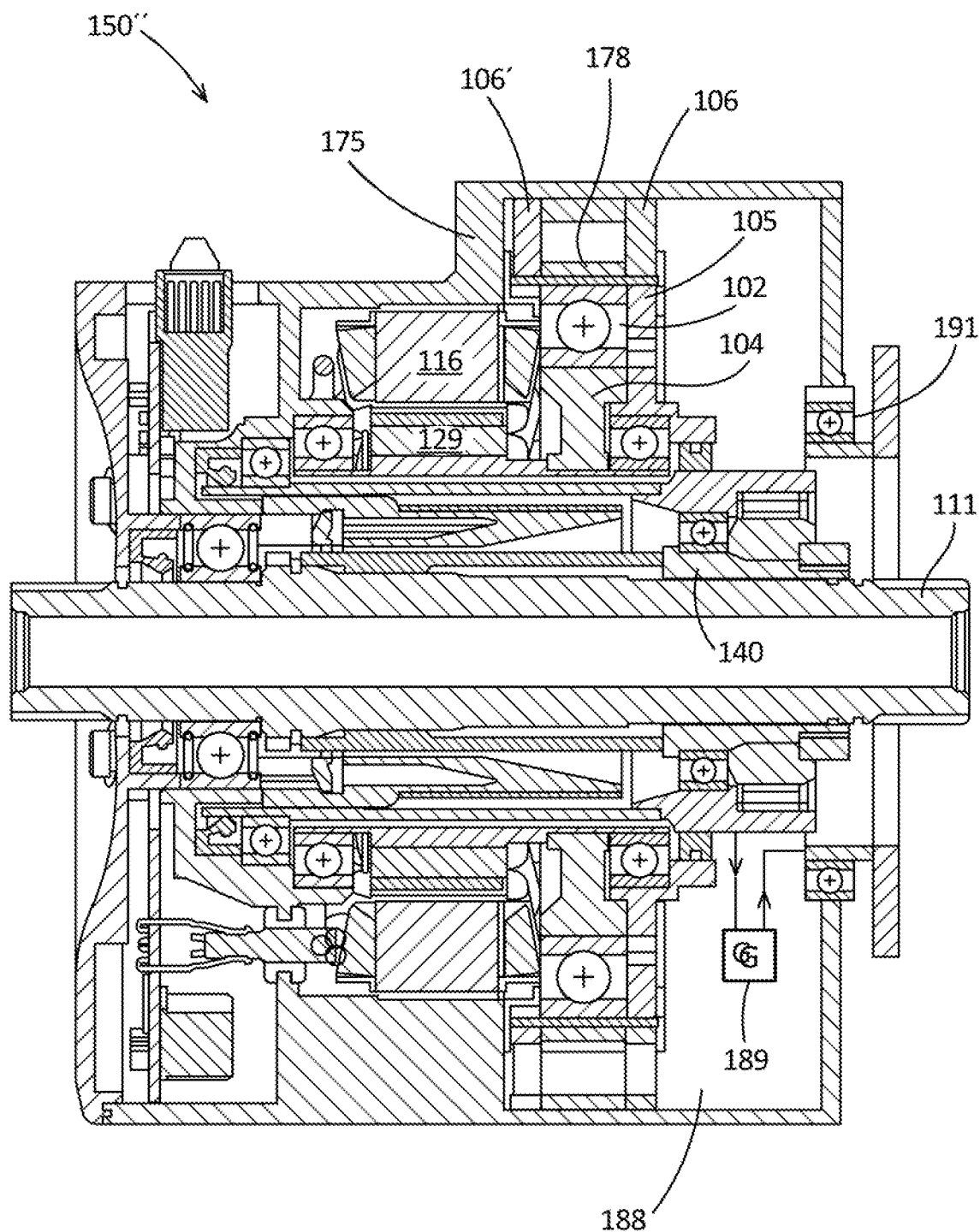

FIG. 31 shows a further harmonic pin ring gear system 150'' that is similar to the harmonic pin ring gear system of FIG. 26, wherein a space 188 for installing a gear system 189 is arranged between the driven shaft 137 and the chainwheel adapter 139'. A harmonic pin ring gear system according to this description can be built so as to save space in axial direction so that with a lateral distance that is predetermined by a typical distance between pedals there is still sufficient space available for a gear system.

Similar components have the same reference numerals as in the embodiment in FIGS. 15 and 22 or reference numerals with apostrophes. For the sake of simplicity, some of the components already referenced in FIG. 26 are not numbered again here.

An output shaft 190 is arranged concentrically outside the driven shaft 137 and mounted on a follower ball bearing 191 inside the motor housing 175. An input of the gear system 189 is connected to the driven shaft 137 and an output of the gear system 189 is connected to the output shaft 190. The gear system 189 is preferably configured as a switchable gear system.

FIGS. 32 to 38 show various embodiments in which the gear system 189 is designed as a planetary gear.

The gear system according to FIG. 31 has differences in arrangement compared to the gear system in FIGS. 26 to 30 which serve inter alia to provide sufficient space for the installation space 188. The pedal bearing shaft 111 is supported directly on the housing on the drive side via a somewhat larger ball bearing 110.

On the driven side, the embodiment in FIG. 31 shows no outward support for the inner gear 105 or the driven shaft 137. The inner gear 105 can be supported outwardly by a ball bearing on the housing 175 as in FIG. 26 or it can be supported on a gear system part of the gear system 189. Similarly, the driven shaft 137 can be supported outwardly by a ball bearing on the motor housing 175 or on the housing cover 127 or it an be supported outwardly on a gear system part of the gear system 189.

A single pedal shaft freewheel 142 is provided instead of two pedal shaft freewheels 142, 143. The measuring shaft 140 is fixed to the pedal shaft 111 on the driven side and a widened support region for the measuring shaft 140 on the pedal shaft 111 is provided instead of an anti-friction bush. The pedal shaft freewheel does not lie directly on the measuring shaft 140. Instead a ring-shaped component is provided between the measuring shaft and the driven shaft 137. The driven-side follower ball bearing 138' is arranged axially inside the pedal shaft freewheel 142.

Figure 32:
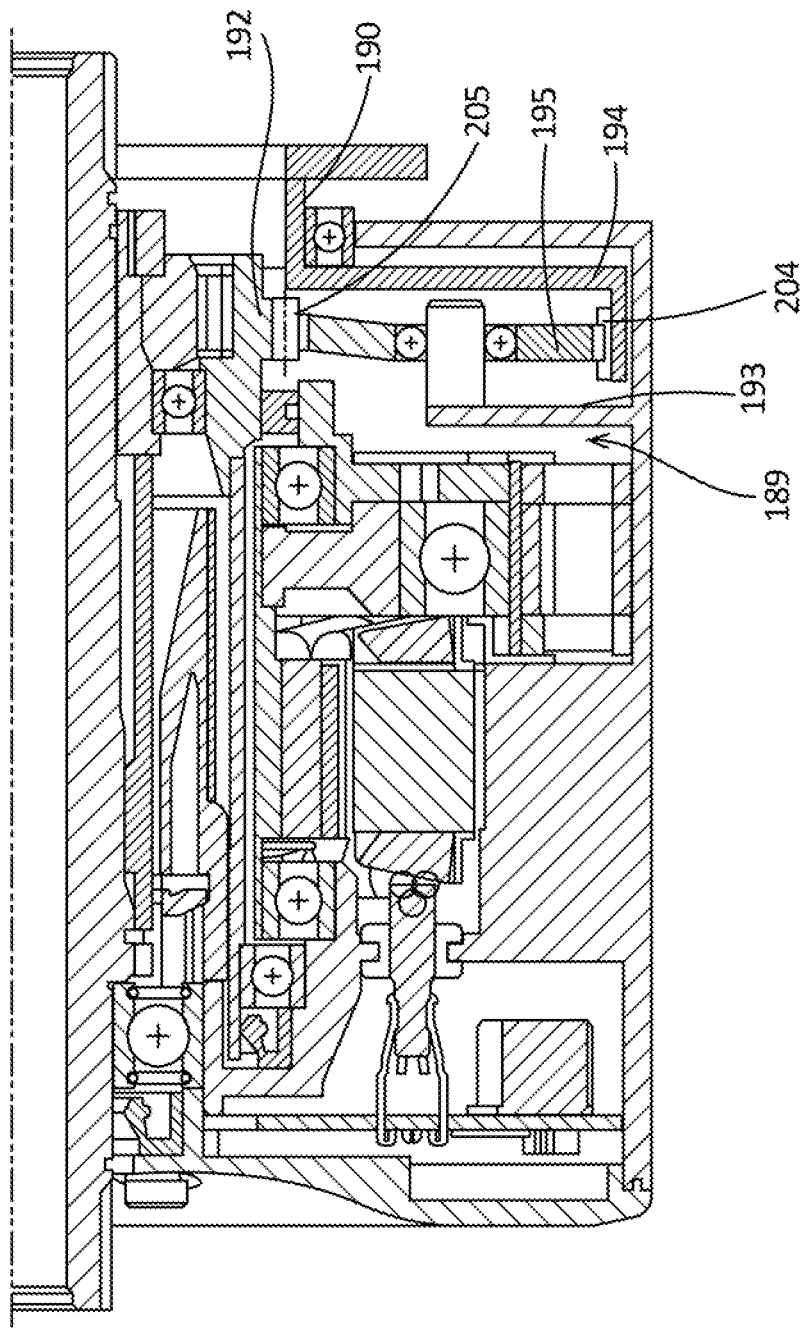

FIG. 32 shows the harmonic pin ring gear system in FIG. 31, wherein the gear system 189 is designed as a planetary gear in which
   a sun wheel 192 having external toothing 205 is connected to the driven shaft 137,
   a planetary carrier 193 on which the planetary gears 195 are mounted is connected to the motor housing 175,
   a hollow wheel 194 having internal toothing 204 is connected to the output shaft 190.

A switchable gear system 189 can, for example, be configured in such a way that a first clutch is arranged between the hollow wheel 194 and the motor housing 175 and a second clutch is arranged between the sun wheel 192 or with the driven shaft 173 and the hollow wheel 194. By loosening the first clutch and tightening the second clutch the driven shaft 173 is connected to the output shaft 190.

Figure 33:
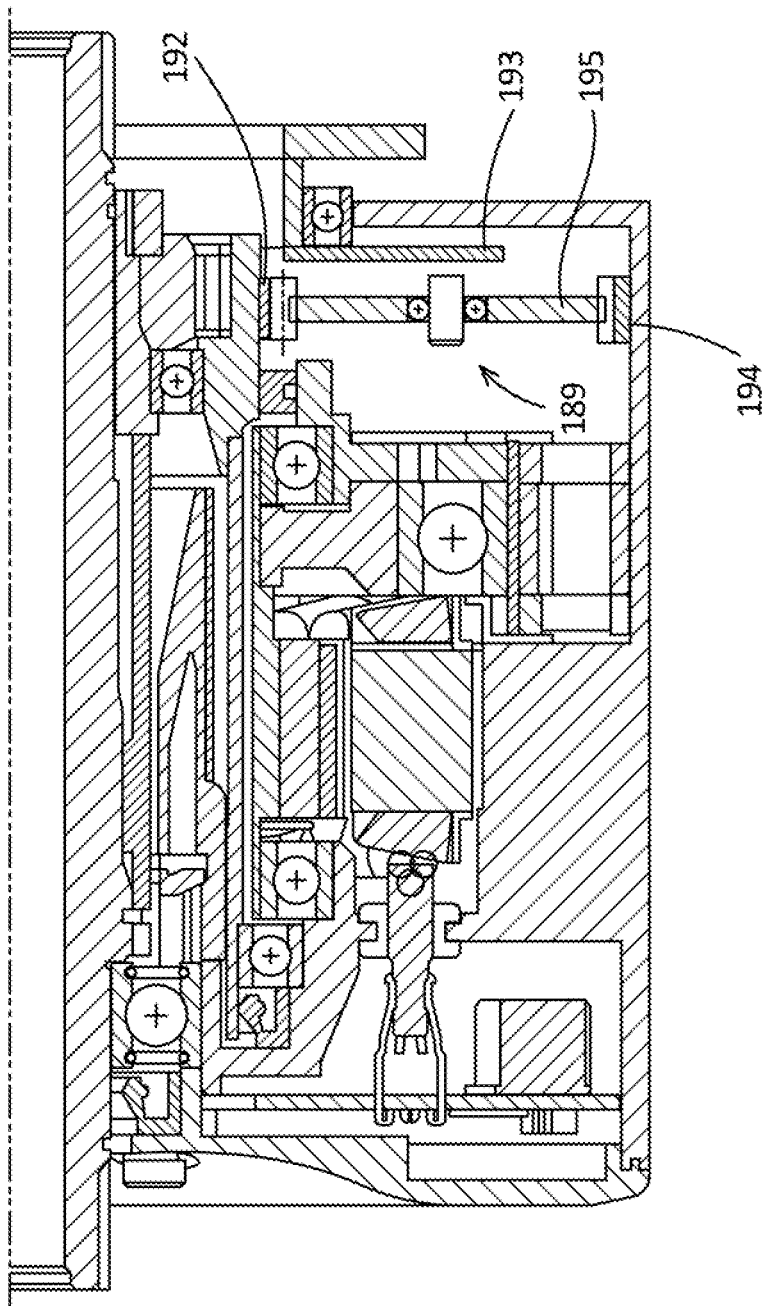

FIG. 33 shows the harmonic pin ring gear system in FIG. 31, wherein the gear system 189 is designed as a planetary gear, in which
   a sun wheel 192 is connected to the driven shaft 137,
   a planetary carrier 193 on which planetary gears 195 are mounted is connected to the output shaft 190,
   a hollow wheel 194 is connected to the motor housing 175.

A switchable gear system 189 can, for example, be configured in such a way that a first clutch is arranged between the planetary carrier 193 and the motor housing 175 and a second clutch is arranged between the planetary carrier 193 and the hollow wheel 194. By loosening the first clutch and tightening the second clutch the driven shaft 137 is connected directly to the output shaft 190.

Figure 34:
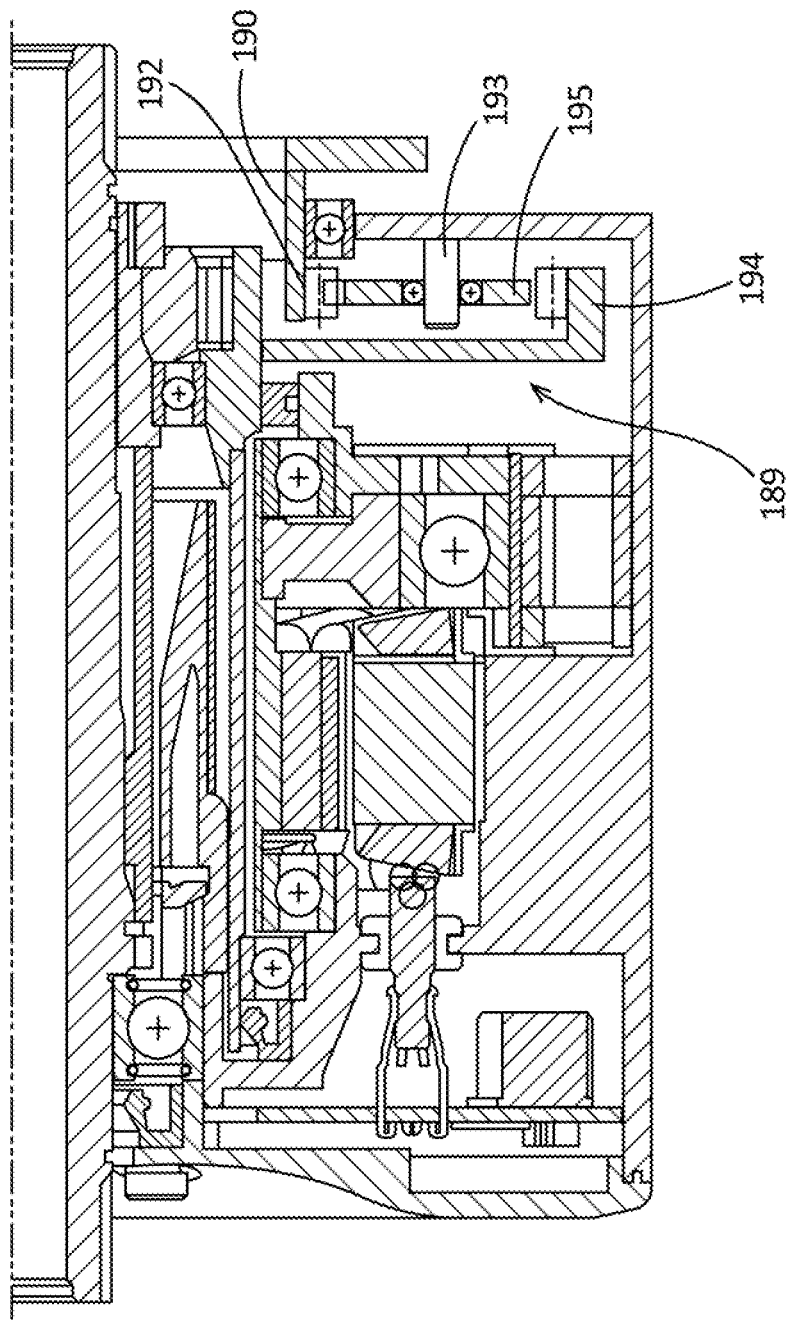

FIG. 34 shows the harmonic pin ring gear system in FIG. 31, wherein the gear system 189 is designed as a planetary gear designed in which
   a sun wheel 192 is connected to the output shaft 190,
   a planetary carrier 193 on which the planetary gears 195 are mounted is connected to the motor housing 175,
   a hollow wheel 194 is connected to the driven shaft 137.

A switchable gear system 189 can, for example, be configured in such a way that a first clutch is arranged between the planetary carrier 193 and the motor housing 175 and a second clutch is arranged between the sun wheel 192 and the hollow wheel 194. By loosening the first clutch and tightening the second clutch the driven shaft 137 is connected directly to the output shaft 190.

Figure 35:
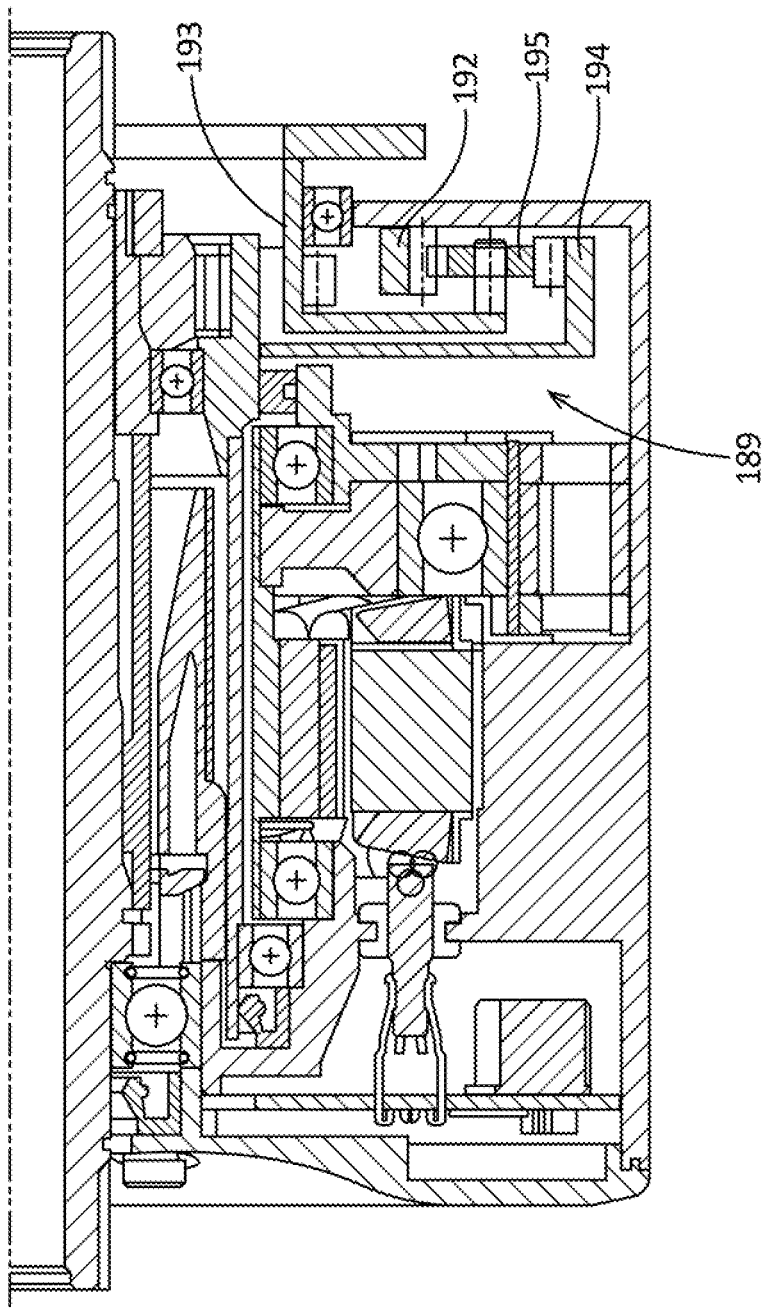

FIG. 35 shows the harmonic pin ring gear system in FIG. 31, wherein the gear system 189 is designed as a planetary gear in which
- a sun wheel 192 is connected to the motor housing 175,
- a planetary carrier 193 on which the planetary gears 195 are mounted is connected to the output shaft 190,
- a hollow wheel 194 is connected to the driven shaft 137.

A switchable gear system 189 can, for example, be configured in such a way that a first clutch is arranged between the sun wheel 192 and the motor housing 175 and a second clutch is arranged between the planetary carrier 193 and the hollow wheel 194. By loosening the first clutch and tightening the second clutch the driven shaft 173 is connected directly to the output shaft 190.

Figure 36:
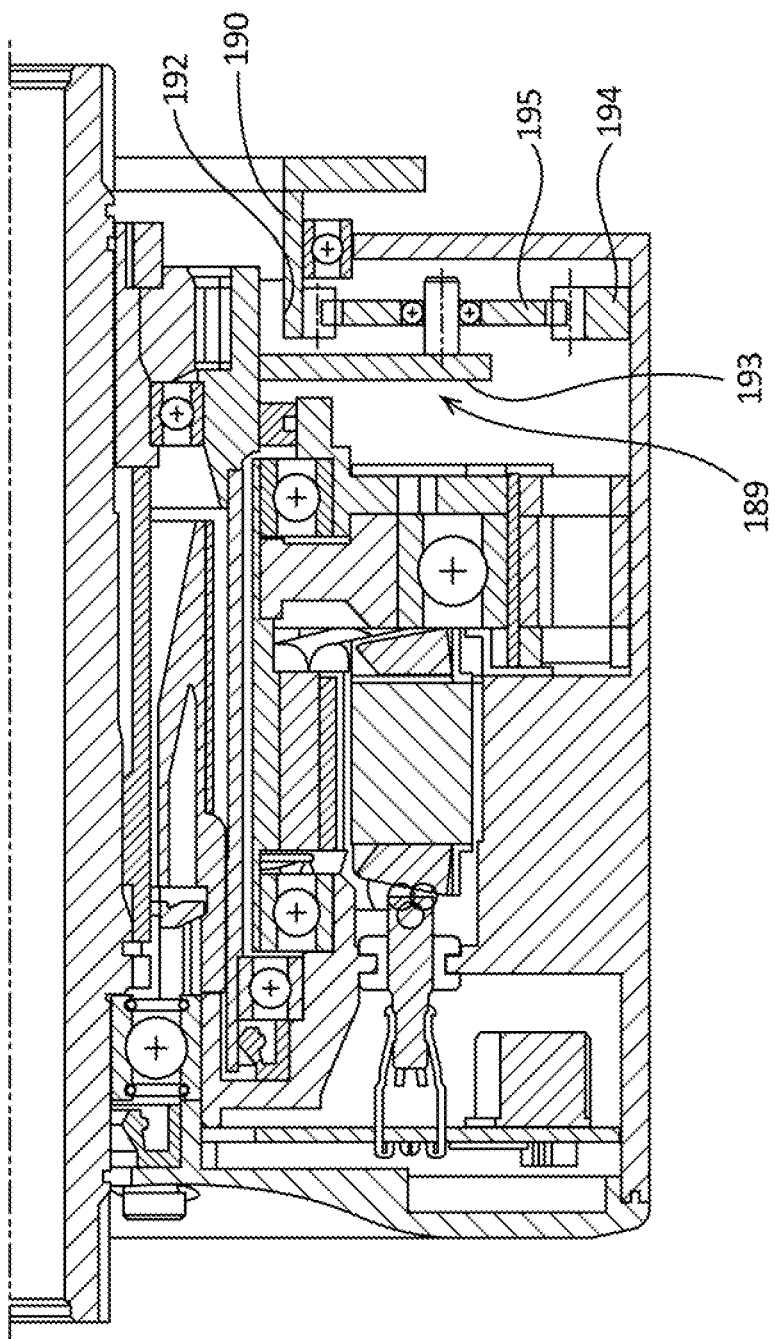

FIG. 36 shows the harmonic pin ring gear system in FIG. 31, wherein the gear system 189 is designed as a planetary gear in which
- a sun wheel 192 is connected to the output shaft 190,
- a planetary carrier 193 on which the planetary gears 195 are mounted is connected to the driven shaft 137,
- a hollow wheel 194 is connected to the motor housing 175.

A switchable gear system 189 can, for example, be configured in such a way that a first clutch is arranged between the hollow wheel 194 192 and the motor housing 175 and a second clutch is arranged between the planetary carrier 193 and the sun wheel 192. By loosening the first clutch and tightening the second clutch the driven shaft 173 is connected directly to the output shaft 190.

Figure 37:
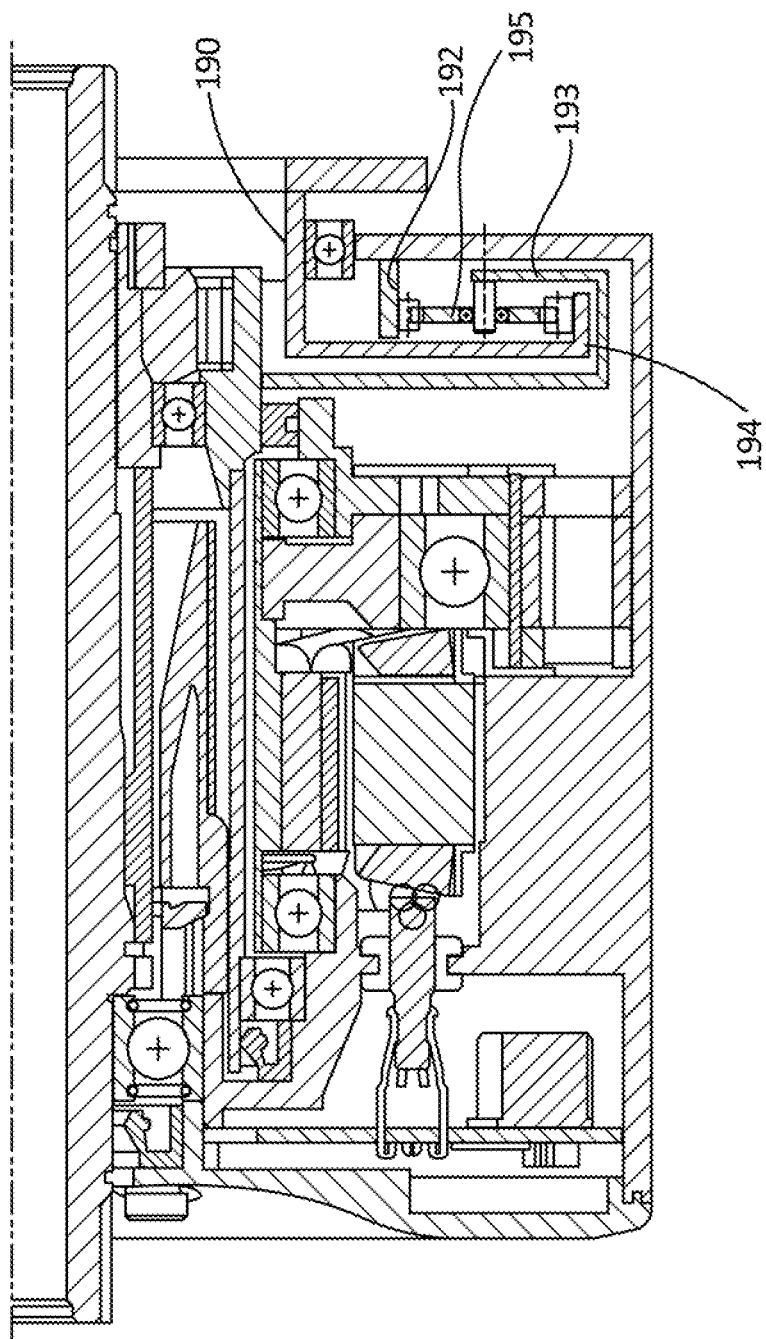

FIG. 37 shows the harmonic pin ring gear system in FIG. 31, wherein the gear system 189 is designed as a planetary gear in which
- a sun wheel 192 is connected to the motor housing 175,
- a planetary carrier 193 on which the planetary gears 195 are mounted is connected to the output shaft 190,
- a hollow wheel 194 is connected to the driven shaft 137.

A switchable gear system 189 can, for example, be configured in such a way that a first clutch is arranged between the sun wheel 192 and the motor housing 175 and a second clutch is arranged between the hollow wheel 194 and the sun wheel 192. By loosening the first clutch and tightening the second clutch the driven shaft 173 is connected directly to the output shaft 190.

Figure 38:
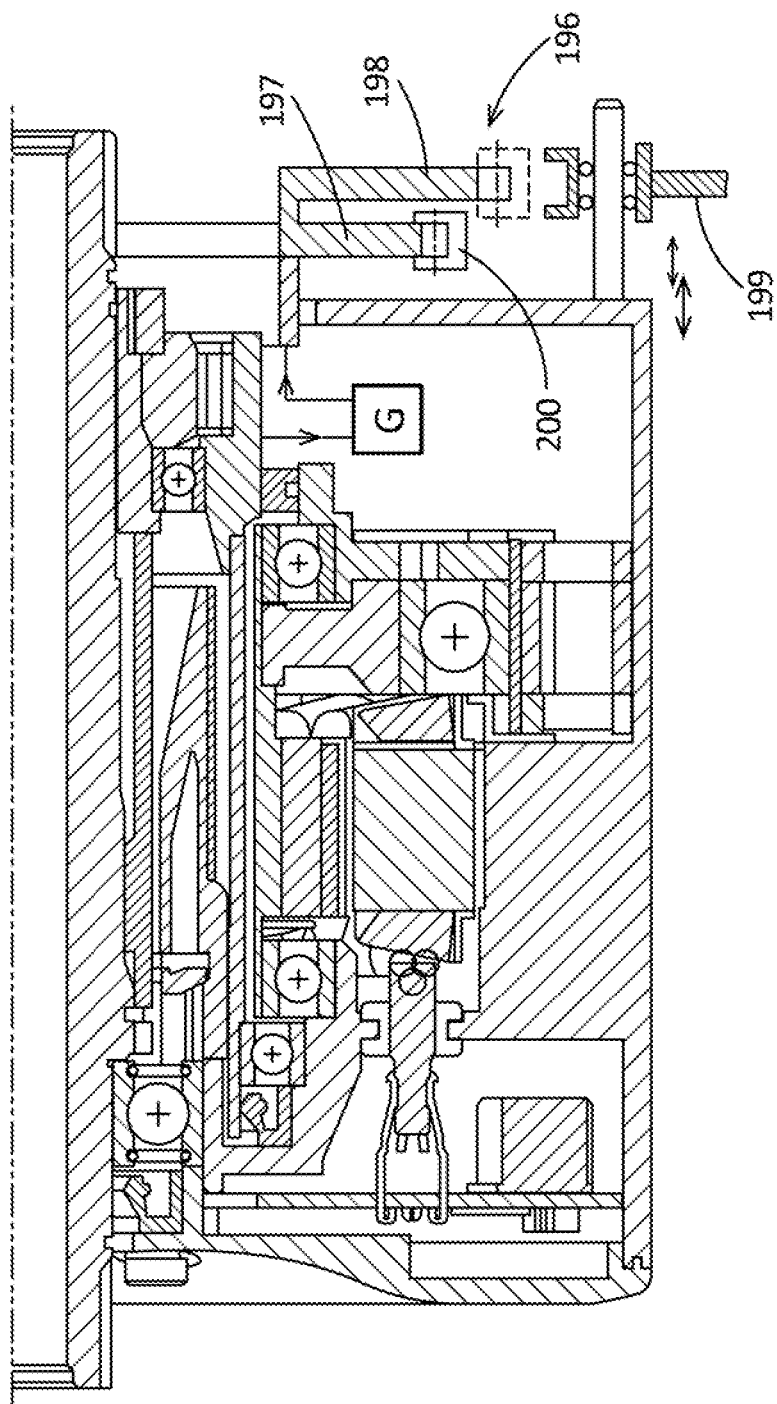

FIG. 38 shows the harmonic pin ring gear system in FIG. 31 with a gear system 189 that can be designed as one of the planetary gears described above, for example, or also as a rigid connection, and a derailleur gear system 196. The derailleur gear system comprises a first output pinion 197 and a second output pinion 198 and a derailleur 199 to optionally connect a chain 200 to the first output pinion 197 or to the second output pinion 198.

Figure 39:
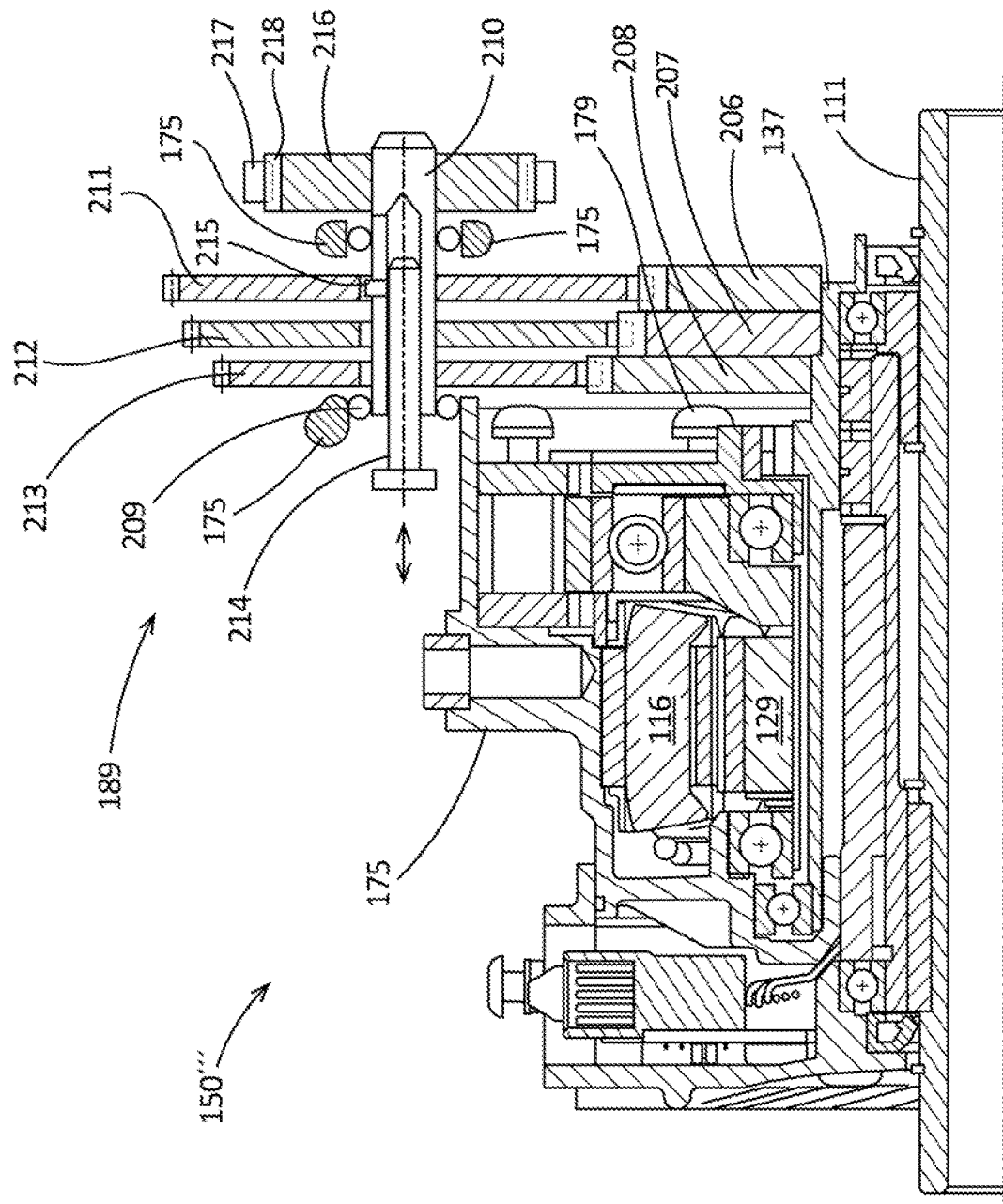

FIG. 39 shows a harmonic pin ring gear system 150''' similar to the gear system in FIG. 26 in which the driven side is designed such that a further change-speed gear system can be connected. In the embodiment in FIG. 39 a linear cam gear system 189 that is connected via a toothed belt 217 to a drive gear of a vehicle that is not shown here is linked to the driven shaft 37.

A mounting 132' of the inner gear 105 and a mounting 138' of the driven shaft 137 that correspond to the mountings in the other embodiments are not shown in FIG. 39.

A fixed wheel 206 of a first gear, a fixed wheel 207 of a second gear and a fixed wheel 208 of a third gear are pressed onto the driven shaft. An auxiliary shaft 210 is mounted on a ball bearing 209 in the motor housing 175. An idler 210 of the first gear, an idler 212 of the second gear and an idler 213 of the third gear are arranged on the auxiliary shaft 210, wherein the idler 211 of the first gear engages in the fixed wheel 206 of the first gear, the idler 212 of the second gear engages in the fixed wheel 207 of the second gear and the idler 213 of the third ear engages in the fixed wheel 208 of the third gear. There is a clearance fit between the idlers 211, 212, 213 and the auxiliary shaft 210, in other words the inner diameters of the idlers 211, 212, 213 are somewhat larger than the diameter of the auxiliary shaft 210 so that the idlers 211, 212, 213 can slide on the auxiliary shaft 210.

From one end to the region in which the idlers 211, 212, 213 are located the auxiliary shaft 210 is designed as a hollow shaft in which a linear cam shaft 214 is arranged such that it can be moved axially. A linear cam 215 is fixed to the linear cam shaft 214. The auxiliary shaft 210 has a slit in axial direction in which the linear cam 215 is able to move in axial direction. The linear cam 215 is dimensioned such that it connects one of the idlers 211, 212, 213 in a friction fit to the auxiliary shaft 210 if the linear cam 215 is moved in an intermediate space between the auxiliary shaft 210 and the idlers 211, 212, 213.

One end of the linear cam shaft 214 that protrudes past the auxiliary shaft 210 is connected to a cable control that is not shown and that is connected to an actuator and/or a hand lever. Here an additional component can be provided for the cable control that slides on the linear cam shaft 214 such that a torque of the linear cam shaft 214 is not transmitted to the cable control.

At one end of the auxiliary shaft 210 opposite the linear cam shaft 214 an output pinion 216 is connected permanently to the auxiliary shaft 210. A toothed belt 217 engages in the toothing of the output pinion 216.

By moving the linear cam shaft 214 backwards and forwards, the idlers 211, 212 and 213 can be connected either to the auxiliary shaft 210 by pressing the linear cam 215 into an intermediate space between the relevant idler 211, 212, 213 and the auxiliary shaft 210.

Instead of a linear cam gear system 189, it is also possible to connect other change-speed gear systems 189 such as a planetary gear, for example, to the driven shaft 137 of the harmonic pin ring gear system.

Different aspects of the embodiments of this description can also be described as in the following list. The various combinations of features disclosed in the list are deemed independent subject-matters and can also be combined with other features of this description.

1. Harmonic-pin ring gear system comprising:
   - at least one inner ring with external toothing and
   - at least one outer ring with internal toothing,
   - a pin ring with pins with a circular cross section,
   - a rotor with a transmitter for drawing the pins of the pin ring into the teeth of the outer rings and into the teeth of the inner ring, wherein the inner ring, the rotor and the outer ring are arranged concentrically in relation to one another, the transmitter is arranged inside the pin ring and the transmitter and the pin ring are arranged between the inner ring and the outer ring, wherein the transmitter is deformed such that the outer ring and the inner ring rotate in relation to one another, wherein, moreover, the shape of the teeth of the outer ring and the shape of the teeth of the inner ring are essentially determined by the envelope of the moving pins and each of the pins is in mesh with the internal toothing of the outer gear or in mesh with the external toothing of the inner gear.

2. Harmonic pin ring gear system according to list item 1, wherein the apex of a pin central point of a pin as the pin moves from one tooth base into an adjacent tooth base of toothing of the inner or outer ring lies on a pitch circle of the opposite toothing.

3. Harmonic pin ring gear system according to list item 2, wherein the cross section of the tooth is shaped like a sector of a circle.

4. Harmonic pin ring gear system according to one of the preceding list items, wherein the tooth flanks run into the tooth base perpendicular to the pitch circle of the toothing.

5. Harmonic pin ring gear system according to list item 1, wherein the pin trajectory of a pin centre point of a pin as the pin moves from one tooth base into an adjacent tooth base is determined by a section of an ellipse.

6. Ring according to list item 1, wherein the pin trajectory of a pin centre point of a pin as the pin moves from one tooth base into an adjacent tooth base is determined by a section of a sine-overlaid circular shape.

7. Harmonic pin ring gear system according to list item 1, wherein the pin trajectory of a pin centre point of a pin as the pin moves from one tooth base into an adjacent tooth base is essentially determined by a shape of the transmitter compressed along an angular coordinate.

8. Harmonic pin ring gear system according to one of the preceding list items, wherein the root circle of the teeth of the inner gear is essentially located twice the circumference of the pins from the root circle of the teeth of the outer gear.

9. Inner ring with external toothing for a harmonic pin ring gear system comprising a pin ring with pins having a circular cross section, a rotor with a transmitter for drawing the pins of the pin ring into the teeth of the inner ring, wherein the inner ring and the rotor are arranged concentrically in relation to one another and the transmitter is arranged inside the pin ring, wherein the transmitter deforms the pin ring such that the inner ring rotates relative to an outer ring arranged concentrically to the inner ring, wherein the inner ring
  comprises tooth bases with a profile in the form of a segment of a circle arranged a regular distances, and
  teeth arranged between the tooth bases, wherein the shape of the teeth is essentially determined by the envelope of the moving pins.

10. Inner ring according to list item 9, wherein the profile of the tooth bases is semi-circular in shape.

11. Inner ring according to list item 9 or list item 10, wherein the tooth flanks run into the tooth base perpendicular to the pitch circle of the toothing.

12. Outer ring with external toothing for a harmonic pin ring gear system comprising a pin ring with pins having a circular cross section, a rotor with a transmitter for drawing the pins of the pin ring into the teeth of the inner ring, wherein the outer ring and the rotor are arranged concentrically in relation to one another and the transmitter is arranged inside the pin ring, wherein the transmitter deforms the pin ring such that the outer ring rotates relative to an inner ring that is arranged concentrically to the outer ring, wherein the outer ring
  comprises tooth bases with a profile in the form of a segment of a circle arranged a regular distances, and
  teeth arranged between the tooth bases, wherein the shape of the teeth is essentially determined by the envelope of the moving pins.

13. Inner ring according to list item 12, wherein the profile of the tooth bases are semi-circular in shape.

14. Inner ring according to list item 12 or list item 13, wherein the tooth flanks perpendicular to the pitch circle of the toothing run into the tooth base.

Different aspects of the embodiments of this description can also be described as in the following list. The various combinations of features disclosed in the list are deemed independent subject-matters and can also be combined with other features of this description.

1. Harmonic pin ring gear system comprising an input shaft and an output shaft, wherein the harmonic pin ring gear system has the following features:
  an outer gear with internal toothing,
  an inner gear with external toothing arranged concentrically to the outer gear and in axial direction inside the outer gear, and
  a drive means extending between the outer gear and the inner gear, comprising a pin ring formed as one part in circumferential direction and a multiplicity of pins that protrude laterally in axial direction from the pin ring,
  a rotary transmitter for lifting the drive means of the external toothing of the inner gear and pressing the drive means into the internal toothing of the outer gear,
  wherein in a first region a radial force flow runs in a straight direction from the transmitter via at least one pin to the internal toothing of the outer gear and in a second region a radial force flow runs in a straight direction from at least one pin to the external toothing of the inner gear.

2. Harmonic pin ring gear system according to list item 1, wherein a radial force flow runs in a straight direction from the internal toothing of the outer ring via at least one pin to the external toothing of the inner gear.

3. Harmonic pin ring gear system according to list item 1 or list item 2, wherein the pin ring is located in axial direction on an outer side of the outer gear.

4. Harmonic pin ring gear system according to one of list items 1 to 3, wherein the drive means abuts the transmitter around its entire circumference.

5. Harmonic pin ring gear system according to list item 4, wherein the transmitter comprises an oval-shaped cam disk and a flexible thin-section roller bearing, wherein the flexible thin-section roller bearing lies on the oval cam disk and the pins lie on an outer ring of the flexible thin-section roller bearing.

6. Harmonic pin ring gear system according to one of list items 1 to 3, wherein the drive means abuts the circumference of the transmitter except in a first region about a first angular position and in a second region about a second angular position, wherein the first angular position is offset by 180 degrees in relation to the second angular position.

7. Harmonic pin ring gear system according to list item 6 comprising a double eccentric cam with a first eccentric cam with a first axis of rotation and a second eccentric cam with a second axis of rotation, wherein the first angular position and the second angular position are offset by 45 degrees in relation to a semi-major axis connecting the first axis of rotation and the second axis of rotation.

8. Harmonic pin ring gear system according to one of the preceding list items, wherein the transmitter is connected to the input shaft and the output shaft is connected to the inner gear or to the outer gear.

9. Harmonic pin ring gear system according to one of list items 1 to 7, wherein the transmitter is connected to the output shaft and the input shaft is connected to the inner gear or to the outer gear.

10. Harmonic pin ring gear system according to one of the preceding list items, wherein the pin ring comprises channels arranged in axial direction for receiving the pins that arranged on an inside of the pin ring.

11. Harmonic pin ring gear system according to one of the preceding list items comprising a second pin ring arranged in radial direction in relation to the inner ring, whereby an end region of the pins is arranged between the second pin ring and the inner ring.

12. Harmonic pin ring gear system according to one of the preceding list items comprising a middle pin ring, wherein a middle region of the pins abuts the middle pin ring and the outer gear comprises a channel in which the middle pin ring runs.

13. Harmonic pin ring gear system according to one of the preceding list items, wherein the inner gear comprises an inner gear holder fixed to the inner gear and comprises an inner gear roller bearing supported radially inwards on a gear housing, wherein the inner gear and the inner gear holder encompass an outer ring of the inner gear roller bearing.

14. Harmonic pin ring gear system according to one of the preceding list items, wherein the output shaft is designed as a hollow driven shaft and comprises a freewheel, wherein the freewheel is arranged between the driven shaft and an inner region of the inner gear.

15. Harmonic pin ring gear system according to one of the preceding list items comprising a crankshaft and a crankshaft freewheel, wherein the crankshaft is arranged concentrically to the hollow driven shaft inside the hollow driven shaft and the crankshaft freewheel is arranged between the crankshaft and the hollow driven shaft.

16. Harmonic pin ring gear system according to one of the preceding list items comprising a first thrust washer and a second thrust washer, wherein the first thrust washer is arranged adjacent to a first axial lateral face of the pins and the second thrust washer is arranged adjacent to an opposite second axial lateral face of the pins.

17. Harmonic pin ring drive of the gear unit comprising a harmonic pin ring gear system according to one of the preceding list items and a motor unit, wherein a rotor shaft of a motor of the motor unit is connected mechanically to the cam disk of the gear unit.

18. Harmonic pin ring drive of claim 17, wherein the motor is designed as an internal rotor motor.

19. Motor vehicle comprising a harmonic pin ring drive according to list item 16 or list item 17, wherein a drive gear of the motor vehicle is connected to the output shaft of the harmonic pin ring drive.

20. Pin ring arrangement comprising a multiplicity of pins, a pin ring for holding the pins and a transmitter for exerting a radially outwardly directed force onto the pins, wherein the transmitter is arranged inside the pin ring and the pins lie at least predominantly on a outer circumference of the transmitter.

21. Pin ring arrangement according to list item 20, wherein the transmitter comprises an eccentric cam arranged eccentrically to an axis of rotation of the transmitter.

22. Pin ring arrangement according to list item 21, wherein the transmitter comprises a second eccentric cam arranged eccentrically to an axis of rotation of the transmitter.

23. Pin ring arrangement according to list item 20, wherein the transmitter comprises an oval cam disk and a thin-section ball bearing that lies on the oval cam disk, wherein the pins lie on an outer ring of the thin-section ball bearing.

Different aspects of the embodiments of this description can also be described as in the following list. The various combinations of features disclosed in the list are deemed independent subject-matters and can also be combined with other features of this description.

1. Harmonic pin ring gear system comprising an input shaft and an output shaft, wherein said harmonic pin ring gear system has the following features:
two outer gears, each with internal toothing,
a single inner gear with external toothing arranged concentrically to a first outer gear and inside said first outer gear in axial direction, and
a drive means extending between the two outer gears and the inner gear comprising a pin ring formed as one part in circumferential direction and a multiplicity of pins that protrude laterally in axial direction from the pin ring,
a rotary transmitter for lifting the drive means off the external toothing of the inner gear and pressing the drive means into the internal toothing of the outer gear.

2. Harmonic pin ring gear system of claim 1, characterised in that in a first axial region a radial force flow runs in a straight direction from the transmitter via at least one pin to the internal toothing of the outer gear, wherein in a second axial region a radial force flow runs in a straight direction from at least one pin to the external toothing of the inner gear.

3. Harmonic pin ring gear system of claim 1 or claim 2, wherein a radial force flow runs in a straight direction from the internal toothing of the outer ring via at least one pin to the external toothing of the inner gear.

4. Harmonic pin ring gear system according to one of claims 1 to 3, wherein the pin ring is located on one outer side of the outer gear in axial direction.

5. Harmonic pin ring gear system according to one of claims 1 to 4, wherein the drive means abuts the transmitter around its entire circumference.

6. Harmonic pin ring gear system of claim 5, wherein the transmitter comprises an oval-shaped cam disk and a flexible thin-section roller bearing, wherein the flexible thin-section roller bearing lies on the oval cam disk and the pins lie on an outer ring of the flexible thin-section roller bearing.

7. Harmonic pin ring gear system according to one of claims 1 to 4, wherein the drive means abuts the circumference of the transmitter except in a first region about a first angular position and in a second region about a second angular position, wherein the first angular position is offset by 180 degrees in relation to the second angular position.

8. Harmonic pin ring gear system of claim 7 comprising a double eccentric cam with a first eccentric cam with a first axis of rotation and a second eccentric cam with a second axis of rotation, wherein the first angular position and the second angular position are each offset by 45 degrees in relation to a semi-major axis that connects the first axis of rotation to the second axis of rotation.

9. Harmonic pin ring gear system according to one of the preceding claims, wherein the transmitter is connected to the input shaft and the output shaft is connected to the inner gear or to one of the two outer gears.

10. Harmonic pin ring gear system according to one of claims 1 to 8, wherein the transmitter is connected to the output shaft and the input shaft is connected to the inner gear or to the outer gear.

11. Harmonic pin ring gear system according to one of the preceding claims, wherein the pin ring comprises open channels arranged in axial direction to receive the pins that are arranged on an inner side of the pin ring.

12. Harmonic pin ring gear system according to one of the preceding claims comprising a second pin ring arranged in radial direction in relation to the inner ring, wherein a end region of the pin is arranged between the second pin ring and the inner ring.

13. Harmonic pin ring gear system according to one of the preceding claims comprising a middle pin ring, wherein a middle region of the pin abuts the middle pin ring and the outer gear has a channel in which the middle pin ring runs.

14. Harmonic pin ring gear system according to one of the preceding claims, wherein the inner gear comprises an inner gear holder that is fixed to the inner gear and an inner gear roller bearing supported radially inwardly by a gear housing, wherein the inner gear and the inner gear holder encompass an outer ring of the inner gear roller bearing.

15. Harmonic pin ring gear system according to one of the preceding claims, wherein the output is designed as a hollow driven shaft and has a freewheel, wherein the freewheel is arranged between the hollow driven shaft and an inner region of the inner gear.

16. Harmonic pin ring gear system according to one of the preceding claims comprising a crankshaft and a crankshaft freewheel, wherein the crankshaft is arranged concentrically to the hollow driven shaft inside the hollow driven shaft and the crankshaft freewheel is arranged between the crankshaft and the hollow driven shaft.

17. Harmonic pin ring gear system according to one of the preceding claims comprising a first washer and a second thrust washer, wherein the first thrust washer is arranged adjacent to a first axial lateral face of the pins and the second thrust washer is arranged adjacent to an opposite second axial lateral face of the pins.

18. Harmonic pin ring gear system according to one of the preceding claims, wherein the outer gears are held in their positions relative to the central axis of the gear system by a frictional connection and have radial play relative to this position when loose.

19. Drive shaft for transmitter is mounted on one side in the inner gear which is in turn mounted in the housing.

20. Harmonic pin ring drive comprising a gear unit with a harmonic pin ring gear system according to one of the preceding claims and a motor unit, wherein a rotor shaft of a motor of the motor unit is connected mechanically to the cam disk of the gear unit.

21. Harmonic pin ring drive of claim 20, wherein the motor is designed as an internal rotor motor.

22. Harmonic pin ring drive of claim 20 or claim 21, wherein a driven shaft arranged inside the input shaft is mounted on two bearings, wherein the motor is provided between the two bearings of the drive shaft.

23. Harmonic pin ring drive of claim 22, wherein the driven shaft is designed in two parts, wherein a support shaft is fixed on the driven shaft.

24. Harmonic pin ring drive according to one of claims 20 to 23 comprising a pedal bearing shaft arranged in the driven shaft and a torque sensor in the region between the driven shaft and the pedal bearing shaft, wherein the driven shaft is designed such that the torque sensor is shielded from electromagnetic radiation of the stator.

25. Motor vehicle comprising a harmonic pin ring drive according to one of claims 20 to 25, wherein a drive gear of the motor vehicle is connected to the output shaft of the harmonic pin ring drive.

26. Pin ring arrangement comprising a multiplicity of pins, a pin ring for holding the pins and a transmitter for exerting a radial, outwardly directed force onto the pins, wherein the transmitter is arranged inside the pin ring and the pins lie at least predominantly on a outer circumference of the transmitter.

27. Pin ring arrangement of claim 26, wherein the transmitter comprises an eccentric cam arranged eccentrically to an axis of rotation of the transmitter.

28. Pin ring arrangement of claim 27, wherein the transmitter comprises a second eccentric cam arranged eccentrically to an axis of rotation of the transmitter.

29. Pin ring arrangement of claim 26, wherein the transmitter comprises an oval cam disk and a thin-section ball bearing that lies on the oval cam disk, wherein the pins lie on an outer ring of the thin-section ball bearing.

Different aspects of the embodiments of this description can also be described as in the following list. The various combinations of features disclosed in the list are deemed independent subject-matters and can also be combined with other features of this description.

1. Harmonic pin ring gear system comprising an input shaft and an output shaft, wherein said harmonic pin ring gear system has the following features:
   two outer gears, each with internal toothing,
   a single inner gear with external toothing arranged concentrically to a first outer gear and inside said first outer gear in axial direction, and
   a drive means extending between the two outer gears and the inner gear comprising a pin ring formed as one part in circumferential direction and a multiplicity of pins that protrude laterally in axial direction from the pin ring,
   a rotary transmitter for lifting the drive means off the external toothing of the inner gear and pressing the drive means into the internal toothing of the outer gear.

2. Harmonic pin ring gear system according to item 1, characterised in that in a first axial region a radial force flow runs in a straight direction from the transmitter via at least one pin to the internal toothing of the outer gear, wherein in a second axial region a radial force flow runs in a straight direction from at least one pin to the external toothing of the inner gear.

3. Harmonic pin ring gear system according to item 1 or item 2, wherein a radial force flow runs in a straight direction from the internal toothing of the outer ring via at least one pin to the external toothing of the inner gear.

4. Harmonic pin ring gear system according to one of items 1 to 3, wherein the pin ring is located on one outer side of the outer gear in axial direction.

5. Harmonic pin ring gear system according to one of items 1 to 4, wherein the drive means abuts the transmitter around its entire circumference.

6. Harmonic pin ring gear system according to item 5, wherein the transmitter comprises an oval-shaped cam disk and a flexible thin-section roller bearing, wherein the flexible thin-section roller bearing lies on the oval cam disk and the pins lie on an outer ring of the flexible thin-section roller bearing.

7. Harmonic pin ring gear system according to one of items 1 to 4, wherein the drive means abuts the circumference of the transmitter except in a first region about a first angular position and in a second region about a second angular position, wherein the first angular position is offset by 180 degrees in relation to the second angular position.

8. Harmonic pin ring gear system according to item 7 comprising a double eccentric cam with a first eccentric cam with a first axis of rotation and a second eccentric cam with a second axis of rotation, wherein the first angular position and the second angular position are each offset by 45 degrees in relation to a semi-major axis that connects the first axis of rotation to the second axis of rotation.

9. Harmonic pin ring gear system according to one of the preceding items, wherein the transmitter is connected to the input shaft and the output shaft is connected to the inner gear or to one of the two outer gears.

10. Harmonic pin ring gear system according to one of items 1 to 8, wherein the transmitter is connected to the output shaft and the input shaft is connected to the inner gear or to the outer gear.

11. Harmonic pin ring gear system according to one of the preceding items, wherein the pin ring comprises open channels arranged in axial direction to receive the pins that are arranged on an inner side of the pin ring.

12. Harmonic pin ring gear system according to one of the preceding items comprising a second pin ring arranged in radial direction in relation to the inner ring, wherein a end region of the pin is arranged between the second pin ring and the inner ring.

13. Harmonic pin ring gear system according to one of the preceding items comprising a middle pin ring, wherein a middle region of the pin abuts the middle pin ring and the outer gear has a channel in which the middle pin ring runs.

14. Harmonic pin ring gear system according to one of the preceding items, wherein the inner gear comprises an inner gear holder that is fixed to the inner gear and an inner gear roller bearing supported radially inwardly by a gear housing, wherein the inner gear and the inner gear holder encompass an outer ring of the inner gear roller bearing.

15. Harmonic pin ring gear system according to one of the preceding items, wherein the output is designed as a hollow driven shaft and has a freewheel, wherein the freewheel is arranged between the hollow driven shaft and an inner region of the inner gear.

16. Harmonic pin ring gear system according to one of the preceding items comprising a crankshaft and a crankshaft freewheel, wherein the crankshaft is arranged concentrically to the hollow driven shaft inside the hollow driven shaft and the crankshaft freewheel is arranged between the crankshaft and the hollow driven shaft.

17. Harmonic pin ring gear system according to one of the preceding items comprising a first washer and a second thrust washer, wherein the first thrust washer is arranged adjacent to a first axial lateral face of the pins and the second thrust washer is arranged adjacent to an opposite second axial lateral face of the pins.

18. Harmonic pin ring gear system according to one of the preceding items, wherein the outer gears are held in their positions relative to the central axis of the gear system by a frictional connection and have radial play relative to this position when loose.

19. Drive shaft for transmitter is mounted on one side in the inner gear which is in turn mounted in the housing.

20. Harmonic pin ring drive comprising a gear unit with a harmonic pin ring gear system according to one of the preceding items and a motor unit, wherein a rotor shaft of a motor of the motor unit is connected mechanically to the cam disk of the gear unit.

21. Harmonic pin ring drive according to item 20, wherein the motor is designed as an internal rotor motor.

22. Harmonic pin ring drive according to item 20 or item 21, wherein a driven shaft arranged inside the input shaft is mounted on two bearings, wherein the motor is provided between the two bearings of the drive shaft.

23. Harmonic pin ring drive according to item 22, wherein the driven shaft is designed in two parts, wherein a support shaft is fixed on the driven shaft.

24. Harmonic pin ring drive according to one of items 20 to 23 comprising a pedal bearing shaft arranged in the driven shaft and a torque sensor in the region between the driven shaft and the pedal bearing shaft, wherein the driven shaft is designed such that the torque sensor is shielded from electromagnetic radiation of the stator.

25. Motor vehicle comprising a harmonic pin ring drive according to one of items 20 to 25, wherein a drive gear of the motor vehicle is connected to the output shaft of the harmonic pin ring drive.

26. Pin ring arrangement comprising a multiplicity of pins, a pin ring for holding the pins and a transmitter for exerting a radial, outwardly directed force onto the pins, wherein the transmitter is arranged inside the pin ring and the pins lie at least predominantly on a outer circumference of the transmitter.

27. Pin ring arrangement according to item 26, wherein the transmitter comprises an eccentric cam arranged eccentrically to an axis of rotation of the transmitter.

28. Pin ring arrangement according to item 27, wherein the transmitter comprises a second eccentric cam arranged eccentrically to an axis of rotation of the transmitter.

29. Pin ring arrangement according to item 26, wherein the transmitter comprises an oval cam disk and a thin-section ball bearing that lies on the oval cam disk, wherein the pins lie on an outer ring of the thin-section ball bearing.

The invention claimed is:

1. A harmonic pin ring gear system comprising:
   an input shaft and an output shaft;
   two outer gears, each with internal toothing,
   a single inner gear with external toothing arranged concentrically to a first outer gear and inside said first outer gear in an axial direction;
   a drive means extending between the two outer gears and the inner gear comprising a pin ring formed as one part in circumferential direction and a multiplicity of pins that protrude laterally in the axial direction from the pin ring; and
   a rotary transmitter for lifting the drive means off the external toothing of the inner gear and pressing the drive means into the internal toothing of the outer gear; wherein the inner gear comprises an inner gear holder that is fixed to the inner gear and an inner gear roller bearing supported radially inwardly by a gear housing, wherein the inner gear and the inner gear holder encompass an outer ring of the inner gear roller bearing.

2. The harmonic pin ring gear system of claim 1, wherein in a first axial region a radial force flow runs in a straight direction from the transmitter via at least one pin to the internal toothing of the outer gear, and in a second axial region a radial force flow runs in a straight direction from at least one pin to the external toothing of the inner gear.

3. The harmonic pin ring gear system of claim 1, wherein the pin ring is located on one outer side of the outer gear in the axial direction.

4. The harmonic pin ring gear system of claim 1, wherein the drive means abuts the transmitter around an entire circumference of the transmitter.

5. The harmonic pin ring gear system of claim 4, wherein the transmitter comprises an oval-shaped cam disk and a flexible thin-section roller bearing, wherein the flexible thin-section roller bearing lies on the oval cam disk and the pins lie on an outer ring of the flexible thin-section roller bearing.

6. The harmonic pin ring gear system of claim 1, wherein the drive means abuts a circumference of the transmitter except in a first region about a first angular position and in a second region about a second angular position, wherein the first angular position is offset by 180 degrees in relation to the second angular position.

7. The harmonic pin ring gear system of claim 6, comprising a double eccentric cam with a first eccentric cam with a first axis of rotation and a second eccentric cam with a second axis of rotation, wherein the first angular position and the second angular position are each offset by 45 degrees in relation to a semi-major axis that connects the first axis of rotation to the second axis of rotation.

8. The harmonic pin ring gear system of claim 1, wherein the pin ring comprises open channels arranged in the axial direction to receive the pins that are arranged on an inner side of the pin ring.

9. The harmonic pin ring gear system of claim 1 comprising a second pin ring arranged in radial direction in relation to the inner ring, wherein an end region of the pin is arranged between the second pin ring and the inner ring.

10. The harmonic pin ring gear system of claim 1 comprising a middle pin ring, wherein a middle region of the pin abuts the middle pin ring and the outer gear has a channel in which the middle pin ring runs.

11. The harmonic pin ring gear system of claim 1, wherein the output shaft is designed as a hollow driven shaft and has a freewheel, wherein the freewheel is arranged between the hollow driven shaft and an inner region of the inner gear.

12. The harmonic pin ring gear system of claim 1 comprising a crankshaft and a crankshaft freewheel, wherein the crankshaft is arranged concentrically to a hollow driven shaft inside the hollow driven shaft and the crankshaft freewheel is arranged between the crankshaft and the hollow driven shaft.

13. The harmonic pin ring gear system of claim 1 comprising a first washer and a second thrust washer, wherein the first thrust washer is arranged adjacent to a first axial lateral face of the pins, and the second thrust washer is arranged adjacent to an opposite second axial lateral face of the pins.

14. The harmonic pin ring gear system of claim 1, wherein the outer gears are held in their positions relative to a central axis by a frictional connection and have radial play relative to this position when loose.

15. The harmonic pin ring gear system of claim 1, further comprising a drive comprising a gear unit and a motor unit, wherein a rotor shaft of a motor of the motor unit is connected mechanically to a cam disk of the gear unit.

16. The harmonic pin ring gear system of claim 15, wherein the motor is designed as an internal rotor motor.

17. The harmonic pin ring gear system of claim 15, wherein a driven shaft arranged inside the input shaft is mounted on two bearings, wherein the motor is provided between the two bearings of the drive shaft.

18. The harmonic pin ring gear system of claim 17, wherein the driven shaft is designed in two parts, wherein a support shaft is fixed on the driven shaft.

19. The harmonic pin ring gear system of claim 15, comprising a pedal bearing shaft arranged in the driven shaft and a torque sensor in the region between the driven shaft and the pedal bearing shaft, wherein the driven shaft is designed such that the torque sensor is shielded from electromagnetic radiation of the stator.

20. A motor vehicle comprising:
outer gears each with internal toothing;
an inner gear with external toothing arranged concentrically to an outer gear and inside the outer gear in an axial direction;
a drive means extending between the outer gears and the inner gear comprising a pin ring formed as one part in circumferential direction and a multiplicity of pins that protrude laterally in the axial direction from the pin ring;
a rotary transmitter for lifting the drive means off the external toothing of the inner gear and pressing the drive means into the internal toothing of the outer gear; and
a harmonic pin ring drive comprising a gear unit and a motor unit, wherein:
the inner gear comprises an inner gear holder that is fixed to the inner gear and an inner gear roller bearing supported radially inwardly by a gear housing;
the inner gear and the inner gear holder encompass an outer ring of the inner gear roller bearing;
a rotor shaft of a motor of the motor unit is connected mechanically to a cam disk of the gear unit; and
a drive gear of the motor vehicle is connected to an output shaft of the harmonic pin ring drive.

\* \* \* \* \*